(12) United States Patent
Sojoodi et al.

(10) Patent No.: US 6,437,805 B1
(45) Date of Patent: Aug. 20, 2002

(54) SYSTEM AND METHOD FOR ACCESSING OBJECT CAPABILITIES IN A GRAPHICAL PROGRAM

(75) Inventors: Omid Sojoodi; Robert Dye; Murali Parthasarathy; Ram Kudukoli, all of Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/136,123

(22) Filed: Aug. 18, 1998

Related U.S. Application Data

(63) Continuation-in-part of application No. 08/916,005, filed on Aug. 21, 1997, now Pat. No. 6,102,965, which is a continuation-in-part of application No. 08/810,079, filed on Mar. 4, 1997, now Pat. No. 6,064,812, which is a continuation-in-part of application No. 08/717,771, filed on Sep. 23, 1996, now Pat. No. 5,847,953.
(60) Provisional application No. 60/056,528, filed on Aug. 21, 1997.

(51) Int. Cl.[7] .................................................. G09G 5/00
(52) U.S. Cl. ...................................... 345/763; 717/105
(58) Field of Search ................................. 345/333, 335, 345/349, 339, 334, 967, 440, 357, 835, 765, 744, 854, 619, 763, 764; 717/1, 104–109, 132; 709/225, 220

(56) References Cited

U.S. PATENT DOCUMENTS

| | | | |
|---|---|---|---|
| 4,901,221 A | | 2/1990 | Kodosky et al. |
| 5,097,411 A | | 3/1992 | Doyle et al. ................ 345/522 |
| 5,251,322 A | | 10/1993 | Doyle et al. ................ 345/501 |
| 5,261,043 A | | 11/1993 | Wolber et al. |
| 5,291,587 A | * | 3/1994 | Kodosky et al. ............... 703/2 |
| 5,337,262 A | | 8/1994 | Luthi et al. |
| 5,359,546 A | | 10/1994 | Hayes et al. |
| 5,361,336 A | | 11/1994 | Atchison |
| 5,390,325 A | | 2/1995 | Miller |
| 5,394,522 A | * | 2/1995 | Sanchez-Frank et al. ... 345/349 |

(List continued on next page.)

OTHER PUBLICATIONS

Rijnders et al., "Versatile Visual Programming Environment for Scientific Applications," ACM, 1991, pp. 21–26.*
Paul S. Barth, "An Object–Oriented Approach to Graphical Interfaces," ACM Transactions on Graphics, vol. 5, No. 2, 1986, pp 142–172.*
LabVIEW Function Reference Manual, Aug. 1993 Edition, pp 10–11 and 10–12.
LabVIEW Code Interface Reference Manual, Dec. 1993.
Pleas, K., BYTE Magazine Special Report, Apr. 1996, "OLE's Missing Links: An emerging standard for communication between applications, OLE 2 will work better when software vendors agree on its meaning," 6 pages.

*Primary Examiner*—Raymond J. Bayerl
*Assistant Examiner*—Tadesse Hailu
(74) *Attorney, Agent, or Firm*—Conley, Rose & Tayon PC; Jeffrey C. Hood

(57) ABSTRACT

A system and method for creating a graphical program, wherein the graphical program is operable to access capabilities of an object. During creation of the graphical program, the user operates to place an object node in the graphical program, wherein the object node is operable to access capabilities of the object. This preferably includes the user arranging on the screen the graphical program, including the object node and various other nodes, and connecting the various nodes to create the graphical program. The user then configures the object node to receive information on the object, preferably by the user configuring the object node with a reference to the object, e.g., a pointer, address, or other information which specifies the identity and/or location of the object. The user also selects one or more methods to be invoked on the object and/or one or more properties to get/set on the object. Once the graphical program has been created, then during execution of the graphical program, the object node accesses the capabilities of the object.

84 Claims, 40 Drawing Sheets

U.S. PATENT DOCUMENTS

| | | |
|---|---|---|
| 5,428,776 A | 6/1995 | Rothfield ........................ 707/4 |
| 5,481,741 A | 1/1996 | McKaskle et al. |
| 5,513,311 A | 4/1996 | McKiel, Jr. .................. 395/161 |
| 5,576,946 A | 11/1996 | Bender et al. |
| 5,640,572 A | 6/1997 | Mondrik et al. |
| 5,673,403 A | 9/1997 | Brown et al. ............... 395/335 |
| 5,727,175 A | 3/1998 | Malone et al. .............. 345/356 |
| 5,734,863 A * | 3/1998 | Kodosky et al. .............. 703/27 |
| 5,751,914 A | 5/1998 | Coley et al. ........... 395/500.43 |
| 5,758,071 A | 5/1998 | Burgess et al. .......... 395/200.5 |
| 5,758,084 A | 5/1998 | Silverstein et al. .... 395/200.58 |
| 5,768,578 A | 6/1998 | Kirk et al. .................. 707/100 |
| 5,784,275 A | 7/1998 | Sojoodi et al. |
| 5,784,583 A | 7/1998 | Redpath ..................... 345/353 |
| 5,801,942 A * | 9/1998 | Nixon et al. .................. 700/83 |
| 5,802,514 A | 9/1998 | Huber ........................ 395/701 |
| 5,802,526 A | 9/1998 | Fawcett et al. ............. 707/104 |
| 5,812,133 A | 9/1998 | Schultz et al. .............. 345/347 |
| 5,821,934 A | 10/1998 | Kodosky et al. |
| 5,847,953 A | 12/1998 | Sojoodi et al. ............. 364/188 |
| 5,848,273 A | 12/1998 | Fontana et al. ............. 395/701 |
| 5,850,548 A * | 12/1998 | Williams ...................... 717/1 |
| 5,862,339 A | 1/1999 | Bonnamre et al. ..... 395/200.57 |
| 5,862,379 A | 1/1999 | Rubin et al. ................ 395/702 |
| 5,867,665 A | 2/1999 | Butman et al. ........ 395/200.68 |
| 5,895,474 A | 4/1999 | Maarek et al. .............. 707/514 |
| 5,905,649 A | 5/1999 | Sojoodi et al. ............... 700/83 |
| 5,966,532 A * | 10/1999 | McDonald et al. ............ 717/1 |
| 6,064,812 A | 5/2000 | Parthasarathy et al. ........ 717/1 |
| 6,102,965 A | 8/2000 | Dye et al. ...................... 717/1 |

OTHER PUBLICATIONS

Linthicum, D., BYTE Magazine State of the Art, Jan. 1996, "Integration, Not Perspiration: CORBA, OLE, and Open-Doc: Three technologies for desktop components face off," 11 pages.

LabVIEW2 User Manual, Jan. 1990, National Instruments Corp., pp 3–18 to 3–19.

Smedley, Trevor J., "Visual Programming Applied to Industrial Software Development", 1995, pp. 2–28.

*Hewlett Packard SICL Standard Instrument Control Library for C Progamming*, Lee Atchison, VXI Systems Division, Hewlett Packard Company, Jan. 21, 1994, Revision 3.9, pp. i–iii, 1–136, Index.

* cited by examiner

Front Panel Refnum controls

Open Application Reference

Open VI Reference

Close Application or VI Reference

Server Configuration

Exported VIs Configuration

SYSTEM AND METHOD FOR ACCESSING OBJECT CAPABILITIES IN A GRAPHICAL PROGRAM

PRIORITY INFORMATION

This application claims the benefit of priority of:

U.S. Provisional Application No. 60/056,528 titled "System and Method for Providing Automation Server Capabilities in Graphical Programs," by Ram Kudukoli, Robert Dye and Murali Parthasarathy, filed on Aug. 21, 1997;

CONTINUATION DATA

This is a continuation-in-part of co-pending patent application Ser. No. 08/916,005 titled "System and Method for Providing Client/Server Access to Graphical Programs" filed on Aug. 21, 1997, whose inventors were Robert Dye and Omid Sojoodi which issued Aug. 15, 2000 as U.S. Pat. No. 6,102,965 which is a continuation in part of co-pending patent application Ser. No. 08/810,079 titled "System and Method for Developing Automation Clients using a Graphical Data Flow Program" filed on Mar. 4, 1997, whose inventors were Murali Parthasarathy and Omid Sojoodi, which issued May 16, 2000 as U.S. Pat. No. 6,064,812 which is a continuation-in-part of co-pending application Ser. No. 08/717,771 which issued Dec. 8, 1998 as U.S. Pat. No. 5,847,953 titled "System and Method for Performing Class Checking of Objects in a Graphical Data Flow Program" and filed Sep. 23, 1996, whose inventors were Omid Sojoodi and Stephen W. Rogers, which issued Dec. 8,1998 as U.S. Pat. No. 5,847,953.

This is also a continuation in part of co-pending patent application Ser. No. 08/810,079 titled "System and Method for Developing Automation Clients using a Graphical Data Flow Program" filed on Mar. 4, 1997, whose inventors were Murali Parthasarathy and Omid Sojoodi, which issued May. 16, 2000 as U.S. Pat. No. 6,064,812 which is a continuation-in-part of co-pending application Ser. No. 08/717,771 titled "System and Method for Performing Class Checking of Objects in a Graphical Data Flow Program" and filed Sep. 23, 1996, whose inventors were Omid Sojoodi and Stephen W. Rogers which issued Dec. 8, 1998 as U.S. Pat. No. 5,847,953.

This is also a continuation-in-part of co-pending application Ser. No. 08/717,771 titled "System and Method for Performing Class Checking of Objects in a Graphical Data Flow Program" and filed Sep. 23, 1996, whose inventors were Omid Sojoodi and Stephen W. Rogers which issued Dec. 8, 1998 as U.S. Pat. No. 5,847,953.

CROSS-REFERENCE TO RELATED APPLICATIONS

The following applications are related to the present application:

U.S. patent application Ser. No. 08/916,005 titled "System and Method for Providing Client/Server Access to Graphical Programs" filed on Aug. 21, 1997, whose inventors were Robert Dye and Omid Sojoodi which issued Aug. 15, 2000 as U.S. Pat. No. 6,102,965;

U.S. patent application Ser. No. 08/810,079 titled "System and Method for Developing Automation Clients using a Graphical Data Flow Program" filed on Mar. 4, 1997, whose inventors were Murali Parthasarathy and Omid Sojoodi, which issued May. 16, 2000 as U.S. Pat. No. 6,064,812, U.S. patent application Ser. No. 08/811,187 titled "System and Method for Performing Class Propagation and Type Checking in a Graphical Automation Client" and filed on Mar. 4, 1997, whose inventors were Murali Parthasarathy and Omid Sojoodi, which issued May. 16, 2000 as U.S. Pat. No. 6,064,812, U.S. patent application Ser. No. 08/717,771 titled "System and Method for Performing Class Checking of Objects in a Graphical Data Flow Program" which issued Dec. 8, 1998 as U.S. Pat. No. 5,847,953 Stephen W. Rogers.

U.S. patent application Ser. No. 08/717,772 titled "System and Method for Performing Interface Independent Virtual Instrumentation Functions Using Attribute Nodes in a Graphical Data Flow Program" which issued May. 18, 2000 as U.S. Pat. No. 5,905,648 and filed Sep. 23, 1996, whose inventors were Omid Sojoodi and Stephen W. Rogers.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to graphical programming, and in particular to a system for creating graphical programs, wherein the graphical programs are operable to access functionality or properties of objects.

DESCRIPTION OF THE RELATED ART

Traditionally, high level text-based programming languages have been used by programmers in writing applications programs. Many different high level programming languages exist, including BASIC, C, FORTRAN, Pascal, COBOL, ADA, APL, etc. Programs written in these high level languages are translated to the machine language level by translators known as compilers. The high level programming languages in this level, as well as the assembly language level, are referred to as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he/she can efficiently program a computer system in a text-based environment. The task of programming a computer system to model a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

Examples of fields in which computer systems are employed to model and/or control physical systems are the fields of instrumentation, process control, and industrial automation. Computer modeling or control of devices such as instruments or industrial automation hardware has become increasingly desirable in view of the increasing complexity and variety of instruments and devices available for use. However, due to the wide variety of possible testing/control situations and environments, and also the wide array of instruments or devices available, it is often necessary for a user to develop a program to control a desired system. As discussed above, computer programs used to control such systems had to be written in conventional text-based programming languages such as, for example, assembly language, C, FORTRAN, BASIC, or Pascal. Traditional users of these systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. No. 4,901,221 to Kodosky et al discloses a graphical system and method for modeling a process, i.e., a graphical programming environment, which enables a user to easily and intuitively model a process. The graphical programming environment disclosed in Kodosky et al can be considered the highest and most intuitive way in which to interact with a computer. A graphically based programming environment can be represented at level above text-based high level programming languages such as C, Pascal, etc. The method disclosed in Kodosky et al allows a user to construct a diagram using a block diagram editor, such that the diagram created graphically displays a procedure or method for accomplishing a certain result, such as manipulating one or more input variables to produce one or more output variables. In response to the user constructing a data flow diagram or graphical program using the block diagram editor, machine language instructions are automatically constructed which characterize an execution procedure which corresponds to the displayed procedure. Therefore, a user can create a computer program solely by using a graphically based programming environment. This graphically based programming environment may be used for creating virtual instrumentation systems, industrial automation systems and modeling processes, as well as for any type of general programming.

Therefore, Kodosky et al teaches a graphical programming environment wherein a user places or manipulates icons in a block diagram using a block diagram editor to create a data flow "program." A graphical program for controlling or modeling devices, such as instruments, processes or industrial automation hardware, is referred to as a virtual instrument (VI). In creating a virtual instrument, a user preferably creates a front panel or user interface panel. The front panel includes various front panel objects, such as controls or indicators that represent the respective input and output that will be used by the graphical program or VI, and may include other icons which represent devices being controlled. When the controls and indicators are created in the front panel, corresponding icons or terminals are automatically created in the block diagram by the block diagram editor. Alternatively, the user can first place terminal icons in the block diagram which cause the display of corresponding front panel objects in the front panel. The user then chooses various functions that accomplish his desired result, connecting the corresponding function icons between the terminals of the respective controls and indicators. In other words, the user creates a data flow program, referred to as a block diagram, representing the graphical data flow which accomplishes his desired function. This is done by wiring up the various function icons between the control icons and indicator icons. The manipulation and organization of icons in turn produces machine language that accomplishes the desired method or process as shown in the block diagram.

A user inputs data to a virtual instrument using front panel controls. This input data propagates through the data flow block diagram or graphical program and appears as changes on the output indicators. In an instrumentation application, the front panel can be analogized to the front panel of an instrument. In an industrial automation application the front panel can be analogized to the MMI (Man Machine Interface) of a device. The user adjusts the controls on the front panel to affect the input and views the output on the respective indicators.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), and supervisory control and data acquisition (SCADA) applications, among others.

In parallel to the development of graphical data flow programming for various applications, such as virtual instrumentation, object and/or component technology has emerged in the area of software development. The notion of object technology relates to an application program or object using capabilities or services of an object. For example, object technology includes the notion of "servers" "exporting" their "objects" for use by "clients." A server is a software application which makes available its classes to be accessed from another application, referred to as a client. A client instantiates objects from the classes in the type libraries. In addition, the term "object" also includes various other types of components or objects, including applications, which offer services or functionality that can be accessed by a client.

Objects generally have properties and methods. Properties are the data associated with the object and typically determine attributes of the object, such as the number of columns of a spreadsheet. Methods are functions or operations which the object is capable of performing, such as drawing a spreadsheet on a display screen. A server exports an object by making the methods and properties of the object invokable by a client.

An example of a server is Microsoft Excel® which exports its objects for use by clients. An example of an object technology is Active X, formerly called OLE (Object Linking and Embedding), promulgated by Microsoft. For example, the Microsoft Excel spreadsheet program, the Microsoft Access® database program, and the Microsoft Word® word processing program, all export objects using the Active X interface. Active X is an industry standard object or component interface used by application programs to provide objects in a consistent manner to other application programs, development tools, and macro languages. Other examples of object technologies are OpenDoc® and the Common Object Request Broker Architecture (CORBA).

It is desirable for a program, such as a graphical program, to be able to access functionality provided by an object or server. For example, often it is desirable for a program, such as a graphical program, to display, manipulate, catalog, edit or perform other operations, such as may be performed by an object or server, on data acquired or generated by a graphical program or virtual instrument. For example, it may be desirable for a virtual instrument to display acquired temperature samples in a spreadsheet, such as a Microsoft Excel spreadsheet. More generally, it would be desirable to provide a system and method which enables a graphical program to be able to invoke objects, such as from a server, for a variety of applications.

Therefore, improved methods are desired for enabling a graphical data flow programming system to access objects. More particularly, an improved system and method is desired which enables a graphical data flow program to be constructed which uses capabilities of objects.

SUMMARY OF THE INVENTION

The present invention comprises a system and method for creating a graphical program, wherein the graphical program is operable to access capabilities of an object. The present invention preferably operates in a computer including a display screen and a user input device.

During creation of the graphical program, the user operates to place an object node in the graphical program, wherein the object node is operable to access capabilities of the object. Stated another way, during program creation the computer system displays on the screen an object node in the graphical program in response to user input, wherein the object node is operable to access capabilities of the object. This preferably includes the user arranging on the screen the graphical program, including the object node. The graphical program will typically comprise a plurality of nodes, and the method for creating the graphical program comprises arranging on the screen the plurality of nodes, including the object node, and connecting the various nodes to create the graphical program. In the preferred embodiment, the nodes are connected in a data flow paradigm.

The user then configures the object node to receive information on the object, preferably by the user configuring the object node with a reference to the object, e.g., a pointer, address, or other information which specifies the identity and/or location of the object. This preferably includes the user selecting a class of the object. In the preferred embodiment, the object node includes an object reference input for receiving a reference to the object, and the user connects the object reference input of the object node to receive the reference to the object. This preferably includes the user placing an object reference node in the graphical program, wherein the object reference node includes an object reference output that provides the reference to the object, and the user connecting the object reference output of the object reference node to the object reference input of the object node. The object node then receives the information on the object on the object reference input during execution of the graphical program.

Creation of the graphical program may also include configuring a user interface to display data input to and/or output from the graphical program. Once the graphical program has been created, then during execution of the graphical program, the object node accesses the capabilities of the object. More specifically, after creation of the graphical program, the system/method constructs execution instructions in response to the graphical program, wherein the execution instructions are executable to access the capabilities of the object. When these execution instructions are executed, the object node accesses the capabilities of the object.

In the preferred embodiment, the object may be any of various types of software, such as a software object according to the standard principles of object-oriented software, a software component, other types of re-usable software elements, or an application, among others. Where the object is a software object or component, the object node is executable to either invoke a method of the object, get and/or set one or more properties of the object, or access other capabilities of the object. Where the object is an application, the object node is operable to perform one or more of 1) initiate execution of the application; or 2) get/set one or more properties of the application. Also, the object may reside in the same computer where the graphical program is being created, or may reside in a different computer connected through a network.

In the preferred embodiment, the graphical program comprises a diagram or execution portion and a user interface portion, and the object node is comprised in the diagram portion. Alternatively, the object node may be comprised in the user interface portion. In this case where the object node is located in the user interface, the object is preferably comprised in the object node, and the object node operates to manipulate the object. For example, a document may be comprised in the object node, wherein the object node is operable to display changes to the document during execution of the graphical program. As another example, the object may be a user interface element, such as a control or indicator, wherein the object node is operable to affect the data input to or output from the control or indicator - - - - . - - - .

BRIEF DESCRIPTION OF THE DRAWINGS

A better understanding of the present invention can be obtained when the following detailed description of the preferred embodiment is considered in conjunction with the following drawings, in which.

Figure 1:
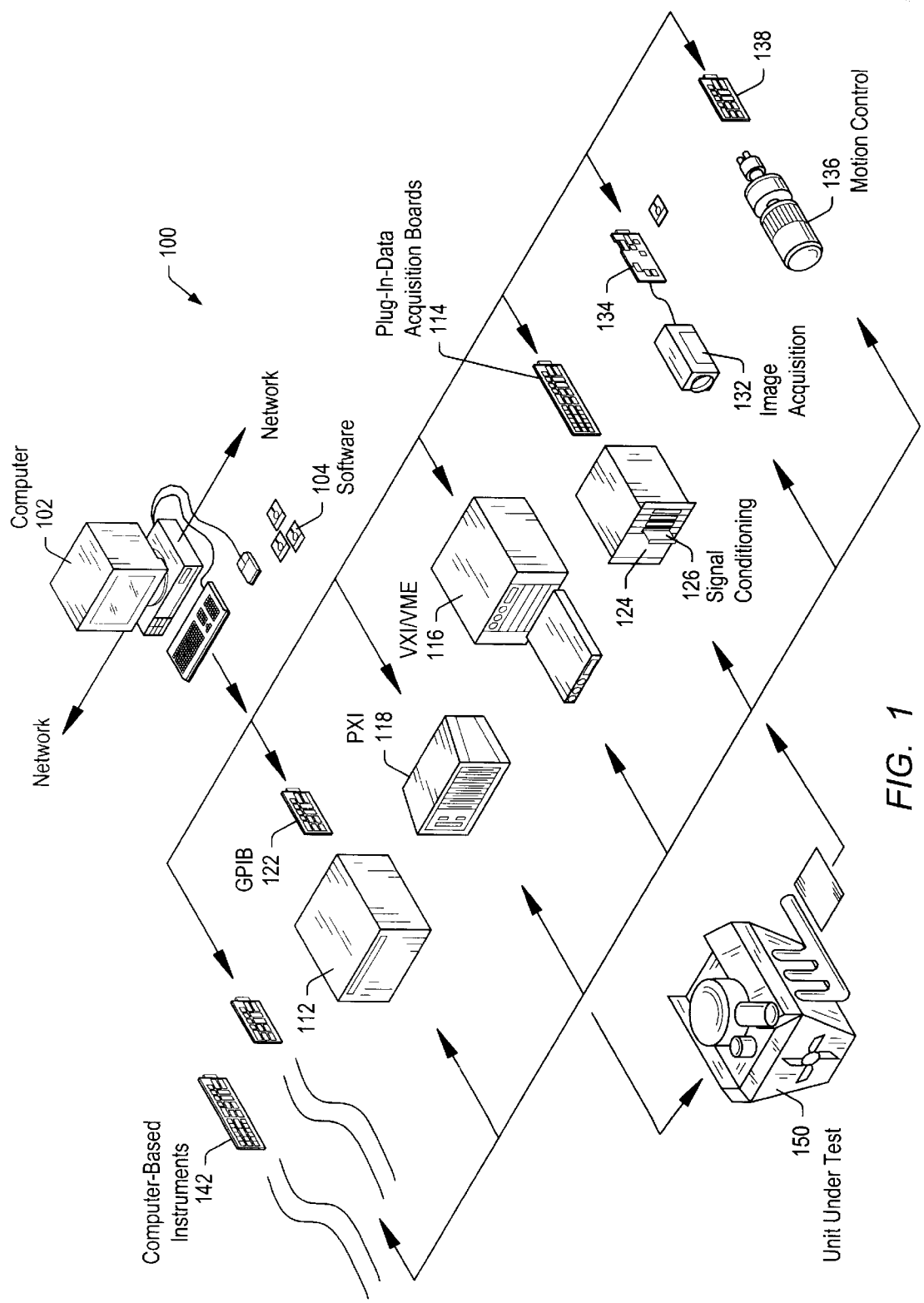
FIG. 1 illustrates an instrumentation control system according to one embodiment of the present invention.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENT

Incorporation by Reference

The following U.S. Patents and patent applications are hereby incorporated by reference in their entirety as though fully and completely set forth herein.

U.S. Pat. No. 4,901,221 titled "Graphical System for Modeling a Process and Associated Method," issued on Feb. 13, 1990.

U.S. Pat. No. 5,481,741 titled "Method and Apparatus for Providing Attribute Nodes in a Graphical Data Flow Environment".

U.S. patent application Ser. No. 08/916,005 titled "System and Method for Providing Client/Server Access to Graphical Programs" filed on Aug. 21, 1997, whose inventors were Robert Dye and Omid Sojoodi.

U.S. patent application Ser. No. 08/810,079 titled "System and Method for Developing Automation Clients using a Graphical Data Flow Program" filed on Mar. 4, 1997, whose inventors were Murali Parthasarathy and Omid Sojoodi, U.S. patent application Ser. No. 08/717,771 titled "System and Method for Performing Class Checking of Objects in a Graphical Data Flow Program" and filed Sep. 23, 1996, whose inventors were Omid Sojoodi and Stephen W. Rogers.

The LabVIEW and BridgeVIEW graphical programming manuals and help files, including the "G Programming Reference Manual", available from National Instruments Corporation, are also hereby incorporated by reference in their entirety.

Figure 1A:
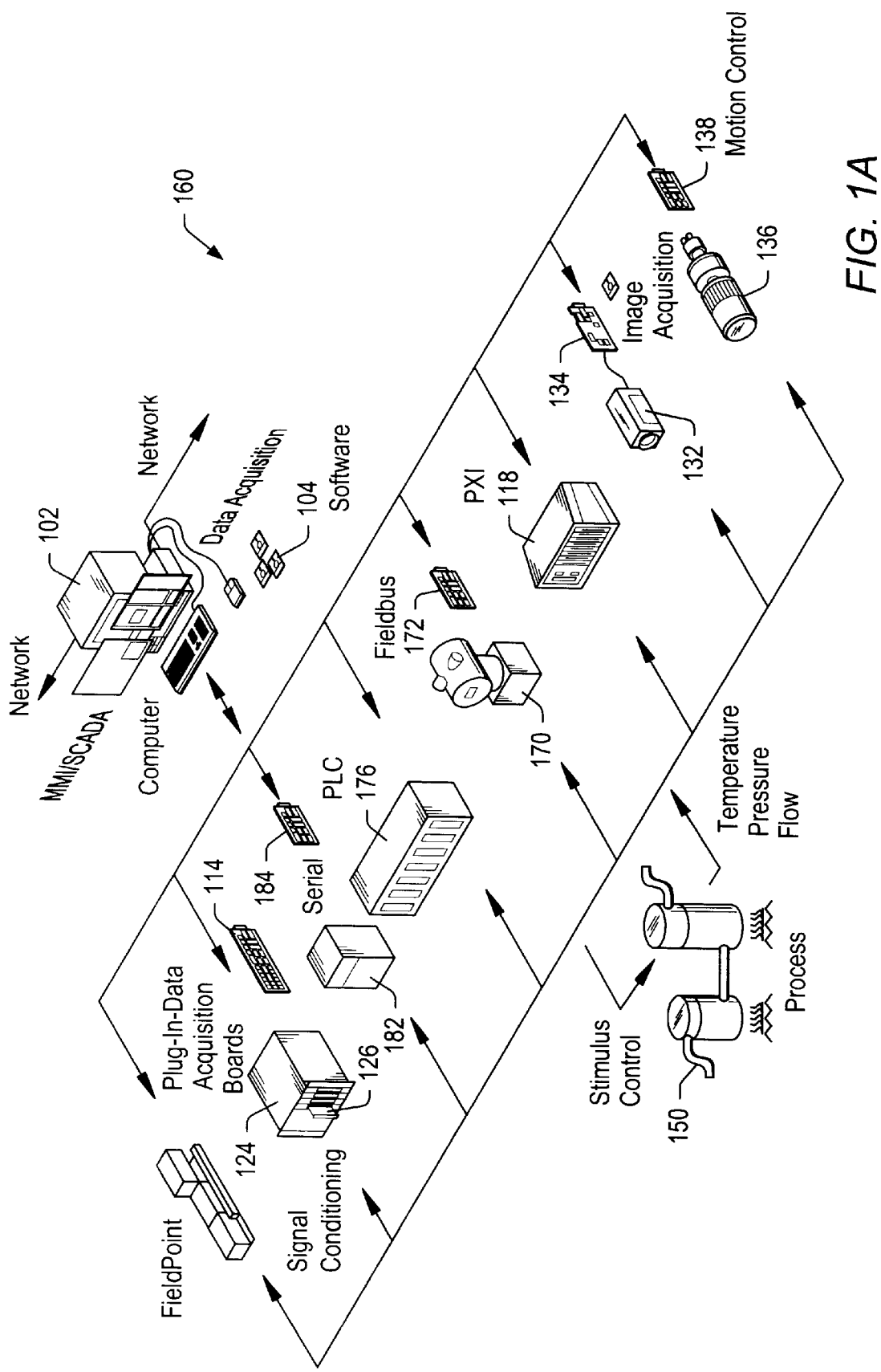
FIG. 1A illustrates an industrial automation system according to one embodiment of the present invention.

FIGS. 1 and 1A—Instrumentation and Industrial Automation Systems

Referring now to FIG. 1, an instrumentation control system 100 is shown. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via a GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and preferably interfaces through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

Referring now to FIG. 1A, an industrial automation system 160 is shown. The industrial automation system 160 is similar to the instrumentation or test and measurement system 100 shown in FIG. 1. Elements which are similar or identical to elements in FIG. 1 have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as M (Man Machine Interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 1 and 1A, the computer system 102 preferably includes a memory media on which computer programs according to the present invention are stored. The term "memory media" is intended to include an installation media, e.g., a CD-ROM, or floppy disks 104, a computer system memory such as DRAM, SRAM, EDO RAM, etc., or a non-volatile memory such as a magnetic media, e.g., a hard drive, or optical storage. The memory media preferably stores a graphical programming development system for developing and executing graphical programs. The graphical programs are operable to access capabilities or functionality of an object, such as an object exported by a server. The host CPU executing code and data from the memory thus comprises a means for creating and executing graphical programs according to the methods described below.

The instruments or devices in FIGS. 1 and 1A are controlled by graphical software programs. Graphical software programs which perform data acquisition, analysis and/or presentation, e.g., for instrumentation control or industrial automation, are referred to as virtual instruments.

In the preferred embodiment, the present invention utilizes the LabVIEW or BridgeVIEW graphical programming systems, hereafter collectively referred to as LabVIEW, available from National Instruments. Also, in the preferred embodiment, the term "LabVIEW" is intended to include graphical programming systems which include G programming functionality, i.e., which include at least a portion of LabVIEW graphical programming functionality, including the BridgeVIEW graphical programming system.

Also, the term "graphical programming system" is intended to include any of various types of systems which are used to develop or create graphical code or graphical programs, including LabVIEW and BridgeVIEW from National Instruments, Visual Designer from Intelligent Instrumentation, Hewlett-Packard's VEE (Visual Engineering Environment), Snap-Master by HEM Data Corporation, DASYLab by DasyTec, GFS DiaDem, and GEDAE, among others.

Although in the preferred embodiment the graphical programming system is involved with data acquisition/generation, analysis, and/or display, and for controlling or modeling instrumentation or industrial automation hardware, it is noted that the present invention can be used for a plethora of applications and are not limited to instrumentation or industrial automation applications. In other words, FIGS. 1 and 1A are exemplary only, and the present invention may be used in any of various types of systems. Thus, the system and method of the present invention is operable for creating graphical programs or graphical code for any of various types of applications, including general purpose software applications such as word processing, spreadsheets, network control, games, etc.

Figure 2:
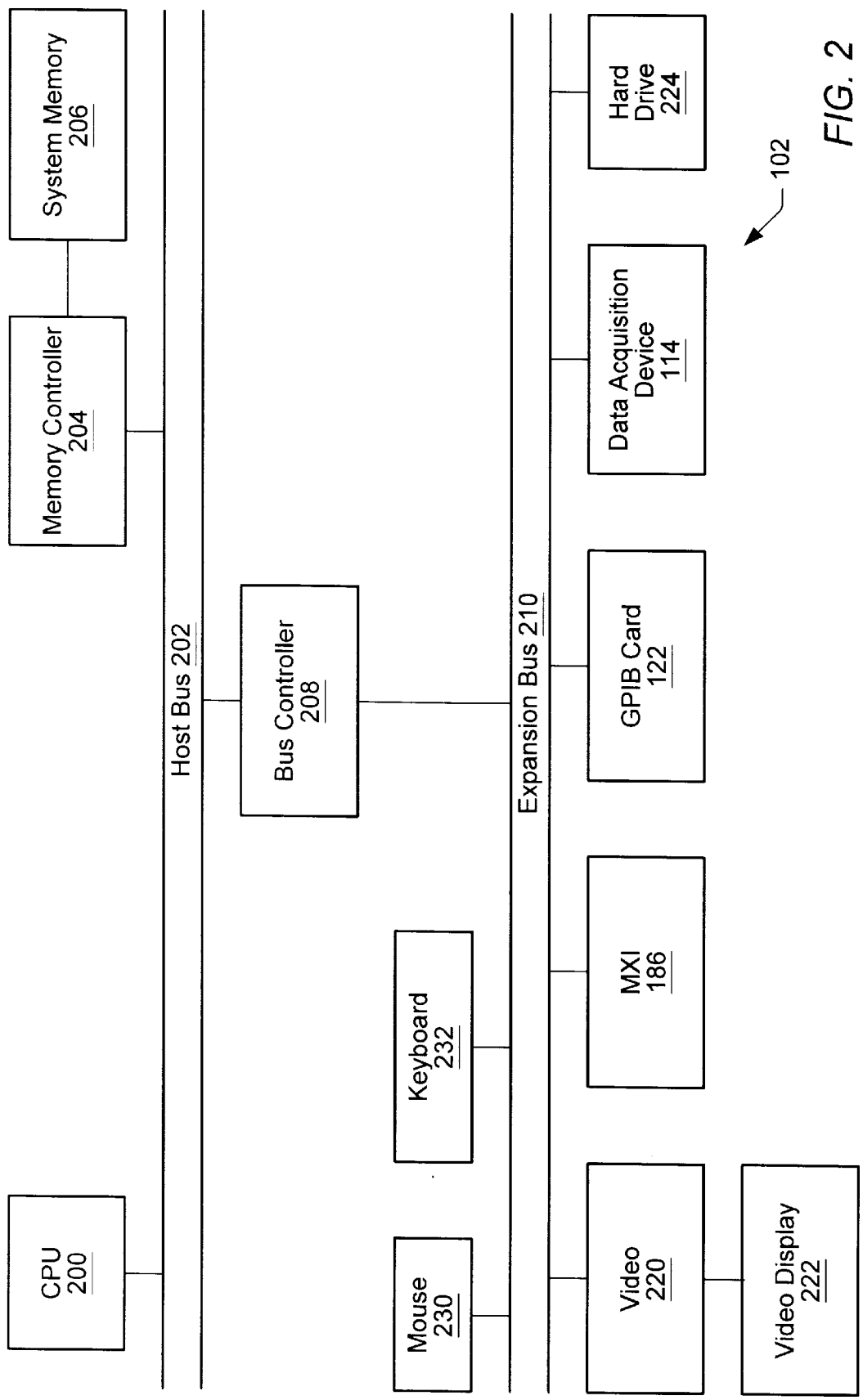
FIG. 2 is a block diagram of the computer of the control system of FIG. 1.

FIG. 2—Computer Block Diagram

FIG. 2 is a representative block diagram of the host computer 102 (of FIG. 1). It is noted that the block diagram of FIG. 2 is representative only, and the computer 102 may have any of various architectures. Also, the elements of a computer not necessary to understand the operation of the present invention have been omitted for simplicity.

The computer 102 includes at least one central processing unit or CPU 200 which is coupled to a processor or host bus 202. The CPU 200 may be any of various types, including an x86 processor, a PowerPC processor, a CPU from the Motorola family of processors, a CPU from the SPARC family of RISC processors, as well as others. Main memory 206 is coupled to the host bus 202 by means of memory controller 204. The main memory 206 stores a graphical programming system. The main memory 206 also stores operating system software as well as other software for operation of the computer system, as well known to those skilled in the art. The instrumentation control software will be discussed in more detail below.

The host bus 202 is coupled to an expansion or input/output bus 210 by means of a bus controller 208 or bus bridge logic. The expansion bus 210 is preferably the PCI (Peripheral Component Interconnect) expansion bus, although other bus types can be used. The expansion bus 210 includes slots for various devices such as the data acquisition board 114 (of FIG. 1), a GPIB interface card 122 which provides a GPIB bus interface for coupling to the GPIB instrument 112 (of FIG. 1), and a VXI or MXI bus card 186 for coupling to the VXI chassis 116 for receiving VXI instruments.

The computer 102 further preferably comprises a video display subsystem 220 which interfaces to video monitor 222, and a non-volatile memory such as hard drive 224, each preferably coupled to the expansion bus 210. The computer 102 further preferably comprises various input devices, such as mouse 230 and keyboard 232, as shown. The input devices are shown coupled to the expansion bus 210, but may be connected to the computer in any of various ways, such as a USB port (not shown). The computer 102 further preferably comprises various other standard components, as is well known in the art.

Graphical Programming System

As noted above, in the preferred embodiment the present invention utilizes the LabVIEW or BridgeVIEW graphical programming system. A graphical program created using LabVIEW comprises an instrument front panel in a first window and a block diagram in a second window. The block diagram comprises program execution elements, referred to as nodes, which are wired or linked together to produce a data flow program. The front panel comprises controls for providing input data to the block diagram and indicators for receiving and/or displaying output data from the nodes of the block diagram. Certain drawings in the present disclosure comprise screen shots displayed during the execution of LabVIEW according to the present invention.

Graphical Programming Environment

Figure 3:
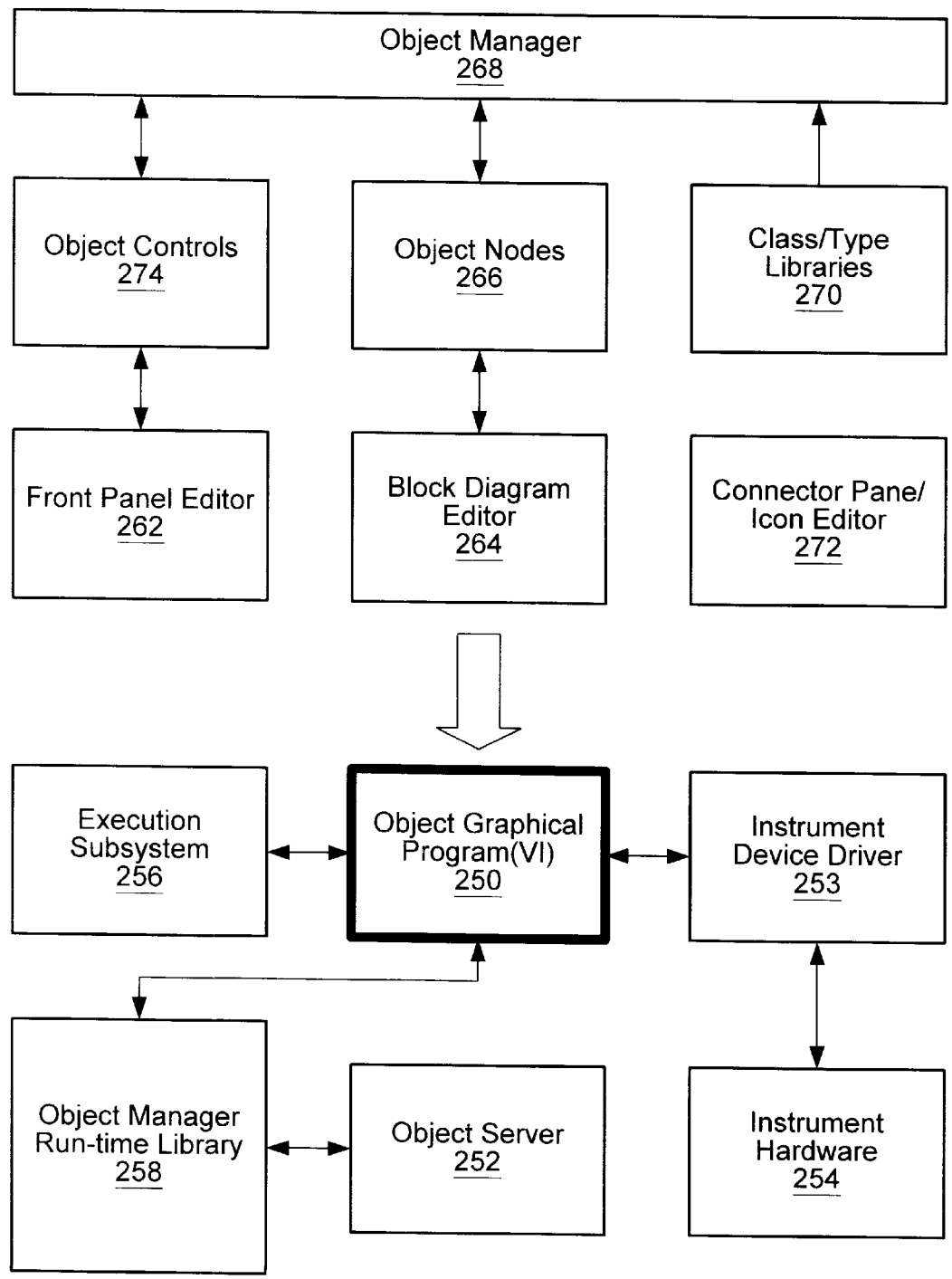
FIG. 3 is a block diagram illustrating the relationship of portions of the instrumentation control system of FIG. 1 according to a first embodiment.

Referring now to FIG. 3, a block diagram illustrating the relationship of portions of the instrumentation control systems 100 or 160 (of FIGS. 1 and 1A) are shown. Preferably, the elements shown in FIG. 3 (with the exception of the hardware instrument 254) are software elements which are executed on the computer 102 (of FIGS. 1 and 1A). The present invention is used to create a graphical program which is operable to access capabilities of one or more objects during execution. The present invention is also useable to create a graphical program portion which is a part of a larger graphical program.

The present invention may be used to create a graphical program which is able to access capabilities of various types of objects, including software objects according to the standard notion of object oriented software, such as Java objects, C++ objects, etc.; software components, such as ActiveX controls; other types of re-usable software elements; and applications; as well as other types of software constructs which offer capabilities or functionality.

In the preferred embodiment, a programmer employs a front panel editor 262, a block diagram editor 264, and optionally a connector pane/icon editor 272 of a graphical programming environment to produce the graphical program. In the instrumentation application of the preferred embodiment, the graphical program is referred to as a virtual instrument (VI) 250. The block diagram editor 264 generates executable instructions, i.e., machine language instructions, in response to the VI 250. The VI 250 developed by the programmer is executed by an execution subsystem 256 of the graphical programming environment to control an instrument 254. The instrument 254 is illustrative of instruments such as those of FIGS. 1 and 1A.

Figure 6:
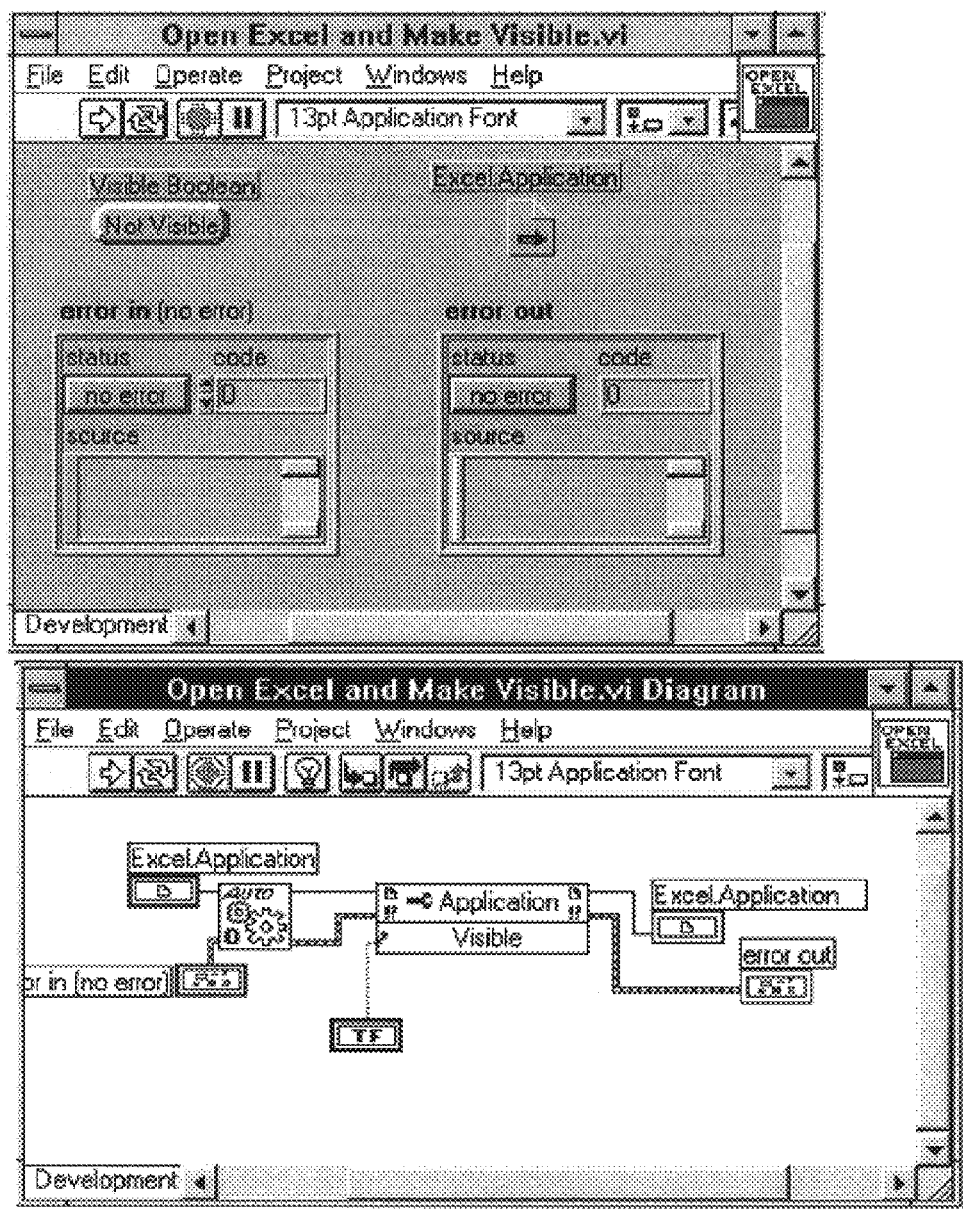
FIG. 6 is a screen shot illustrating the VI block diagram and front panel of an exemplary automation virtual instrument of FIG. 3.

FIG. 6 is a screen shot from a graphical programming environment including a virtual instrument or graphical program exemplary of the VI 250 of FIG. 3 according to one embodiment. The screen shot of FIG. 6 comprises an instrument front panel in a window in the upper portion of the screen and a block diagram in a window in the lower portion of the screen. The block diagram comprises program execution elements, referred to as nodes, which are wired or linked together to produce a data flow program. The front panel comprises controls for providing input data to the block diagram and indicators for receiving and/or displaying output data from the nodes of the block diagram.

Preferably the graphical programming system comprises portions of National Instruments LabVIEW software. The drawings of the present disclosure include numerous screen shots displayed during the execution of LabVIEW. In the screen shots, LabVIEW is executing under the supervision of the Microsoft Windows 95 operating system. For more information on the LabVIEW graphical programming environment of the preferred embodiment, please see U.S. Pat. No. 5,481,741 referenced above.

Referring again to FIG. 3, the graphical programming environment further comprises one or more object controls 274. The front panel editor 262 is preferably operable to generate a VI front panel or user interface. The front panel editor 262 communicates with the control(s) 274. More specifically, the user arranges on the screen one or more user interface items, referred to as controls and indicators, optionally including one or more of the object controls 274. Alternatively, the front panel or user interface is created automatically in response to creation of the block diagram, and the front panel editor 262 is not included. The control(s) 274 communicates with an object manager 268 to obtain or provide information regarding class/type libraries 270 in the system and object classes in the object type libraries 270. In one embodiment, the object controls operate as object nodes to reference an object and display changes made to the object.

The graphical programming environment further comprises object nodes 266, also referred to as object function nodes. Examples of object nodes 266 according to one embodiment are shown in the object nodes palette of FIG. 7. The object nodes 266 preferably include an object refnum, an object open node, an object close node, an object invoke node, an object property node, and a call node, among others. The block diagram editor 264 is operable to create a VI block diagram, or block diagram. The block diagram editor 264 communicates with the object nodes 266, which in turn communicate with the object manager 268. More specifically, the user arranges on the screen a plurality of nodes on the screen, including one or more object function nodes 266, to create a block diagram or graphical program.

The object manager 268 accesses object class/type libraries 270 to acquire information necessary to perform object management operations. Preferably, the object manager 268 communicates with the Windows operating system Registry, or other similar data structures, to obtain information regarding the object class/type libraries 270 in the system. The object control 274, object nodes 266, and object manager 268 will be discussed in more detail below.

Advantageously, the graphical programming environment, and in particular the object control 274, the object nodes 266, the object manager 268, and the object manager run-time library 258, enable a graphical program to instantiate objects of an unlimited number of object classes of object applications, and to remotely invoke properties and methods of the instantiated objects.

The graphical programming environment further preferably includes a connector pane/icon editor 272 for forming VI's into subVI's, i.e., a VI which may be used as a graphical programming element in another VI. The reader is referred to U.S. Pat. No. 5,301,336 for more information about the subVI's and the icon editor 272.

The execution subsystem 256 executes the executable instructions constructed from a block diagram of the VI 250. For more information about the execution subsystem 256 the reader is referred to U.S. Pat. No. 5,481,741.

Preferably, the VI 250 invokes methods and properties of objects of an object server 252, or more than one object server, indirectly through the services of the object manager run-time library 258. Examples of the object server 252 include Microsoft Excel, Access, Word, and National Instruments ComponentWorks controls. Other examples of the object server 252 include Claris Works. The VI 250 controls the instrument 254 through an instrument device driver 253 which includes executable functions which are called by the VI 250 to perform operations in order to control the instrument 254.

The object nodes 266 and object control(s) 274 preferably comprise classes and objects,2 according to the notion of classes and objects in the art of object-oriented programming. Each of the object nodes 266 and the object controls 274 comprise their own properties and methods. The methods include a method for drawing an icon representation of the object on the video display 145 of the computer 102 either in the VI block diagram or front panel, a method for generating code associated with the different functions of each node or control, and a method for performing type propagation checking. The operation of object nodes 266 and object control 274 will be explained in more detail below. As mentioned above, the object nodes 266 comprise an object refnum associated with the object control 274, an object open node, an object property node, an object invoke node, and an object close node.

Figure 3A:
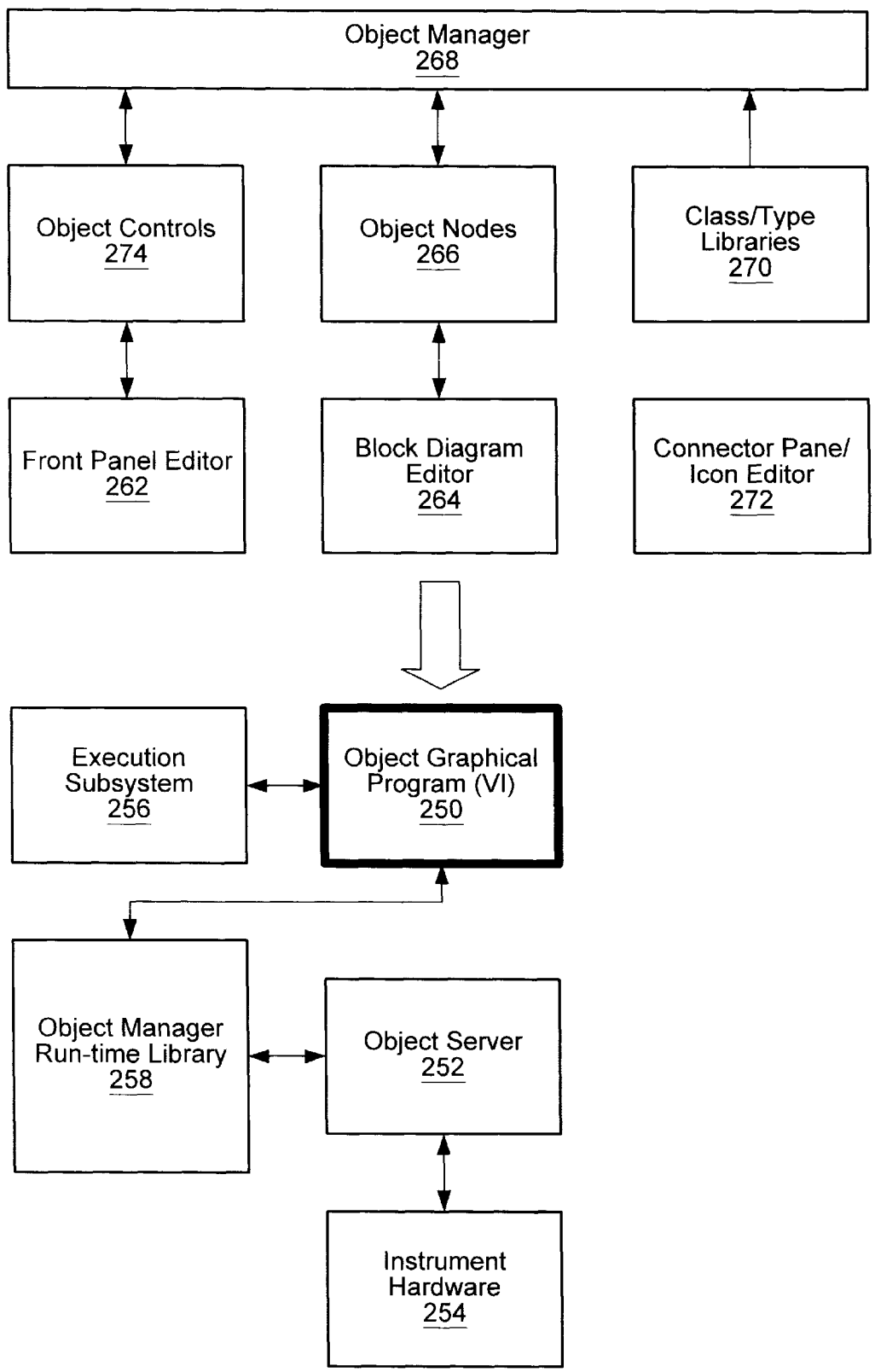
FIG. 3a is a block diagram illustrating the relationship of portions of the instrumentation control system of FIG. 1 according to a second embodiment.

FIG. 3a illustrates an alternate embodiment of the system 100 of FIG. 3. This embodiment is similar to that shown in FIG. 3 and corresponding elements are numbered identically. In the embodiment of FIG. 3a the object server 252 is a program capable of controlling an instrument 254. In other words, in FIG. 3 the graphical program client directly controls the instrument 254, and the client uses the object server to aid in controlling the instrument 254. In FIG. 3a, the object or object server directly controls the instrument 254. For example, the object server 252 may be a program written in the C language for controlling a GPIB instrument. The client VI 250 instantiates objects from the classes exported by the object server 252 and invokes methods and properties of the objects to direct the object server 252 to control the instrument hardware 254.

As mentioned above, the graphical program 250 is not necessarily related to controlling an instrument, but rather the graphical program 250 may be for any of various applications. That is, the object client may have an application other than instrumentation control. In one embodiment similar to that of FIG. 3a, the VI 250 is an object client application which performs other functions. For example, a programmer desires to develop a stock portfolio viewer in a graphical programming environment and develops an object client to access Microsoft Excel spreadsheet objects in order to display a stock portfolio.

Advantageously, the graphical system and method for producing the graphical program or VI 250 has a number of benefits. These benefits include reduction in the development time required to create the VI 250 as well as reduction of the number of code defects in the VI 250. Yet another benefit is the simplicity of programming which makes the development of a graphical program, such as an instrumentation control program, more practical for a larger number of people, i.e., those who might not have the skills, or resources to develop the skills, to develop programs according to more conventional text-based methods. The system and method also provides class propagation, class checking and type checking in a graphical programming environment, discussed further below, thus simplifying program development.

Figures 4, 5:
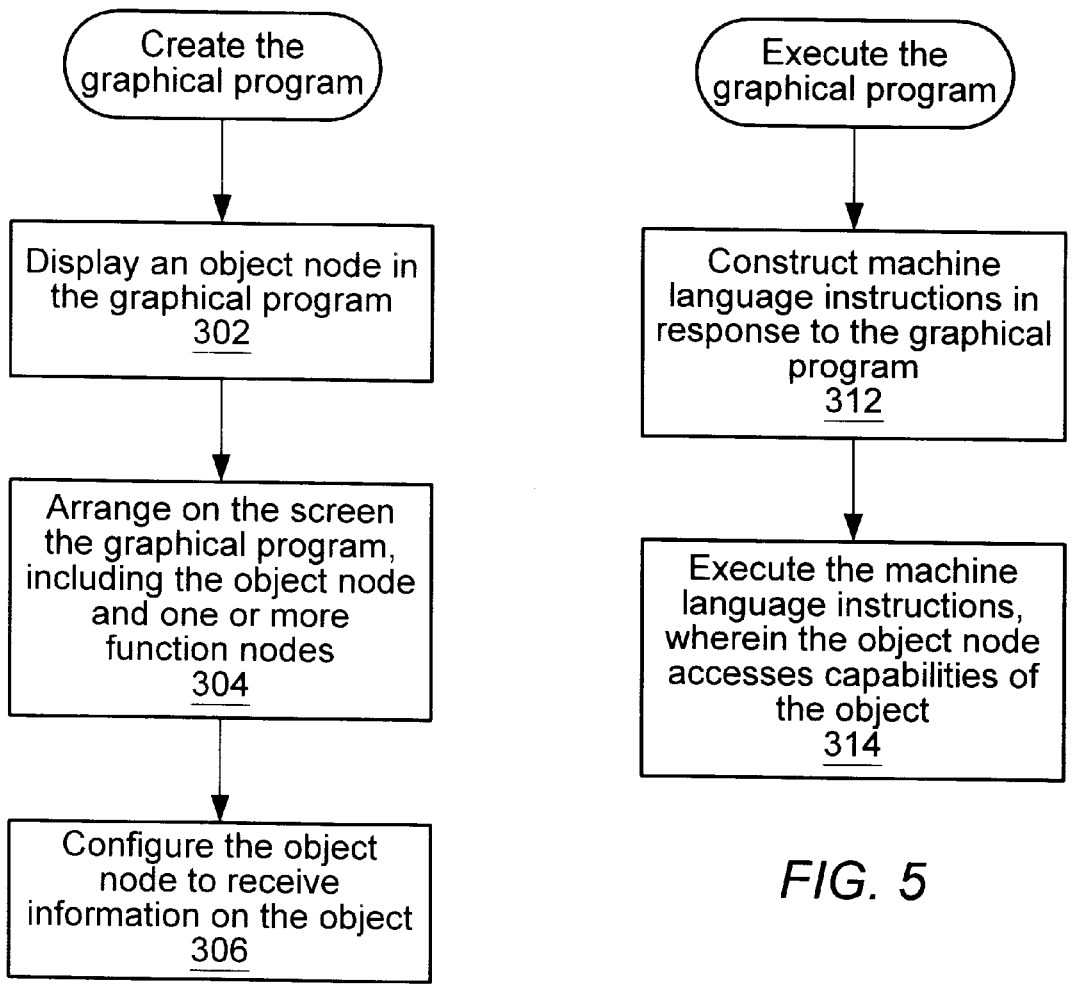
FIG. 4 is a flowchart diagram illustrating creation of a graphical program including an object node according to the present invention.
FIG. 5 is a flowchart diagram illustrating execution of the graphical program created in FIG. 4, wherein the object node operates to access capabilities of an object according to the present invention.

FIGS. 4 and 5—Creation and Execution of a Graphical Program Including Object Nodes FIG. 4 is a flowchart diagram illustrating creation of a graphical program including an object node according to the present invention. As shown, during creation of the graphical program, in step 302 the user operates to place an object node in the graphical program, wherein the object node is operable to access capabilities of the object. Stated another way, during program creation the computer system displays on the screen an object node in the graphical program in response to user input, wherein the object node is operable to access capabilities of the object. In the preferred embodiment, the user drags the object node from a palette onto the graphical program window.

In step 304 the user arranges on the screen the graphical program, including the object node. The graphical program will typically comprise a plurality of nodes, and the method for creating the graphical program preferably comprises arranging on the screen the plurality of nodes, including the object node, and connecting the various nodes to create the graphical program. In the preferred embodiment, the nodes are connected in a data flow paradigm, wherein nodes include inputs and outputs, and each node receives input data from another node, or from an input user interface node or terminal, and each node provides output data to another node, or to an output user interface node or terminal.

In step 306 the user then configures the object node to receive information on the object, preferably by the user configuring the object node with a reference to the object, e.g., a pointer, address, or other information which specifies the identity and/or location of the object. Step 306 is preferably performed as part of arranging the graphical program on the screen in step 304.

In the preferred embodiment, the object node includes an object reference input for receiving a reference to the object, and the user connects the object reference input of the object node to receive the reference to the object. This preferably includes the user placing an object reference node in the graphical program, wherein the object reference node includes an object reference output that provides the reference to the object, and the user connecting the object reference output of the object reference node to the object reference input of the object node. The object node then receives the information on the object on the object reference input during execution of the graphical program.

Alternatively, the user "pops up" on the object node to configure the object node with the reference to the object. When the user "pops up" on the object node, a dialog box appears. The user then enters information into the dialog box to configure the object node with the reference to the object.

Step 306 also preferably includes the user selecting the class of the object. Once the class is selected, then the object is preferably instantiated at run time. Step 306 further includes selecting any desired methods to be invoked on the object or properties to get/set on the object. For example, if the object node is an invoke node, the user preferably selects one or more methods which are to be invoked on the object by the invoke node during execution of the graphical program. If the object node is a property node, the user preferably selects one or more properties to get/set on the object during execution of the graphical program. The user preferably selects the methods and/or properties by "popping up" on the object node and using a dialog box or menu to select the desired methods and/or properties. Thus, the user preferably configures the object node for the desired functionality.

Creation of the graphical program may also include configuring a user interface to display data input to and/or output from the graphical program. In one embodiment, such as the LabVIEW graphical programming system from National Instruments, the user may separately configure or assemble a user interface panel including user interface nodes, such as dials, switches, charts, graphs, etc. In this embodiment, terminals which correspond to each of the user interface nodes appear in the block diagram and operate to provide or represent data input to/output from the block diagram. In another embodiment, the user assembles user interface nodes into the block diagram with the function nodes, wherein the user interface nodes have associated user interface elements, such as dials, sliders, text boxes, graphs, charts, etc. The user may then selectively view the user interface elements associated with each of the user interface nodes, such as in Hewlett Packard's VEE product. Alternatively, the user interface panel is automatically constructed from the user interface nodes in the block diagram, such as in the Visual Designer product from Intelligent Instrumentation.

Once the graphical program has been created, then during execution of the graphical program, the object node is operable to access the capabilities of the object. More specifically, after creation of the graphical program, execution of the graphical program operates as shown in FIG. 5. FIG. 5 is a flowchart diagram illustrating execution of the graphical program created in FIG. 4, wherein the object node operates to access capabilities of an object according to the present invention. As shown, in step 312 the system/method constructs execution instructions in response to the graphical program, wherein the execution instructions are executable to access the capabilities of the object. In step 314 the execution instructions are executed. When these execution instructions are executed, the object node accesses the capabilities of the object, such as invoking method(s) of the object and/or getting/setting properties of the object.

In the preferred embodiment, the object may be any of various types of software, such as a software object according to the standard principles of object-oriented software, a software component, other types of re-usable software elements, or an application, among others. Where the object is a software object or component, the object node is executable to either invoke a method of the object, get and/or set one or more properties of the object, or access other capabilities of the object. Where the object is an application, the object node is operable to perform one or more of 1) initiate execution of the application; or 2) get/set one or more properties of the application. Also, the object may reside in the same computer where the graphical program is being created, or may reside in a different computer connected through a network.

In the preferred embodiment, the graphical program comprises a diagram or execution portion and a user interface portion, and the object node is comprised in the diagram portion. Alternatively, the object node may be comprised in the user interface portion. In this case where the object node is located in the user interface, the object is preferably comprised in the object node, and the object node operates to manipulate the object. For example, the document comprised in the object node, wherein the object node is operable to display object may be a changes to the document during execution of the graphical program. As another example, the object may be a user interface element, such as a control or indicator, wherein the object node is operable to affect the data input to or output from the control or indicator - - - . - - - .

EMBODIMENTS OF THE INVENTION

The following comprise various embodiments of the present invention. FIGS. 8–36 illustrate one embodiment of the present invention used for creating a graphical program, wherein the graphical program is executable to access capabilities of one or more objects. FIGS. 37–50 illustrate a specific embodiment of FIGS. 8–36, where the object whose capabilities are being accessed is an application, such as a graphical program application, e.g., LabVIEW. FIGS. 51–55 illustrate an embodiment where the object node is a user interface element, such as an ActiveX container, which manipulates data on objects comprised in the node.

FIGS. 8–36: First Embodiment
Graphical Program Client Creation

Figure 7:
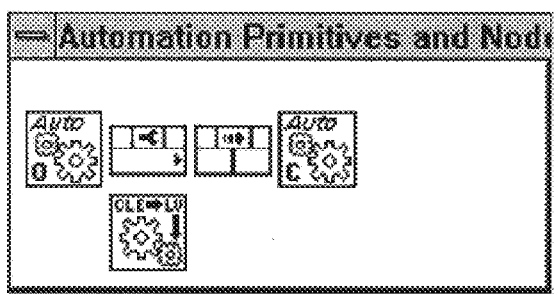
FIG. 7 is a screen shot illustrating the automation nodes palette.
Figure 8:
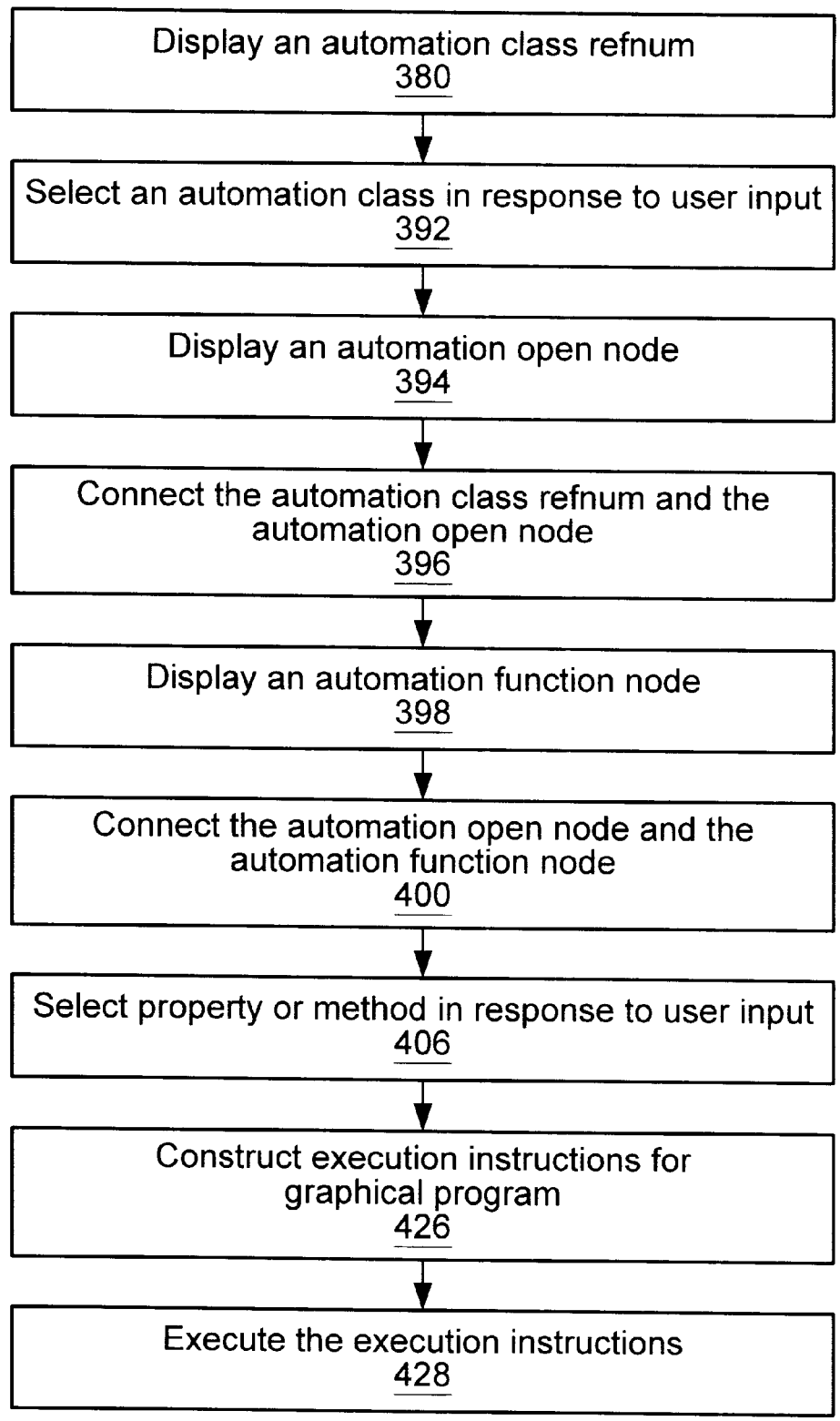
FIG. 8 is a flowchart illustrating steps taken to create and use a graphical automation client program of FIG. 3.
Figure 8A:
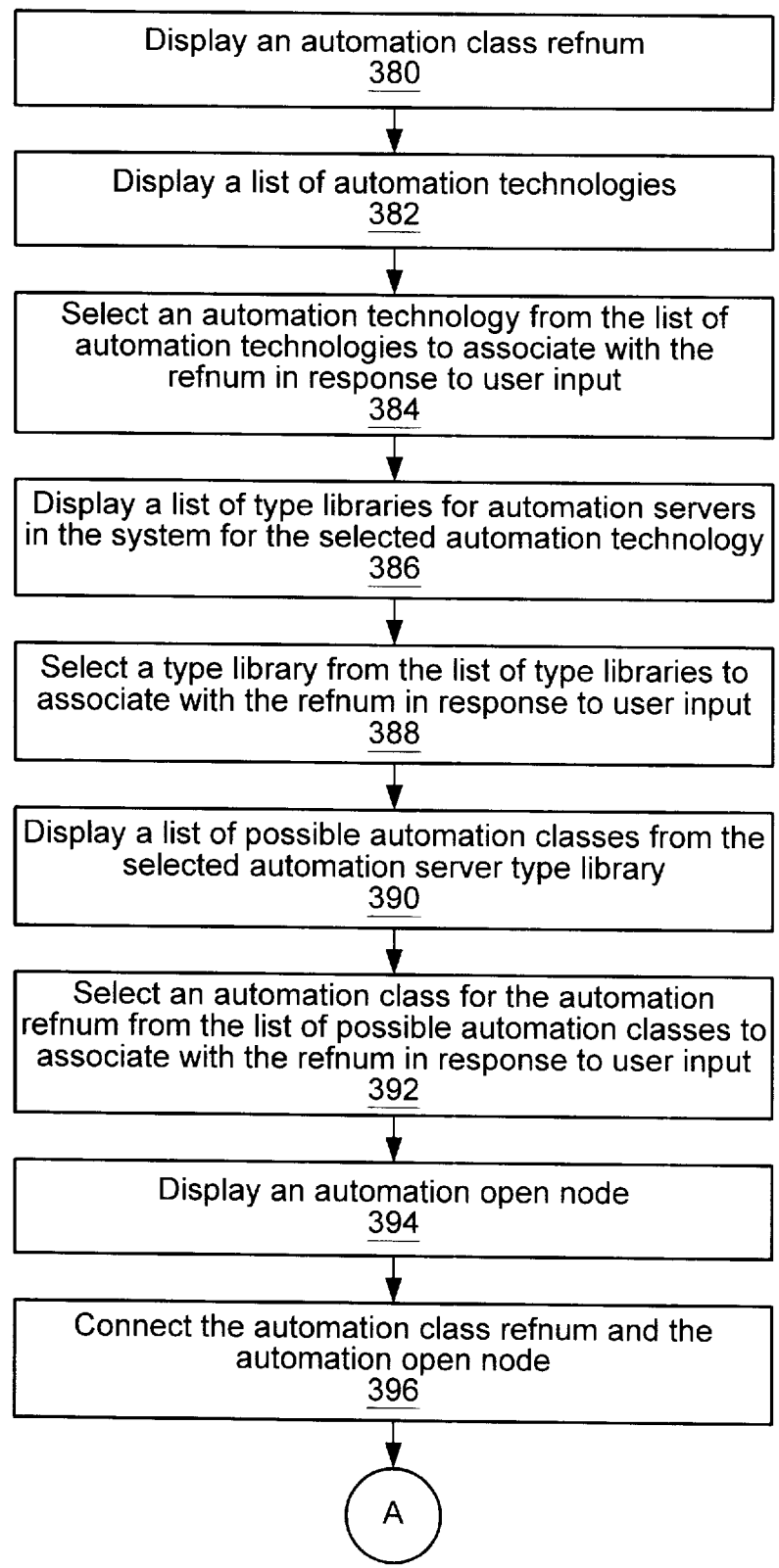
FIGS. 8a, 8b, and 8c are a flowchart illustrating steps taken to create and use a graphical automation client program in more detail than the flowchart of FIG. 8.
Figure 8B:
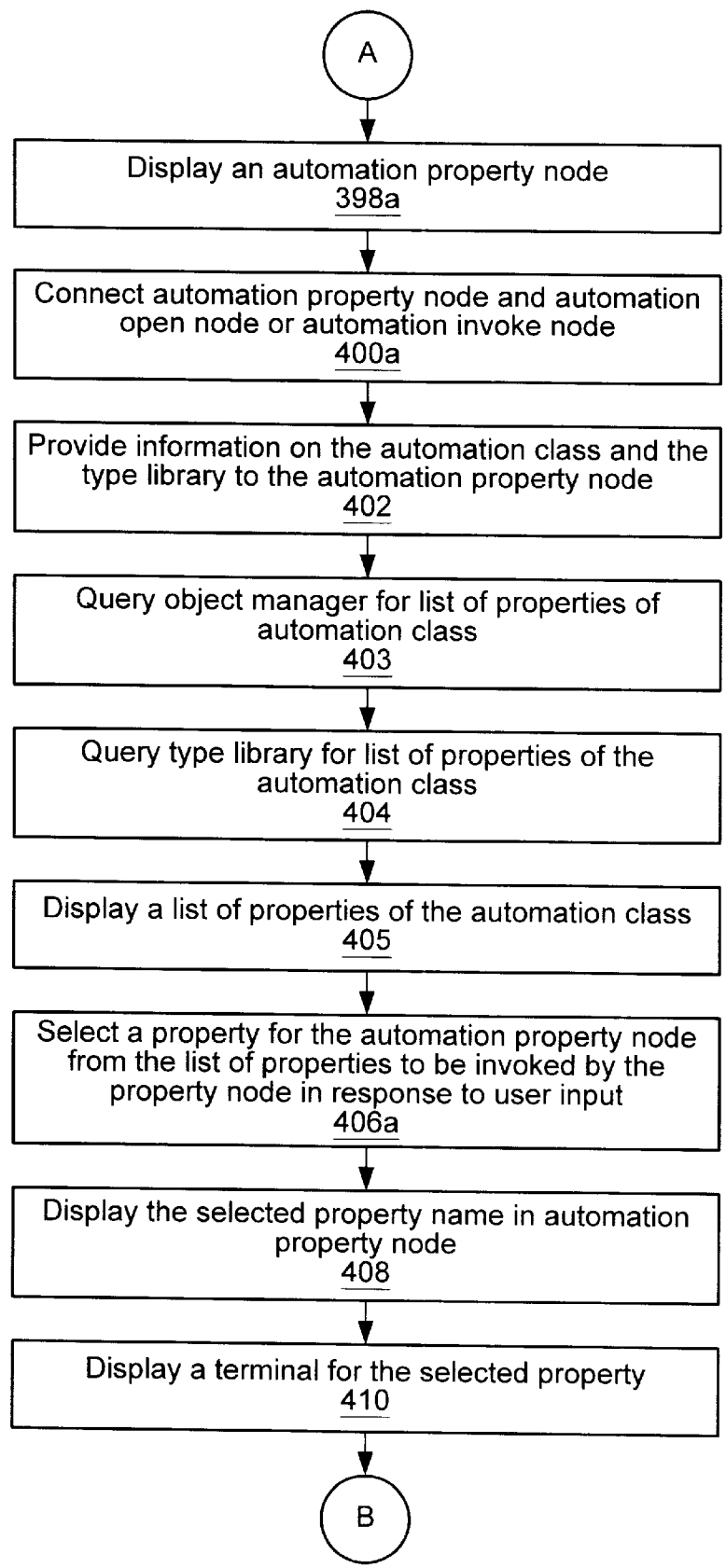
Figure 8C:
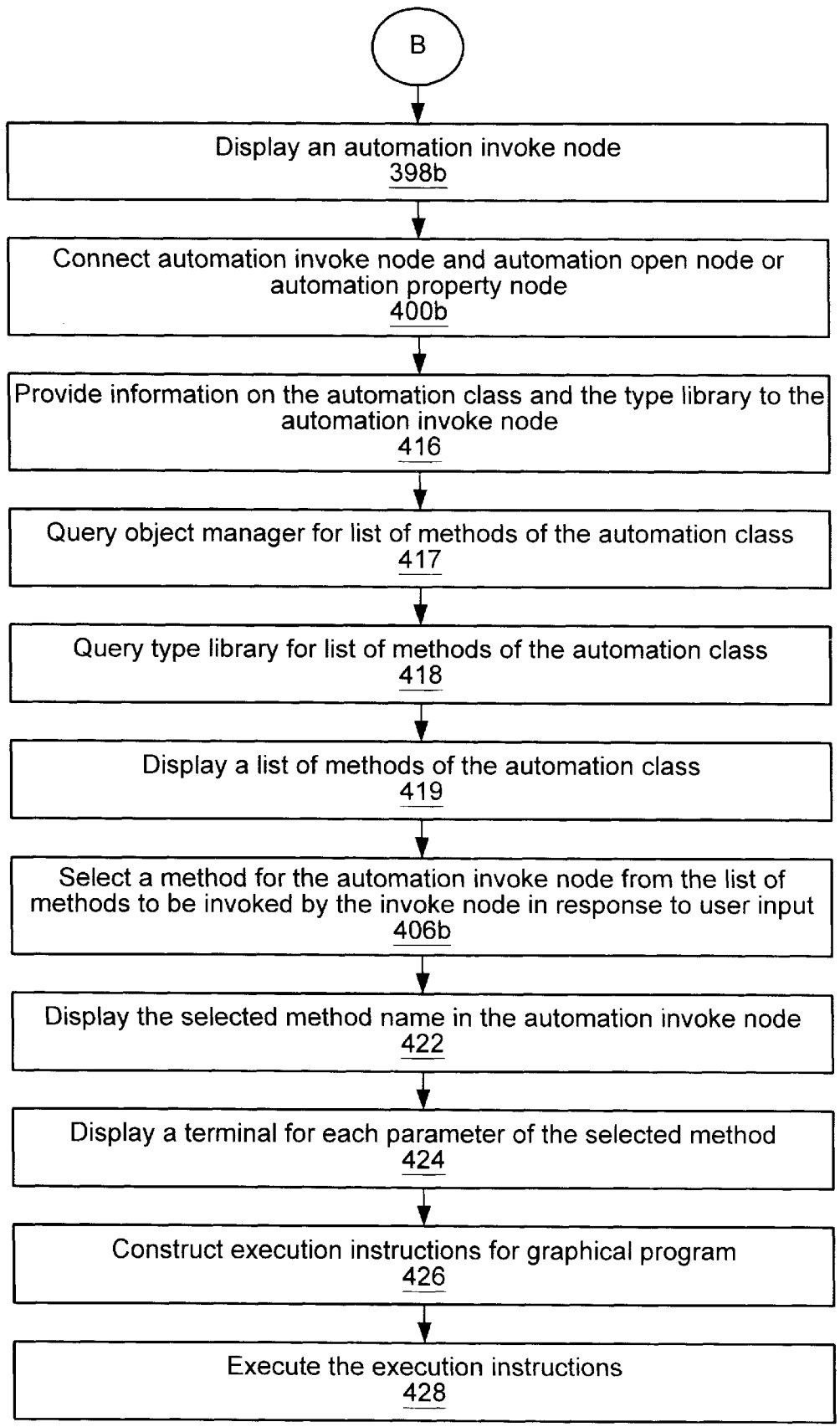
Figure 9:
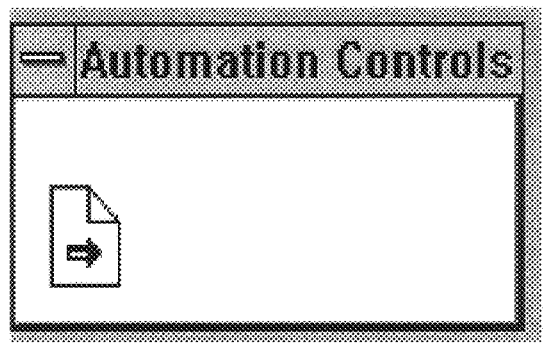
FIG. 9 is a screen shot illustrating the automation control refnum palette.

FIG. 8 is a flowchart illustrating steps taken to create a graphical program, referred to as a graphical program client or graphical automation client, according to the preferred embodiment of the method. The flowchart of FIG. 8 provides a high level view of the method of the preferred embodiment. The flowchart of FIGS. 8a–8c provide a more detailed view of the method of this embodiment. Thus the flowchart of FIG. 8 provides a high level view of the steps of the flowchart of FIGS. 8a, 8b, and 8c, and corresponding steps are numbered identically. The screen shot of FIG. 6 illustrates an example graphical program created according to the flowchart of FIG. 8. The nodes illustrated in FIG. 7 are example object nodes, referred to as automation function nodes, which are used in the flowchart of FIG. 8. In this description, the terms "automation" and "object" are used substantially interchangeably.

As shown in FIG. 8, the user drops or places an automation control icon on a virtual instrument front panel, and in response the block diagram editor 264 displays a corresponding automation class refnum icon in the block diagram, in step 380. The user then selects an automation class to associate with the automation refnum. The automation refnum receives the user input and associates the user-selected automation class with the automation refnum, in step 392.

The user drops an automation open node on the block diagram and in response the block diagram editor 264 displays an automation open node icon, in step 394. The user connects the automation refnum and the automation open node and in response the block diagram editor 264 displays a wire connecting the automation refnum and the automation open node, in step 396.

The user drops an automation function node in the block diagram and in response the block diagram editor 264 displays an automation function node, in step 398. An automation function node preferably comprises an automation property node or an automation invoke node. In one embodiment, an automation function node may perform functions or access capabilities of automation objects other than invoking methods and properties, such as event handling, i.e., the automation function node may be an automation event node. The user connects the automation open node and the automation function node and in response the block diagram editor 264 displays a wire connecting the automation open node and the automation function node, in step 400. The user may drop both an automation invoke node and an automation property node in creating the graphical automation client. Furthermore, the user may drop one or more of both automation property nodes and automation invoke nodes in order to invoke multiple properties and/or methods in creating the graphical automation client. Alternatively, a single invoke node may be configured to invoke multiple methods and a single property node may be configured to get/set multiple properties.

The user then selects a property or method and in response the automation property node or automation invoke node receives the user input and associates the user-selected property or method, respectively, with the automation property node or automation invoke node, respectively, in step 406.

The graphical programming environment then constructs execution instructions based on the graphical program comprising the automation refnum, automation open node, automation property node and/or automation invoke node, and wires, in step 426. The graphical programming environment then executes the execution instructions, in step 428. A more detailed description of the steps of FIG. 8 is given below with regard to FIGS. 8a, 8b, and 8c.

In the embodiment of FIG. 8, the user selects the object class in steps 382 and 392 utilizing an automation class refnum, and in steps 394 and 396 an automation open node is placed in the block diagram, which operates to instantiate an object of the selected class. In one embodiment, a single refnum or node is used to both select the object class and instantiate the object. Alternatively, selection of the class and instantiation of the object are performed when the object node is displayed in step 398. In this latter embodiment, when the user selects the object node or automation function node for inclusion in the graphical program, at that time the user selects the desired class and then selects the methods and/or properties. An object from this selected class is then instantiated by the object node at run-time.

FIGS. 8a, 8b, and 8c are a more detailed flowchart illustrating steps taken to create a graphical automation client according to the preferred embodiment of the method. The flowchart of FIGS. 8a–8c illustrates an embodiment which presumes the use of an automation close refnum and an open node to select the class and instantiate the object, respectively. A user drags, preferably using a mouse, an automation control from a refnum palette, shown in FIG. 9, and drops the automation control on a VI front panel.

In response to the user dropping the automation refnum, the front panel editor 262 displays an automation control in the front panel, and the block diagram editor 264 displays an automation refnum associated with the automation control in a block diagram in step 380. Alternatively, the user drops an automation refnum from the palette of FIG. 7 and the front panel editor 262 invokes a method of the automation control 274 to draw an automation control icon in the front panel.

Preferably, the automation control 274 comprises a draw method which the front panel editor 262 and block diagram editor 264 invoke in order to display an automation control icon in the front panel and to display an automation refnum icon in the block diagram, respectively. FIG. 8 shows an automation refnum displayed in a block diagram. FIG. 8 also shows a pop-up menu for the automation refnum including a "Select OLE Class" menu item with a "Browse" item. Preferably, the user right clicks a mouse on the automation refnum in order to see the pop-up menu.

In one embodiment, an automation client program, i.e., a VI, developed using the graphical programming environment is capable of invoking methods of and modifies attributes of objects via a plurality of automation technologies, including Microsoft Automation. Examples of other automation technologies are OpenDoc and the Common Object Request Broker Architecture (CORBA). In this embodiment, the object manager 68 obtains a list of automation technologies in the system. The automation refnum queries the object manager 268 for the list and displays the list of automation technologies for the user in step 382. The user selects one of the automation technologies from the displayed list of automation technologies. In response to the user selection, the automation refnum selects the automation technology from the list of automation technologies and associates the selected automation technology with the automation refnum in step 384.

The automation refnum is a reference to a user-selected automation class. The automation refnum includes a refnum output terminal, to which a wire may be connected. At edit-time, the automation refnum provides, at its output terminal, a type descriptor which specifies an automation class and the type library to which the automation class belongs. The type library is one of the type libraries 270 of FIG. 3. Type descriptors will be described in detail below. The time during which a user is creating, i.e., editing a VI 50, by dropping nodes and wiring them together, is referred to as "edit-time." The time when instructions of the VI 50 are executed is referred to as "run-time".

Referring again to FIG. 8a, in response to user input, the automation refnum queries the object manager 268 for a list of type libraries 270 (of FIG. 3) associated with the automation servers present in the system. The automation refnum displays the list of type libraries 270 associated with the automation servers in step 386. Preferably, the object manager 268 provides the automation refnum with a list of OLE Automation type libraries in the system. In one embodiment, the object manager 268 provides the automation refnum with a list of type libraries for each automation technology in the system.

Figure 11:
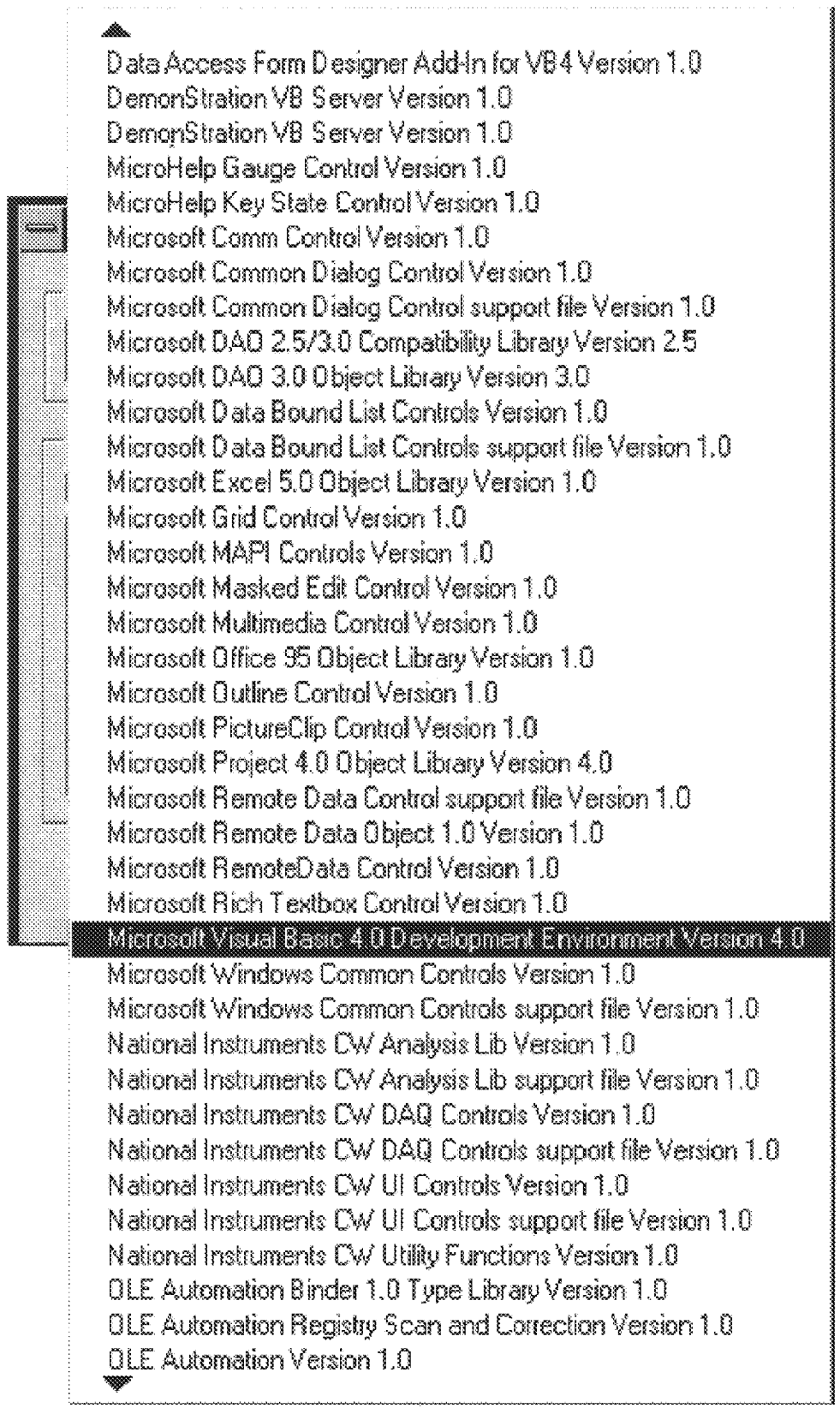
FIG. 11 is a screen shot illustrating an exemplary list of the type libraries associated with the OLE Automation servers present in a system.
Figure 12:
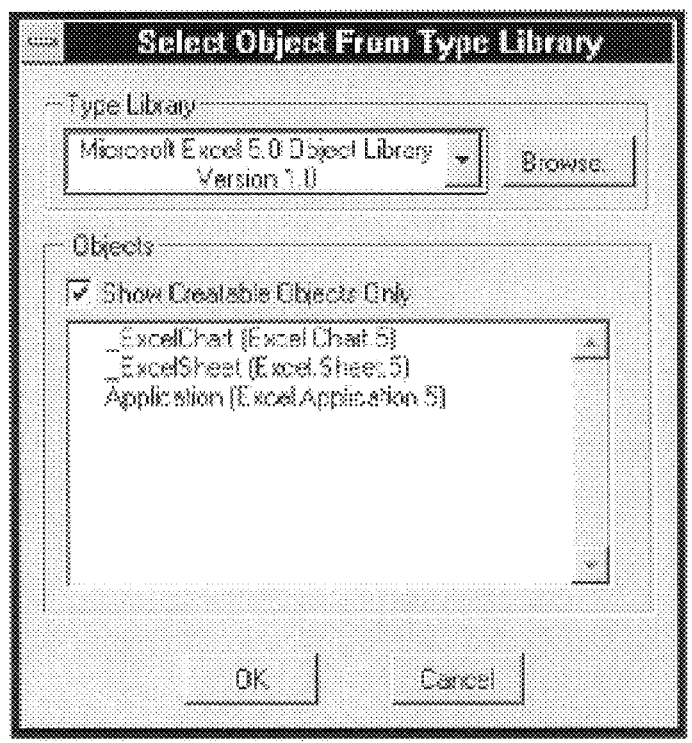
FIG. 12 is a screen shot illustrating a type library browse menu selected from the pop-up menu of FIG. 10.

Preferably, the user input includes the user clicking on the "Browse" item of the "Select OLE class" item of the automation refnum pop-up menu, shown in FIG. 12, and selecting the pull-down menu in the "Type Library" window shown in FIG. 12. Preferably, the object manager 268 queries the Windows Registry to obtain a list of OLE Automation type libraries present in the system. Preferably, the automation refnum displays the type libraries associated with the OLE Automation servers present in the system, as shown in FIG. 11. In one embodiment, the automation refnum displays the type libraries associated with the automation technology which was selected in step 384.

The user selects one of the type libraries from the displayed list of type libraries. In response, the automation refnum selects the type library from the list of type libraries and associates the selected type library with the automation refnum in step 388. At edit-time the automation refnum provides a type descriptor, including information identifying the selected type library, to other automation nodes of the VI 50. FIG. 12 shows the user having selected the "Microsoft Excel 5.0 Object Library Version 1.0" type library from the list of FIG. 11.

In response to the user having selected a type library, the automation refnum queries the object manager 268 for a list of possible automation classes associated with the selected type library in step 390. The object manager 268 queries the selected type library for a list of possible automation classes in the type library. The object manager 268 receives the list of automation classes from the type library and provides the list to the automation refnum. The automation refnum receives the list from the object manager 68 and displays the list, as shown in FIG. 12. FIG. 12 shows the list of possible Microsoft Excel 5.0 automation classes from which automation objects may be instantiated. Preferably, the user may choose for the automation refnum to selectively display only those objects which are creatable, as shown in FIG. 12.

Figure 13:
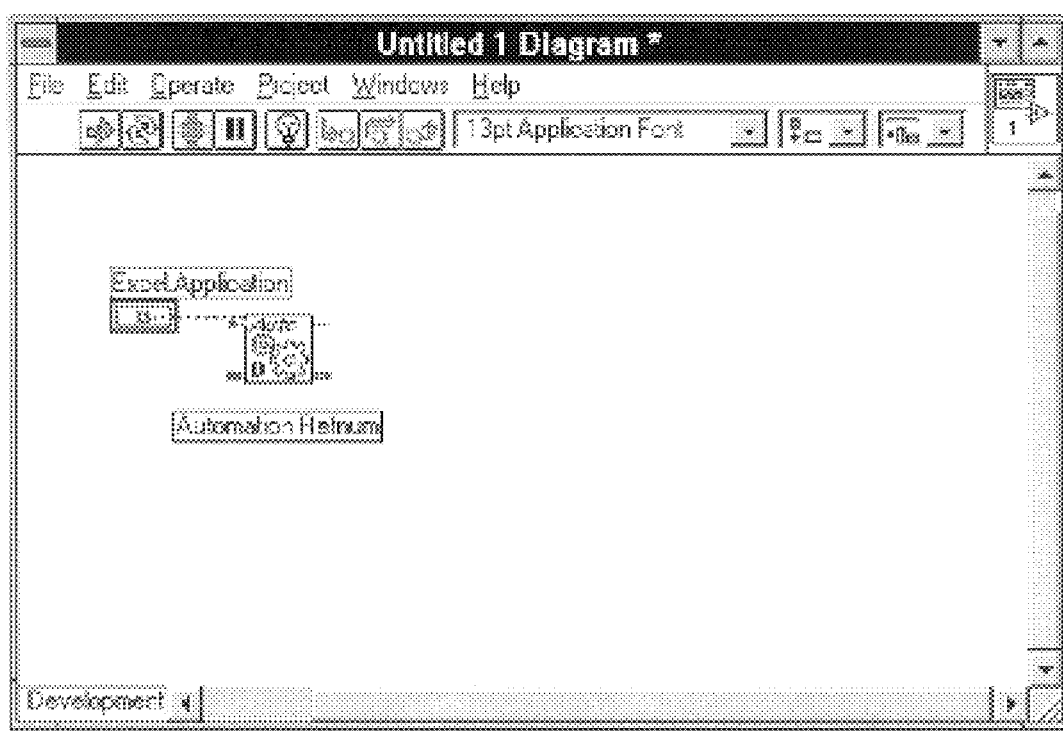
FIG. 13 is a screen illustrating an automation class having been chosen for the automation refnum of FIG. 10 and an automation open node being wired to the automation refnum.

The user selects an automation class from the displayed list of automation classes. In response, the automation refnum selects the automation class from the list of automation classes and associates the selected automation class with the automation refnum in step 392. At edit-time the automation refnum provides a type descriptor, including information identifying the selected automation class, to other automation nodes of the VI 50. FIG. 13 shows the user having selected the "Excel Application" automation class from the list of FIG. 12. Thus, the system and method displays an automation refnum icon which is used to indicate an input type library and automation class.

Below an automation open node is described in detail. In one embodiment, the system and method displays the automation open node icon which is used to indicate the type library and automation class information input from a user, rather than the automation refnum. That is, the automation open node serves the function of the automation refnum by receiving the type library and automation class information from the user and displaying the selected information.

Type Descriptor

Each wire and terminal in a block diagram has an associated data type. The programming environment keeps track of the data type in a structure in memory called a type descriptor. The type descriptor comprises a string of word integers that describe the data type. The generic format of a type descriptor is:

<size> <typecode>.

Table 1 lists three of the supported data types, the type codes, and type descriptors in one embodiment of the programming environment.

TABLE 1

| Data Type | Type Code | Type Descriptor |
|---|---|---|
| Long Integer | 0x03 | 0004 xx03 |
| Handle | 0x31 | 0006 xx31 <kind> |
| Array | 0x40 | <nn> 0x40 <k> <k dimensions> <element type descriptor> |

When a wire is initially connected to a terminal, the wire takes on the data type of the terminal. i.e., the programming environment creates a type descriptor for the wire. When the user connects this wire to another terminal in the block diagram at edit-time, the programming environment performs type propagation checking by comparing the type descriptor of the wire with the type descriptor of the terminal. If the type descriptors do not match, then a type conflict error is generated. In one embodiment, the programming environment performs type propagation checking on each wire and terminal in the block diagram each time a change is made to the diagram. That is, type descriptors are propagated on the wires of the block diagram at edit-time in order to perform type propagation checking.

The method advantageously comprises a new type descriptor for the automation refnum terminal. The automation refnum terminal type descriptor includes an identifier for the automation class associated with the automation refnum and an identifier for the type library for the automation class. In one embodiment, the automation refnum type descriptor has the format:

<size> <RefnumCode> <AutoRefnumKind> <AutomationType> <no of int16's> <kCoClassCLSID> <CLSID of created object> <kTypeLibCLSID> <CLSID of type library> <DISPID>.

The <size> byte of the type descriptor is as described above. The <refnumCode> is the type code for a refnum. The <AutoRefnumKind> value distinguishes this refnum from other refnums as an automation refnum. The <Automation-Type> indicates the OLE automation type, such as the <kStOLEAutoType> value which indicates a static OLE automation type. The <no of intl6's> field indicates the number of 16 bit words which follow. The <kCoClass-CLSID> value indicates the following 128 bits are a class identifier. The <CLSID of created object> is a unique 128 bit number associated with the particular automation class which the automation refnum references. The <kTypeLib-CLSID> value indicates the following 128 bits are a type library identifier. The <CLSID of type library> is a unique 128 bit number associated with the particular type library to which the automation class belongs. The <DISPID> is a Dispatch ID, which is a long integer which uniquely specifies a class within a type library. The Dispatch ID is associated with the Microsoft IDispatch interface for dispatch methods and properties. The Dispatch ID is unique within a type library. In the example shown in FIG. 11, the type descriptor provided by the automation refnum includes information to specify the Microsoft "Excel" automation application type library and the "Application" automation class.

The automation nodes comprise a type propagation checking method which may be invoked by the block diagram editor 64 to perform type propagation checking. When the user connects a wire to a terminal of an automation node, the type propagation method of the node is invoked and the type descriptor of the wire being connected to the terminal is passed as an argument to the type propagation method. This information in the type descriptor enables the type propagation method to advantageously determine class conflicts in the block diagram.

Thus, the method advantageously performs type propagation checking to determine program correctness when wiring automation function nodes. This checking advantageously prevents run-time errors which would occur when the user attempted to invoke a method or property which is invalid for the automation class selected. Type propagation checking is discussed further below.

The user creates an automation open node for instantiating an object from the automation class referred to by the automation refnum. Preferably, the user drags an automation open node from the automation nodes palette of FIG. 7 and drops the automation open node on the block diagram.

In response to the user dropping the automation open node on the block diagram, the block diagram editor 264 displays an automation open node in the block diagram, as shown in FIG. 13, in step 394. Preferably, the block diagram editor 264 invokes a draw method of the automation open node to display an automation open node icon in the block diagram. At run-time, the automation open node instantiates an object based on the automation class and type library information received from the automation refnum.

The system then connects the automation refnum to the automation open node in response to user input. The user wires the automation open node to the automation refnum using a wiring tool. In response, the block diagram editor 264 displays a wire connecting the automation open node and the automation refnum in step 396. The automation refnum provides the automation class and type library information to the automation open node so that the automation open node may perform type propagation checking.

The automation open node includes a refnum input terminal which is designed to receive an output from an automation refnum icon. In an embodiment where an automation refnum icon is not used to designate class and type library information, the automation open node receives the class and type library information by other means, preferably via user input in a similar manner which the automation refnum received the class and type library information. At edit-time, the automation open node receives a type descriptor on the wire, such as from the automation refnum, which includes type library and automation class information. The automation open node also includes a refnum output terminal, to which a wire may be connected. At edit-time, the automation open node forwards the type descriptor received at its refnum input terminal to the refnum output terminal. The type descriptor is forwarded on a connected wire to all other nodes connected to the wire.

At run-time, the automation open node provides a reference to the object instantiated by the automation open node on the wire connected to the refnum output terminal. Automation nodes, such as automation invoke nodes and automation property nodes, receive the object reference in order to invoke methods and properties of the object as will be described below.

Figure 16:
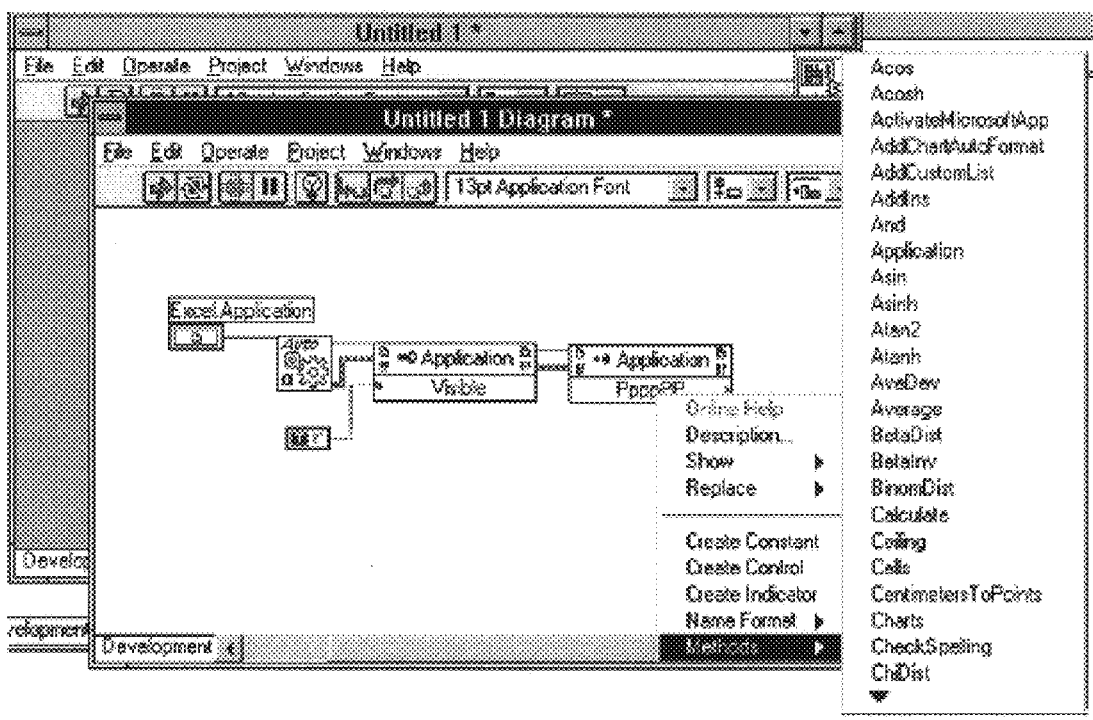
FIG. 16 is a screen shot illustrating an automation invoke node wired to the automation property node of FIG. 14 and a list of methods of the automation class which was chosen in FIG. 14.

The user creates an automation property node in order to invoke properties, i.e., to set or get properties, of the object instantiated by the automation open node. Preferably, the user drags an automation property node from the automation nodes palette of FIG. 7 and drops the automation property node on the block diagram, as shown in FIG. 16. The user may also create an automation property node via the pop-up menu of the automation open node.

In response to the user dropping the automation property node, the block diagram editor 264 invokes a method on the automation property node to display an automation property node icon in the block diagram in step 398*a*. The automation property node is used to invoke properties of the object. The properties to be invoked by the automation property node are selected by the user creating the VI 50.

The user wires the automation property node to the automation open node using a wiring tool. The automation property node includes a refnum input terminal through which the automation property node receives an object reference and type descriptor. In response to the user wiring the automation property node and the automation open node, the block diagram editor 64 displays a wire connecting the refnum input terminal of the automation property node and the refnum output terminal of the automation open node in step 400*a*.

It is noted that the refnum input terminal of the automation property node may instead be connected to other wires which provide the reference to the object and type descriptor rather than the automation open node refnum output terminal. For example, the refnum input terminal of the automation property node may be connected to the refnum output terminal of another automation property node of the same object or to the refnum output terminal of an automation invoke node of the same object.

At run-time, the automation property node receives a reference to the instantiated object via its refnum input terminal so that the automation property node may set or get properties of the instantiated object.

At edit-time, the automation property node receives a type descriptor via its refnum input terminal so that the automation property node may perform type propagation checking. The automation property node also uses the information in the type descriptor at edit-time to perform other operations, such as displaying property lists as described below.

The automation property node also includes a refnum output terminal. The automation property node passes the information received on its refnum input terminal to its refnum output terminal, i.e., the type descriptor, at edit-time and the object reference at run-time.

Figure 14:
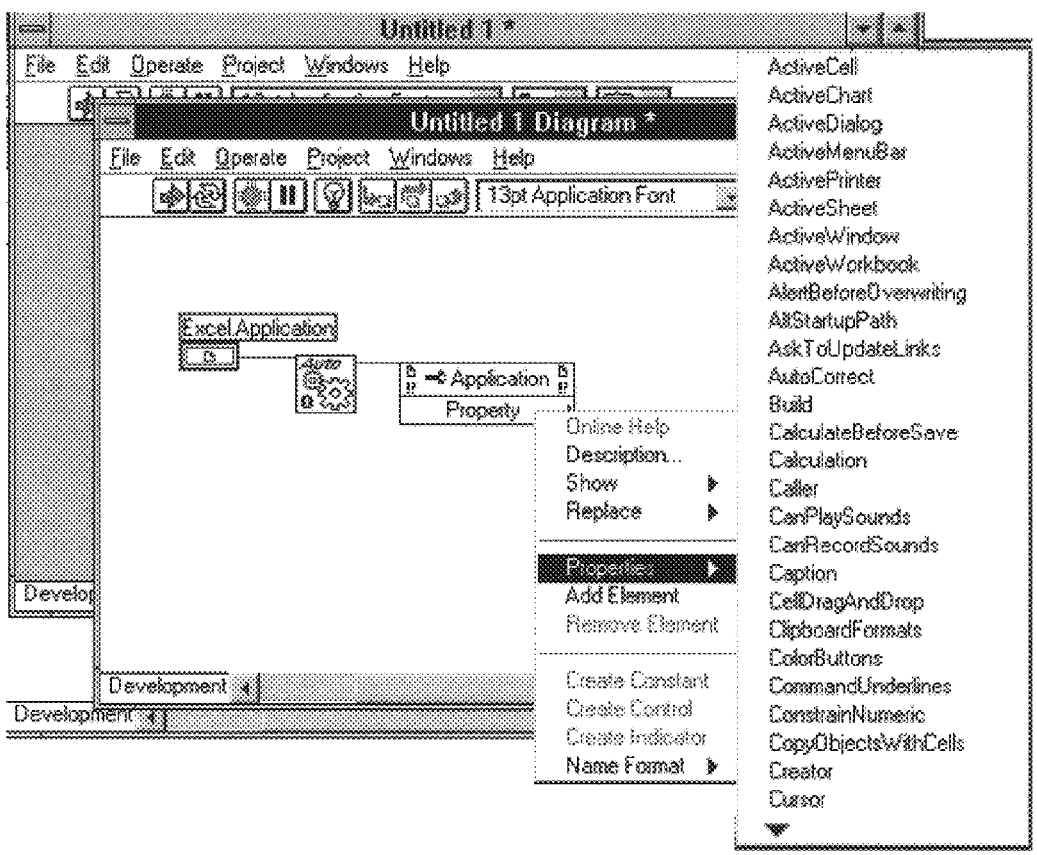
FIG. 14 is a screen shot illustrating an automation property node wired to the automation open node of FIG. 13 and a list of properties of the automation class which was chosen in FIG. 13.

Preferably, the user selects the "Properties" menu item from the automation property node pop-up menu in order to view a list of properties associated with the automation class, as shown in FIG. 14. In response to the user selecting the Properties item, the automation open node (or other automation node) provides information on the selected automation class and selected type library to the automation property node in step 102. Preferably, providing information on the automation class and selected type library includes providing a type descriptor which includes the information.

Using the automation class and type library information, the automation property node queries the object manager 268 for a list of properties associated with the selected automation class in step 403. In response, the object manager 268 queries the selected type library for a list of properties of the specified automation class in step 404. The object manager 68 receives the list of properties from the type library and provides the list to the automation property node. The automation property node uses the information received from the object manager 268 to display the list of properties of the selected automation class, as shown in FIG. 14, in step 405.

Figure 15:
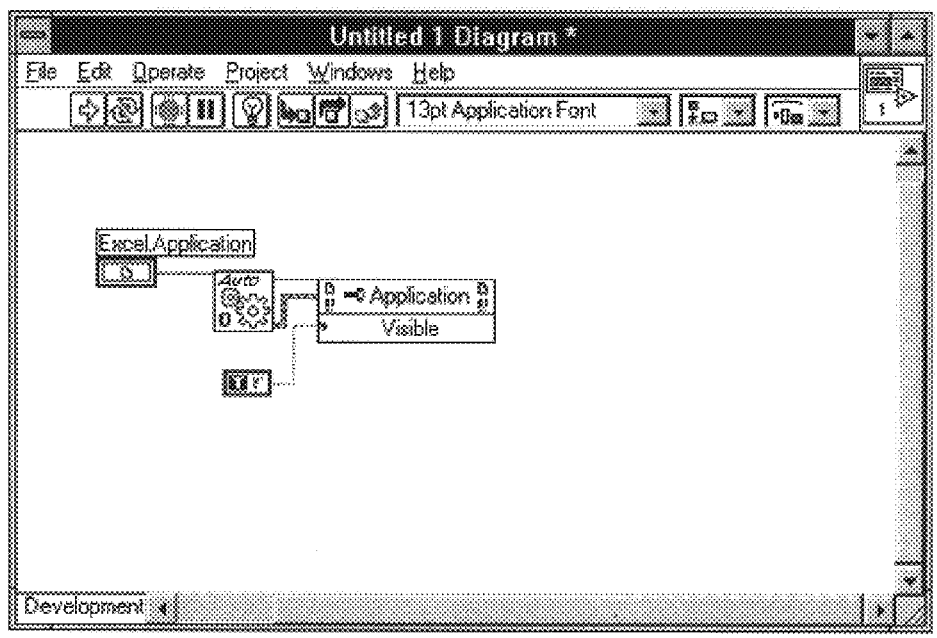
FIG. 15 is a screen shot illustrating a property having been chosen for the automation property node of FIG. 14.

The user selects one of the properties in the displayed list of properties. In response to the user selection, the automation property node selects the selected property to be invoked by the automation property node in step 406a. The automation property node displays the selected property in the automation property node, as shown in FIG. 15, in step 408. FIG. 15 shows a "Visible" property displayed in the Excel Application automation property node.

The automation property node displays a terminal for the selected property, as shown in FIG. 15, in step 410. If the property may be set, i.e., written, the automation property node displays an input terminal. If the property may be gotten, i.e., read, the automation property node displays an output terminal. Preferably, a property may be set to be readable or writable in response to user input. In FIG. 15, the Visible property includes an input terminal since the property may be set, i.e., changed. The Visible property input terminal receives a Boolean, i.e., True/False, input value which may be toggled on the front panel in response to user input.

In a similar manner, the user is enabled to add more properties to the automation property node for the purpose of invoking the properties of the object. Typically, the properties are set via controls on the front panel associated with the block diagram or gotten and displayed on indicators on the front panel. In addition, the properties may be invoked programmatically using nodes and terminals of the VI 50.

The user creates an automation invoke node in order to invoke methods of the object instantiated by the automation open node. Preferably, the user drags an automation invoke node from the automation nodes palette of FIG. 7 and drops the automation invoke node on the block diagram, as shown in FIG. 16. The user may also create an automation invoke node via the pop-up menu of the automation open node.

In response to the user dropping the automation invoke node, the block diagram editor 64 invokes a method on the automation invoke node to display an automation invoke node icon in the block diagram in step 398b. The automation invoke node is used to invoke methods of the object. The methods to be invoked by the automation invoke node are selected by the user creating the VI 50.

The user wires the automation invoke node to the automation open node using a wiring tool. The automation invoke node includes a refnum input terminal through which the automation invoke node receives an object reference and type descriptor. In response to the user wiring the automation invoke node and the automation open node, the block diagram editor 264 displays a wire connecting the refnum input terminal of the automation invoke node and the refnum output terminal of either the automation open node or an automation property node in step 400b.

It is noted that the refnum input terminal may instead be connected to other wires which provide the reference to the object and type descriptor rather than the automation open node refnum output terminal. For example, the refnum input terminal of the automation invoke node may be connected to the refnum output terminal of another automation invoke node of the same object or to the refnum output terminal of an automation property node of the same object.

At run-time, the automation invoke node receives a reference to the instantiated object via its refnum input terminal so that the automation invoke node may invoke methods of the instantiated object.

At edit-time, the automation invoke node receives a type descriptor via its refnum input terminal so that the automation invoke node may perform type propagation checking. The automation invoke node also uses the information in the type descriptor at edit-time to perform other operations, such as displaying method lists as described below.

The automation invoke node also includes a refnum output terminal. The automation invoke node passes the information received on its refnum input terminal to its refnum output terminal, i.e., the type descriptor, at edit-time and the object reference at run-time.

Preferably, the user selects the "Methods" menu item from the automation invoke node pop-up menu in order to view a list of invoke associated with the automation class, as shown in FIG. 16. In response to the user selecting the Methods item, the automation open node (or other automation node) provides information on the selected automation class and selected type library to the automation invoke node in step 416. Preferably, providing information on the automation class and selected type library includes providing a type descriptor which includes the information.

Using the automation class and type library information, the automation invoke node queries the object manager 268 for a list of methods associated with the selected automation class in step 417. In response, the object manager 268 queries the selected type library for a list of methods of the specified automation class in step 418. The object manager 68 receives the list of methods from the type library and provides the list to the automation invoke node. The automation invoke node uses the information received from the object manager 268 to display the list of methods of the selected automation class, as shown in FIG. 16, in step 419.

Figure 17:
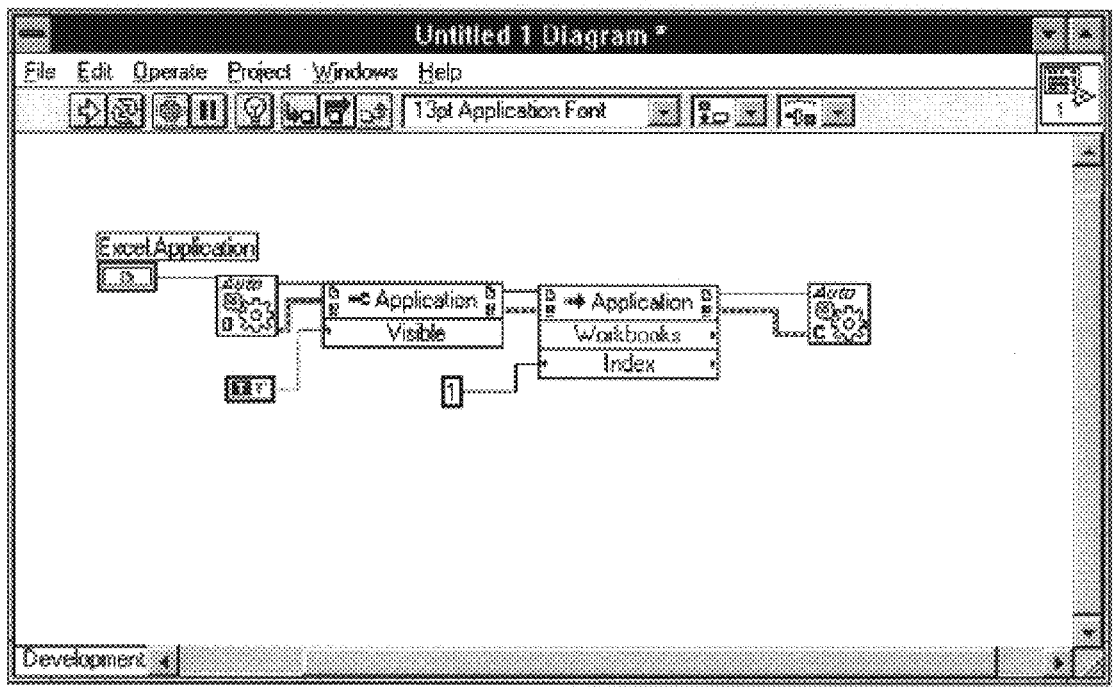
FIG. 17 is a screen shot illustrating a method having been chosen for the automaton invoke node of FIG. 16.

The user selects one of the methods in the displayed list of methods. In response to the user selection, the automation invoke node selects the selected method to be invoked by the automation invoke node in step 406b. The automation invoke node displays the selected method in the automation invoke node, as shown in FIG. 17, in step 422. FIG. 17 shows a "Workbooks" method displayed in the Excel Application automation invoke node.

The automation invoke node displays a terminal for each of the parameters of the selected method, as shown in FIG. 17, in step 424. If the method includes input parameters, the automation invoke node displays an input terminal for each input parameter. If the includes output parameters, the automation invoke node displays an output terminal for each of the output parameters. In FIG. 17, the Workbooks method includes an "Index" parameter. An input terminal and an output terminal are displayed for the Index parameter since it is both an input and output parameter. The Index input terminal receives an integer input value which may be specified on the front panel in response to user input. In addition, the Workbooks method returns an output parameter, and FIG. 17 displays an output terminal for the Workbooks method.

FIG. 17 also shows an automation close node wired to the automation invoke node for freeing, i.e., deconstructing, the instantiated object at run-time referenced on the wire connecting the automation invoke node refnum output terminal and the automation close node refnum input terminal.

It is noted that the order in which an automation refnum, an automation open node, an automation property node, and an automation invoke node are dropped, wired, and configured is not fixed. For example, the automation open node could be dropped first. The automation open node includes a "Configure" item in its pop-up menu which automatically creates a configured automation control and associated automation refnum, and wires the automation refnum output terminal to the automation open node refnum input terminal. In another example, an automation property node and an automation invoke node may be wired together in "parallel". That is, the automation refnum input terminal of each of an automation invoke node and an automation property node may be wired to the same wire emanating from the automation refnum output terminal of an automation open node.

Furthermore, a graphical automation client may be created with just an automation invoke node and no automation property node or a graphical automation client may be created with just an automation property node and no automation invoke node. That is, steps 298*a* through 410, and steps 426 and 428 could be performed without steps 398*b* through 424 being performed. Likewise, steps 398*b* through 428 could be performed without steps 398*a* through 410 being performed.

Once the user has created the VI 50, the user instructs the graphical programming environment to construct execution instructions in accordance with the nodes in the block diagram in step 426. Preferably, constructing the execution instructions comprises generating machine language instructions into an executable program. Alternatively, constructing the execution instructions comprises generating programming language instructions, such as C language instructions, and compiling the programming language instructions into an executable program. In one embodiment, the user causes the execution instructions to be generated by clicking on the run button, indicated by a double wide right-pointing arrow at the far left of the toolbar of the front panel of FIG. 17. In addition, the user causes the execution instruction to be generated by saving the virtual instrument to a file via the File pull-down menu of FIG. 17.

Constructing the execution instructions includes invoking code generation methods for each of the automation nodes. The automation open node generates instructions to instantiate an object from the automation class indicated by the automation refnum. Preferably, the automation class and type library information is included in the execution instructions generated by the automation open node. The automation property node generates instructions for invoking the properties of the automation property node. The instructions set properties according to the values supplied at corresponding property input terminals and get property values and provide the values to corresponding output terminals. The automation invoke node generates instructions for invoking the selected method of the automation invoke node. The instructions invoke the method with the values supplied at the parameter input terminals and supply return values at the output terminals.

Once the execution instructions have been generated, the user directs the environment to execute the execution instructions. In response, the execution subsystem 256 (of FIG. 3) executes the execution instructions of the VI 50 in step 428. Preferably the user clicks the run button, or selects the run menu item from the Operate menu of FIG. 17, to execute the execution instructions. In one embodiment, the execution instructions are interpreted rather than compiled.

Thus, the method enables a user to create an automation client application by means of a graphical programming environment to instantiate objects from automation classes and invoke methods and properties of the automation objects.

Context-Sensitive Help Display

Figure 18:
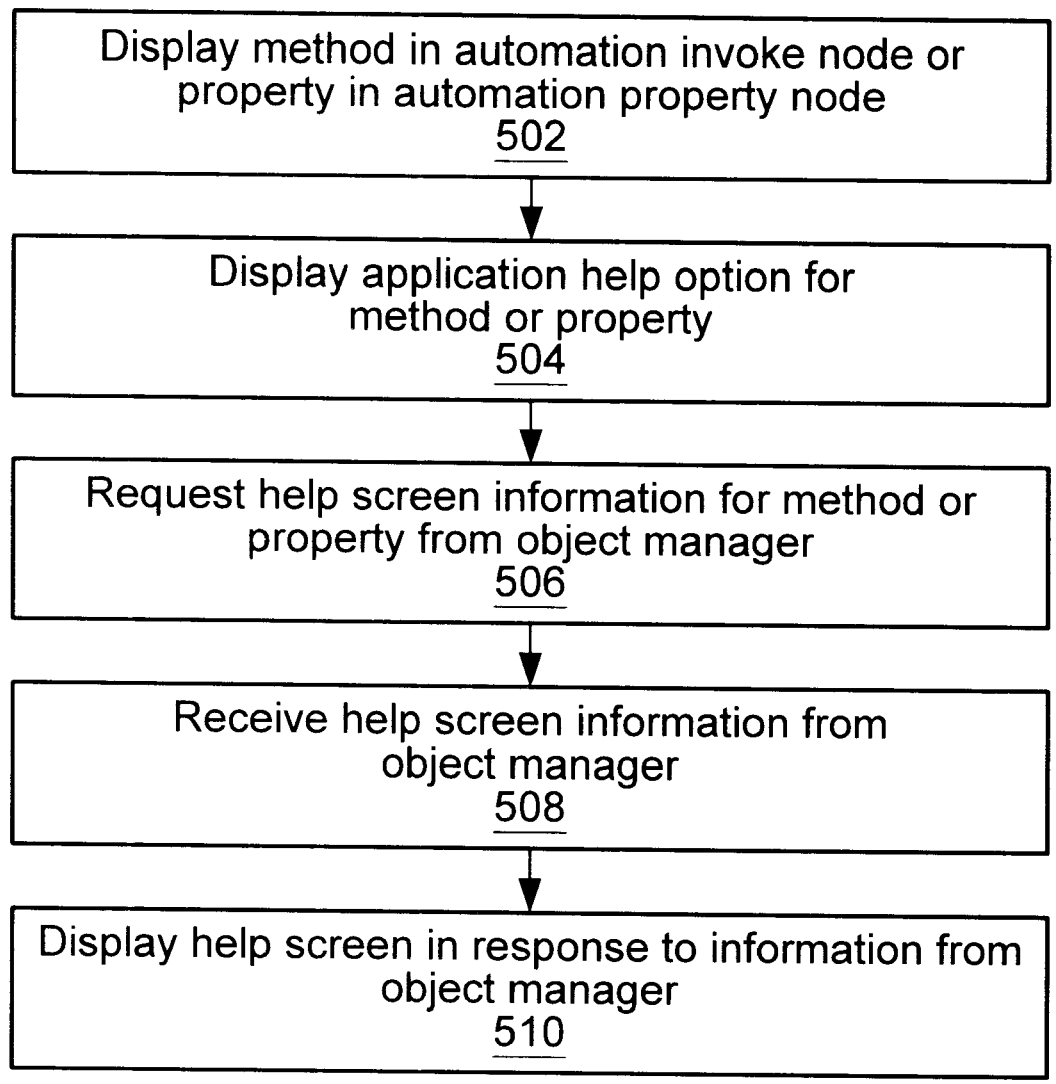
FIG. 18 is a flowchart illustrating steps taken to display an application help screen for an automation object according to the preferred embodiment of the present invention.
Figure 19:
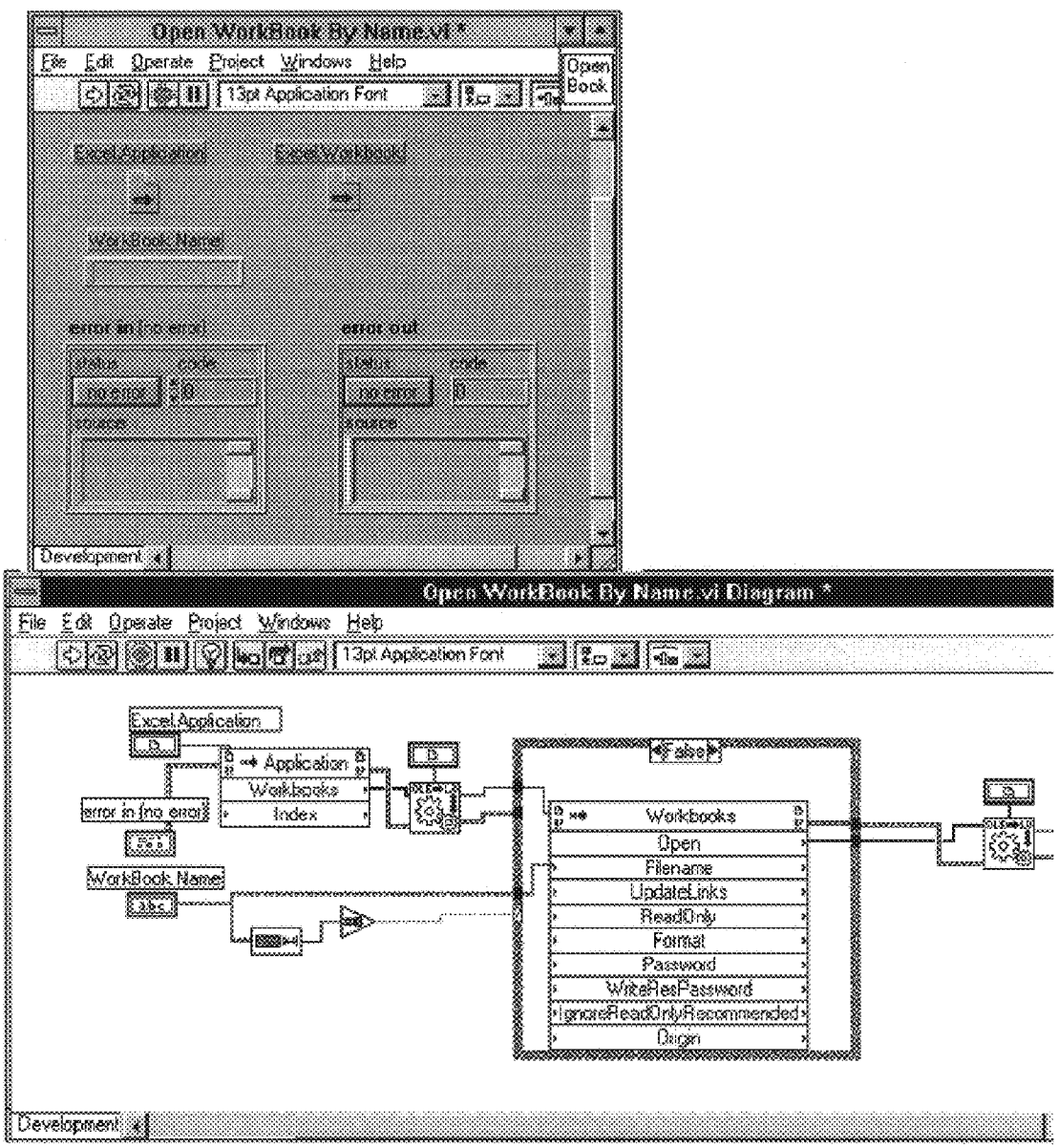
FIG. 19 is a screen shot illustrating the step of displaying a method of an automation invoke node according of the flowchart of FIG. 18.

FIG. 18 is a flowchart illustrating steps taken to display an application help screen for an automation object according to the preferred embodiment. A user creates a VI, such as the VI 50 of FIG. 3, according to the steps of the flowchart of FIG. 8. The VI includes an automation invoke node and/or an automation property node, referred to generically as an automation node. The block diagram editor 264 displays a method in an automation invoke node or a property in an automation property node, as shown in FIG. 19, in step 502. In particular, FIG. 19 shows a "Workbooks" method of "Application" automation class from the type library of an "Excel" automation server, i.e., an automation application.

Figure 20:
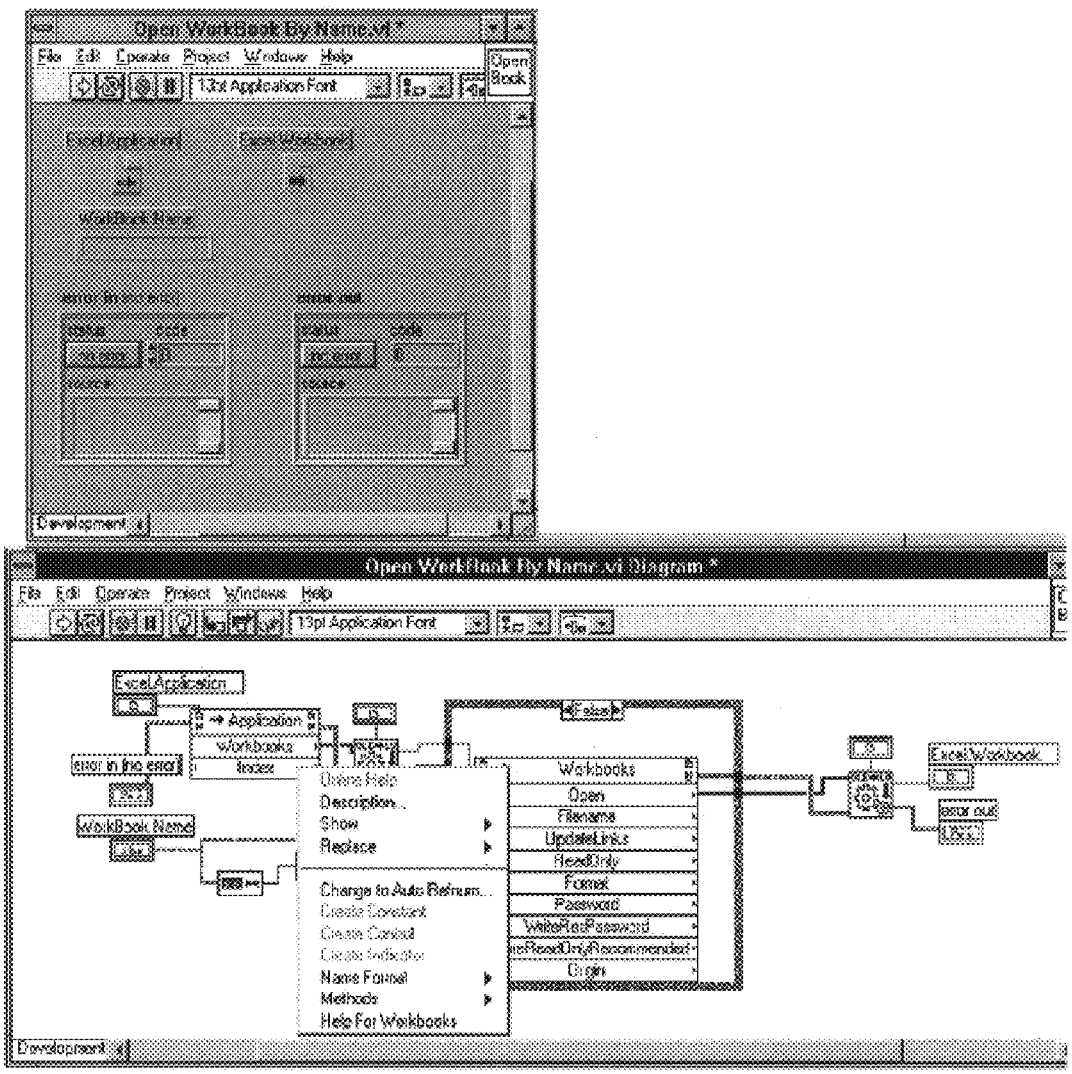
FIG. 20 is a screen shot illustrating the step of displaying an application help option for a method of an automation invoke node according of the flowchart of FIG. 18.

The user provides user input, preferably right-clicking with a mouse on the automation node, to view a pop-up menu. In response to the user input, the automation node displays an application help option for the method/property indicated by the user input, as shown in FIG. 20, in step 504. Preferably, displaying an application help option includes displaying a pop-up menu with a help item. In FIG. 20 the help item is the "Help for Workbooks" item.

The user selects the help item, preferably by clicking on the help item with a mouse. In response to the user selection of the help item, the automation node requests help screen information for the method/property from the object manager 268 (of FIG. 3) in step 506. The automation node passes information specifying the method/property to the object manager 268. The object manager 268 returns the requested information.

Figure 21:
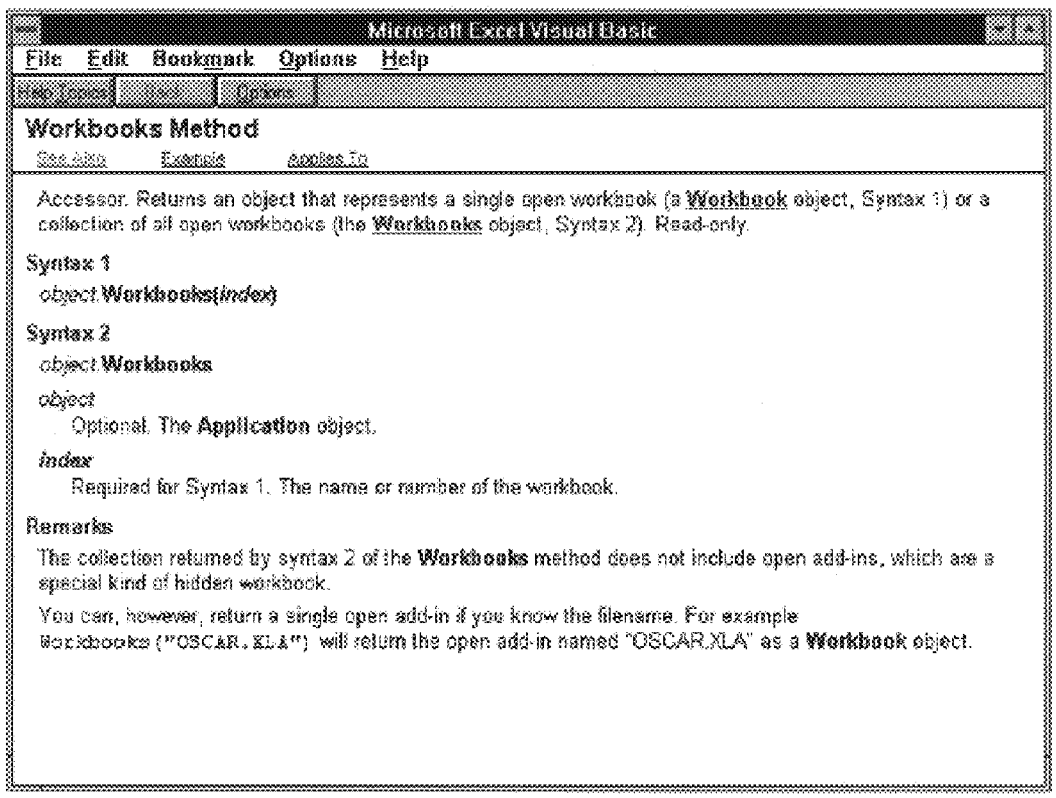
FIG. 21 is a screen shot illustrating the step of displaying a application help screen of the flowchart of FIG. 18.

The automation node receives the requested information from the object manager 268 in step 508. Preferably, the requested information includes context for the method or object and a reference to a help file which includes the help screen to be displayed. In response to receiving the requested information, the automation node displays a help screen for the method/property, as shown in FIG. 21, in step 510. FIG. 21 shows a help screen for the Excel Application Workbooks method. It is noted that the same steps apply for a property as for a method even though the steps have been illustrated via screen shots with reference to a method.

Thus, the method provides a useful means for providing context sensitive help information for a user creating an automation client by means of the graphical programming environment.

In one embodiment, automation classes and methods and/or properties of the classes are dynamically specified. Preferably, the classes and methods are specified via a front panel control. The alternate embodiment is advantageous in circumstances wherein it is desired to access an automation server application which does not publish a type library. The type descriptor for the dynamically specified automation class and method and/or property embodiment includes an indication of a dynamic automation type.

Class Propagation

Figure 22:
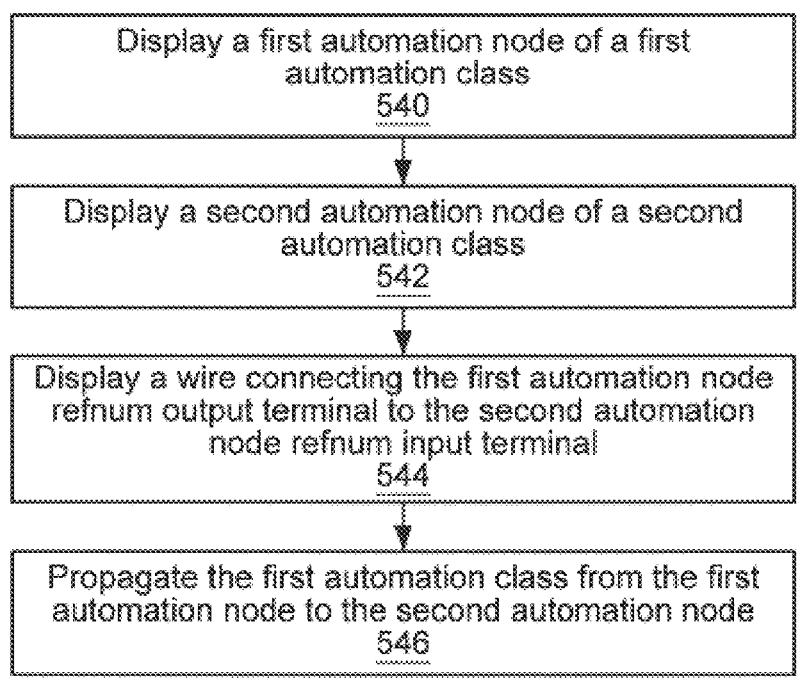
FIG. 22 is a flowchart illustrating steps taken to propagate the automation class of an automation node to another automation node.
Figure 23:
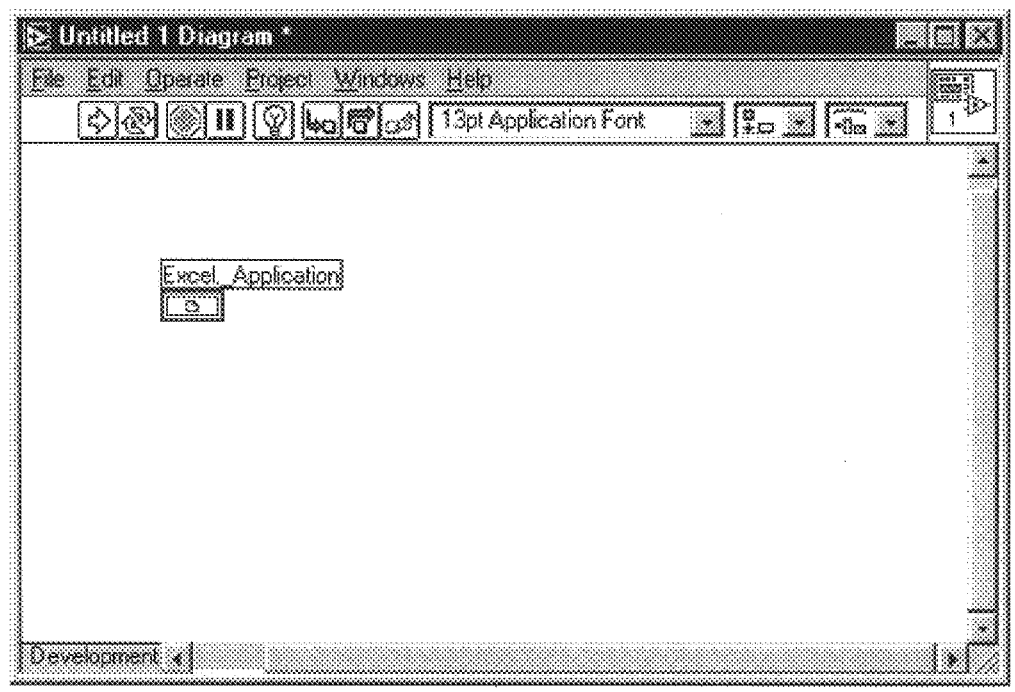
FIGS. 23 through 25 are screen shots illustrating steps of the flowchart of FIG. 22.

FIG. 22 is a flowchart illustrating steps taken to propagate the automation class of an automation node to another automation node. In response to a user dropping a first automation node in a VI block diagram, the block diagram editor 64 invokes a method of the first automation node to display the first automation node in step 540, as shown in FIG. 23. In response to a user dropping a second automation node in a VI block diagram, the block diagram editor 264 invokes a method of the second automation node to display the second automation node in step 542.

The first automation node is one of an automation open node, an automation invoke node, an automation property node, and an automation refnum. The second automation node is one of an automation open node, an automation invoke node, an automation property node, and an automation close node. Each of the automation nodes, has a refnum input terminal and a refnum output terminal for receiving and providing, respectively, a type descriptor which includes an automation class identifier and a type library identifier which the automation class is in. However, the automation refnum only has a refnum output terminal and the automation close node only has a refnum input terminal.

Figure 30:
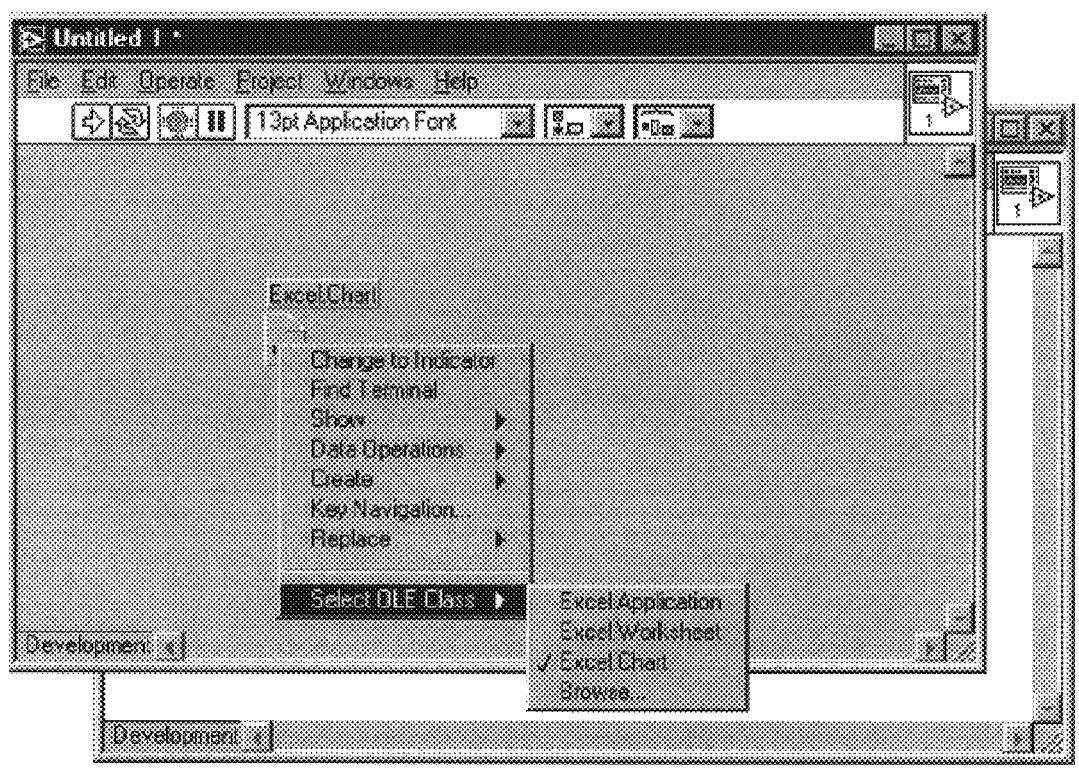
FIGS. 30 through 32 are screen shots illustrating steps of the flowchart of FIG. 29.

The first automation node has a first automation class and the second automation node has a second automation class. The first and second automation classes may be the same or different. The automation class of each of the first and second automation nodes is set either by default when the automation node is dropped or directly by the user, preferably using the "Select OLE Class" item in the automation node pop-up menu, as shown in FIG. 30

In response to a user wiring the first and second automation nodes together, the block diagram editor 264 displays a wire connecting the refnum output terminal of the first automation node to the refnum input terminal of the second automation node in step 544. In response to the user wiring the first and second automation nodes together, the automation class of the first automation node is propagated to the second automation node in step 546. That is, the second automation node receives the first automation class in the type descriptor from the first automation node and changes the automation class of the second automation node to the first automation class if the second automation class is different from the first automation class.

Figure 24:
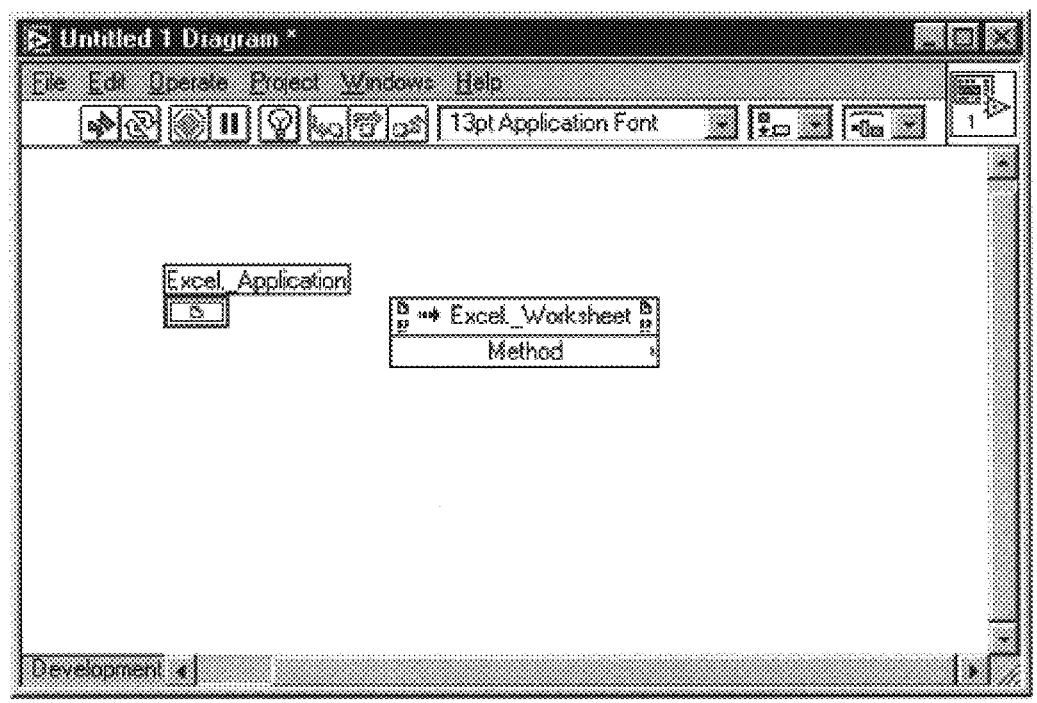
Figure 25:
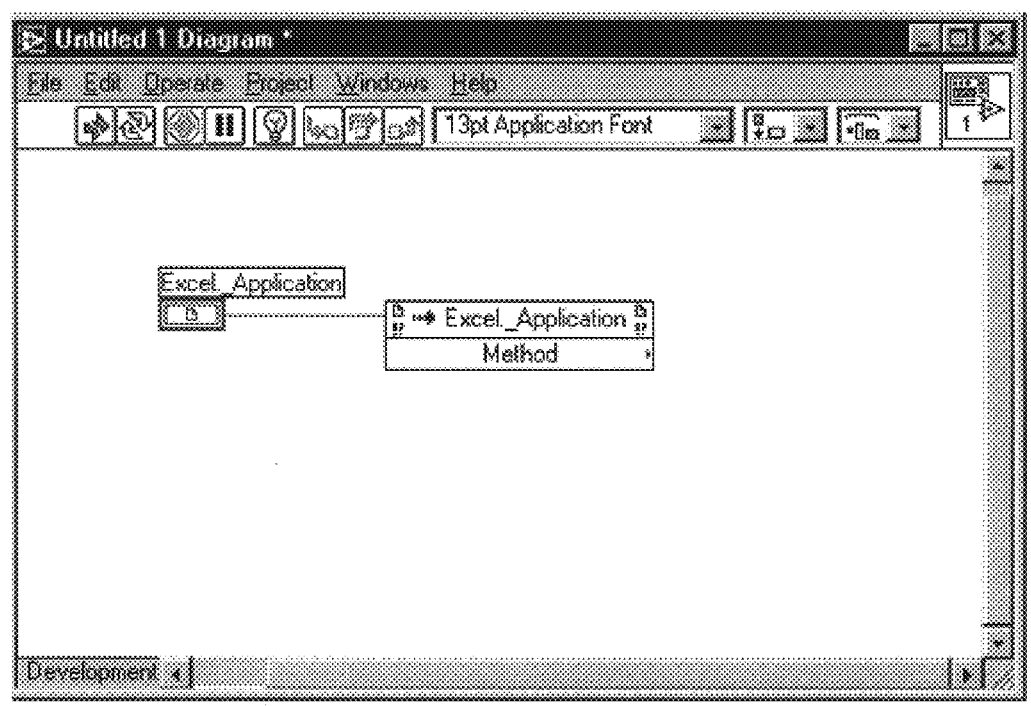

FIG. 24 shows first and second automation nodes prior to being wired together and FIG. 25 shows the automation nodes after being wired together, i.e., after the automation class propagation has occurred. It is noted that the class of the second automation node is now the same as the class of the first automation node.

Figure 26:
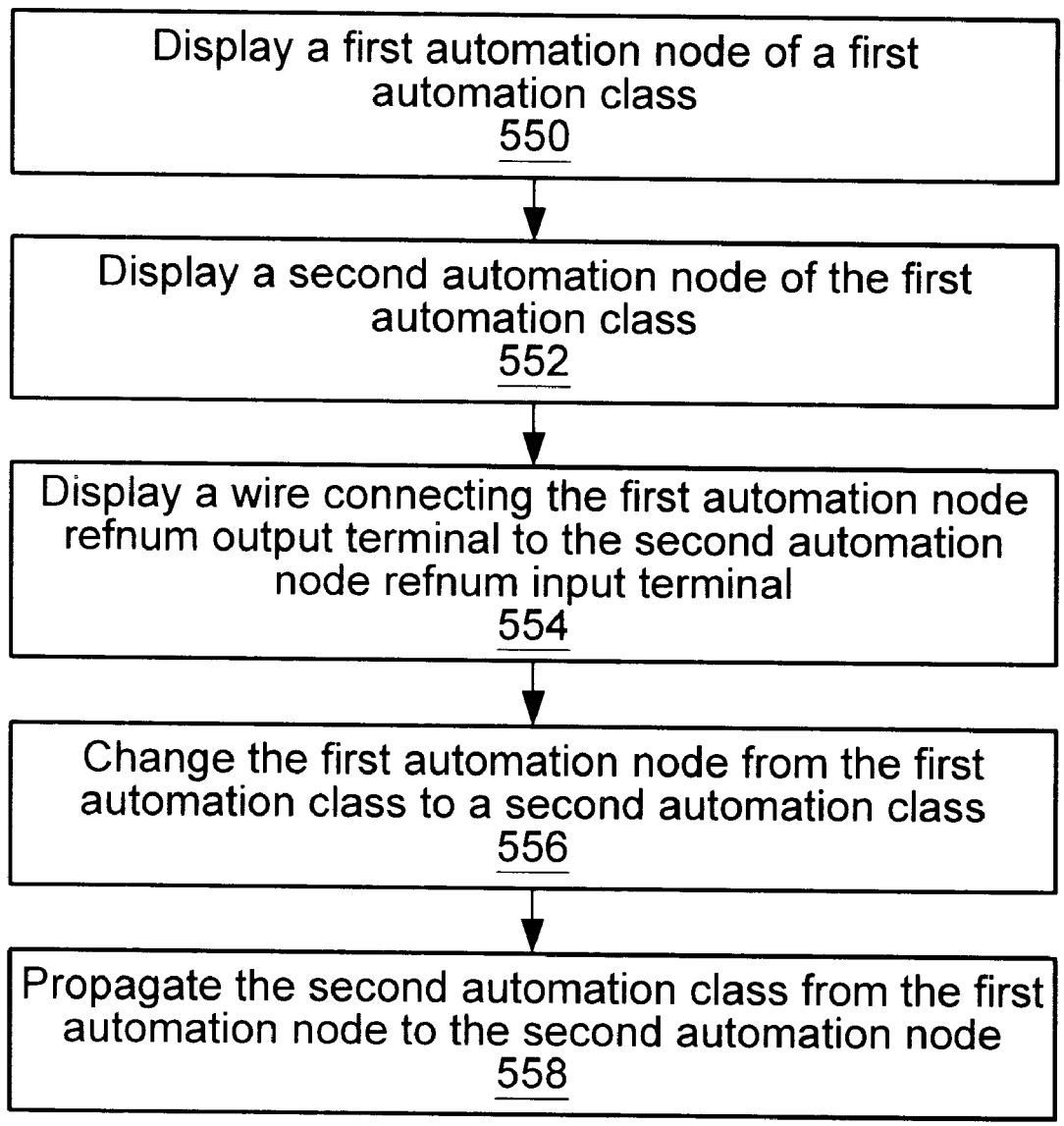
FIG. 26 is a flowchart illustrating steps taken to propagate the automation class of an automation node to another automation node.

Referring now to FIG. 26, a flowchart illustrating steps taken to propagate the automation class of an automation node to another automation node is shown. In response to a user dropping a first automation node in a VI block diagram, the block diagram editor 264 invokes a method of the first automation node to display the first automation node in step 550. In response to a user dropping a second automation node in a VI block diagram, the block diagram editor 264 invokes a method of the second automation node to display the second automation node in step 552.

The first automation node is one of an automation open node, an automation invoke node, an automation property node, and an automation refnum. The second automation node is one of an automation open node, an automation invoke node, an automation property node, and an automation close node. Each of the automation nodes, has a refnum input terminal and a refnum output terminal for receiving and providing, respectively, a type descriptor which includes an automation class identifier and a type library identifier which the automation class is in. However, the automation close node only has a refnum input terminal and the automation refnum has either only a output terminal or an input terminal depending upon whether or not it is a control or an indicator, respectively.

The first and second automation nodes have a first automation class. The automation class of each of the first and second automation nodes is set either by default when the automation node is dropped or directly by the user, preferably using "Select OLE Class" item in the automation node pop-up menu, as shown in FIG. 30. In addition, the automation class of the automation nodes may have previously been set via the class propagation steps described in the flowcharts of FIG. 22 or FIG. 26.

In response to a user wiring the first and second automation nodes together, the block diagram editor 264 displays a wire connecting the refnum output terminal of the first automation node to the refnum input terminal of the second automation node in step 554.

In response to a user requesting to change the first automation node to a second automation class, the first automation node changes the automation node to be of the second automation class in step 556.

In response to the user changing the first automation node to a second automation class, the automation class of the first automation node is propagated to the second automation node in step 558. That is, the second automation node receives the second automation class in the type descriptor from the first automation node and changes the automation class of the second automation node to the second automation class if the second automation class is different from the first automation class.

Figure 27:
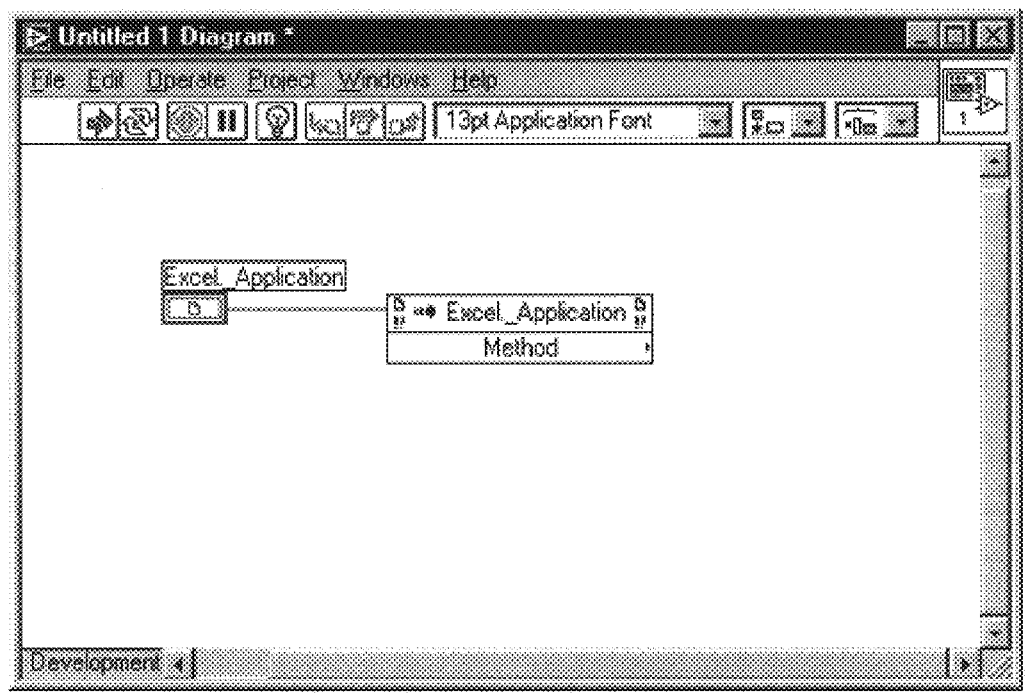
FIGS. 27 and 28 are screen shots illustrating steps of the flowchart of FIG. 24.
Figure 28:
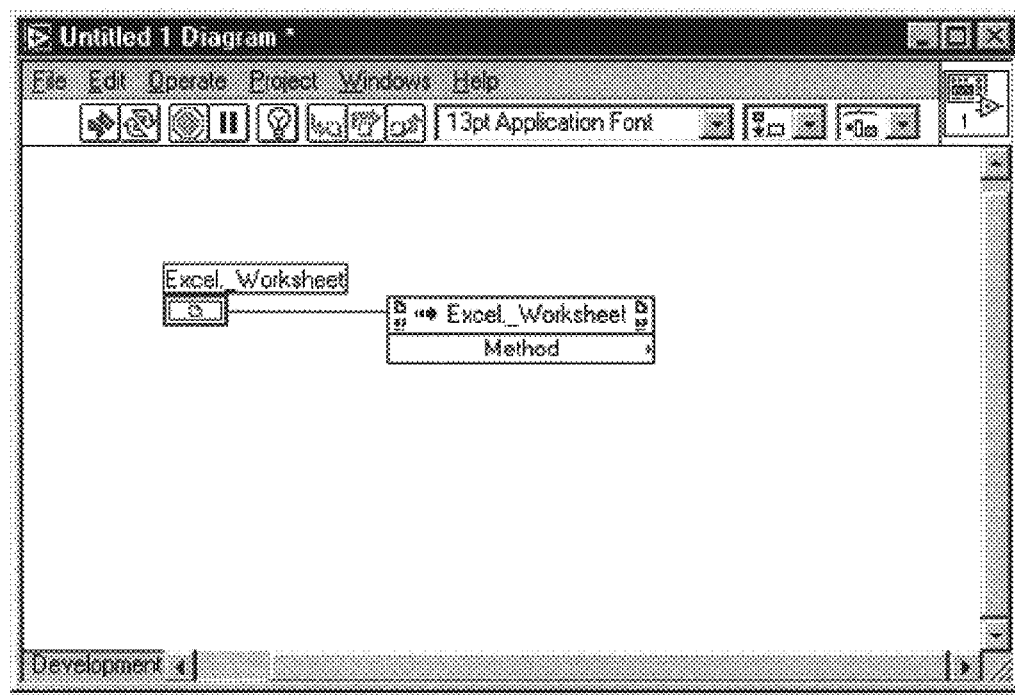

FIG. 27 shows first and second automation nodes prior to changing the first automation node to be of the second automation class and FIG. 28 shows the automation nodes after changing the first automation node to be of the second automation class, i.e., after the automation class propagation has occurred. It is noted that the class of the second automation node is now the same as the class of the first automation node.

Type Propagation Checking

Figure 29:
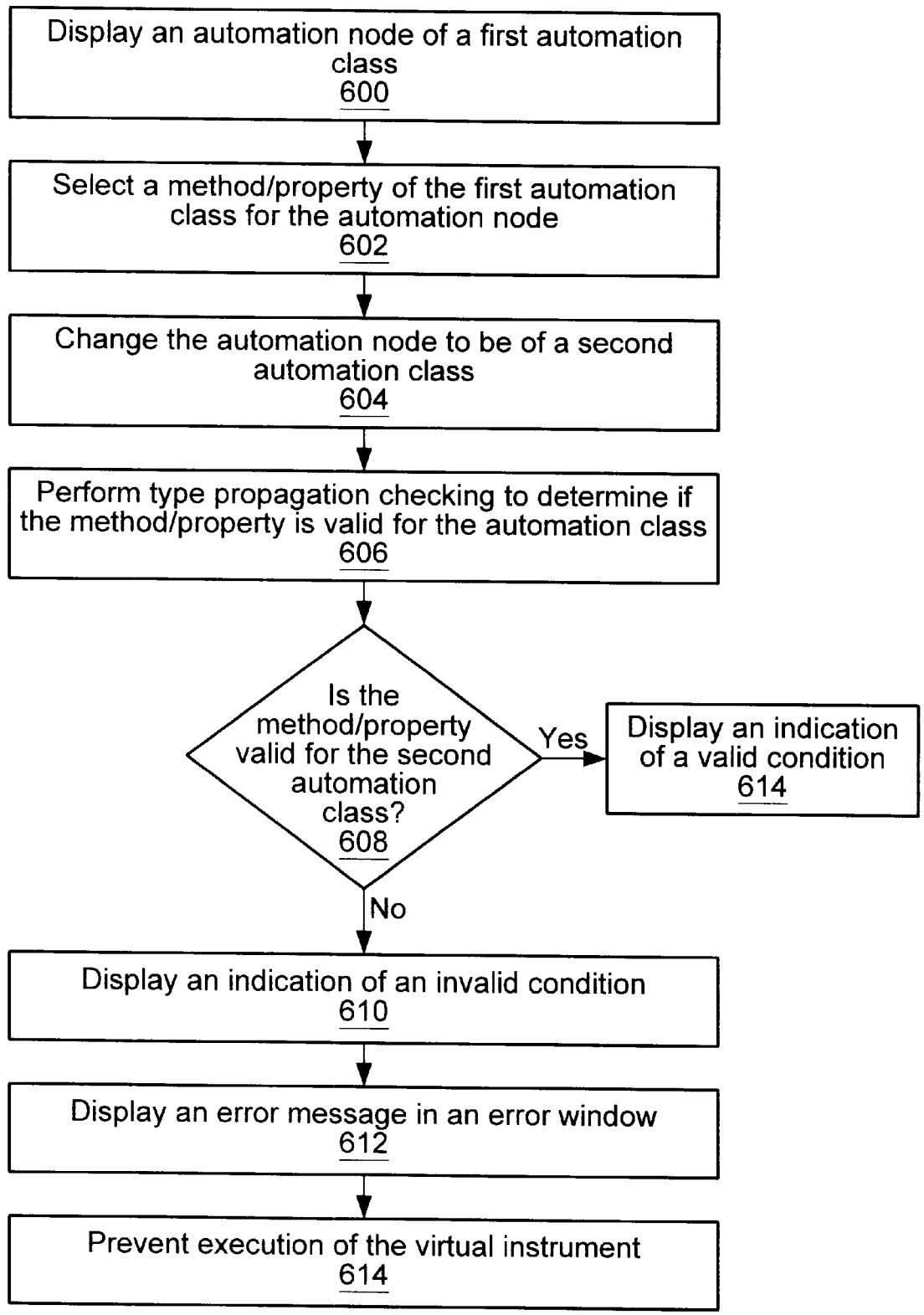
FIG. 29 is a flowchart illustrating steps taken to perform type propagation checking of automation nodes.

Referring now to FIG. 29, a flowchart illustrating steps taken to perform type propagation checking of automation invoke nodes and automation property nodes is shown. In general, the method described in FIG. 29 applies to both automation invoke nodes and automation property nodes, with differences noted. Hence, for clarity, an automation invoke node and an automation property node are referred to generically as an automation node with respect to FIGS. 29 through 37. Likewise, the method of an automation invoke node and the properties of an automation property node are referred to as method/property where either apply.

A user creates an automation node, i.e., an automation invoke node or an automation property node, in order to invoke methods/properties of an object instantiated from an automation class. Preferably, the user drags an automation node from the automation nodes palette of FIG. 7 and drops the automation node in a block diagram. In response to the user dropping the automation node in the block diagram, the block diagram editor 264 invokes a method on the automation node to display an automation node icon in the block diagram, in step 600.

The automation node displayed has an associated first automation class associated with it. In one case, the first automation class is a default automation class. In another case, the first automation class is selected by the user. In this case the user, preferably, pops up on the automation node and selects the first automation class from a list of previously selected automation classes in the pop-up menu as shown in FIG. 30, or from a list of the automation classes in the system as shown in FIG. 11. In another case, the automation class of the automation node is propagated to the automation node from another automation node as described in FIG. 22 or FIG. 26.

In response to the user selecting a method/property for the automation node, the automation node selects the user-selected method/property to be invoked by the automation node in step 602. The automation node displays the selected method/property in the automation node.

In step 604, the class of the automation node is changed to be of a second automation class in response to user input. Preferably, the user input may be of three different types.

The first type of user input is the user wiring the refnum input terminal of the automation node to the refnum output terminal of second automation node, such as an automation open node, automation property node, or automation invoke node. The second automation node propagates its automation class, i.e., a second automation class, to the automation node, as described in the flowchart of FIG. 22. The second automation class may or may not be different from the first automation class, i.e., from the automation class of the automation node prior to the wiring.

The second type of user input is changing the automation class of a second automation node, whose refnum output terminal is already wired to the refnum input terminal of the automation node, from the first automation class to the second automation class. As in the first type of user input, the second automation node propagates its automation class, i.e., the second automation class, to the automation node, as described in the flowchart of FIG. 26.

The third type of user input is the user selecting the second automation class from a list of automation classes directly, preferably, via either the pop-up menu of the automation node as shown in FIG. 11, or the browse list as shown in FIG. 12. When the user selects a new automation class from one of the two lists of classes, the automation node changes its class to the newly selected second automation class.

In response to the user changing the automation node to be of the second automation class, the automation node performs type propagation checking to determine if the method/property is valid for the second automation class, in step 606. The automation node makes this determination in step 608. Performing the type propagation checking of step 606 will be described in more detail below with reference to FIG. 33.

If the method/property of the automation node is valid for the second automation class, the block diagram editor 264 displays an indication of a valid condition, in step 614.

In the case that the automation node is an automation invoke node, for the first and second types of user input, the indication of a valid condition preferably includes displaying a valid wire. In one embodiment, a valid wire is a solid wire. For the third type of user input, the indication of a valid condition preferably includes displaying at least a portion of the automation invoke node in a color which indicates a valid condition. In one embodiment, a color which indicates a valid condition includes a color for each terminal of the method which indicates the data type of the terminal, wherein the color is not a color which indicates an invalid condition. In one embodiment, the color which indicates an invalid condition is black.

In the case that the automation node is an automation property node the indication of a valid condition preferably includes displaying the property in a color indicative of a valid condition. In one embodiment, a color which indicates a valid condition includes a color for each property which indicates the data type of the property, wherein the color is not a color which indicates an invalid condition. In one embodiment, the color which indicates an invalid condition is black.

If the method/property of the automation node is not valid for the second automation class, the block diagram editor 264 displays an indication of an invalid condition, in step 610.

Figure 31:
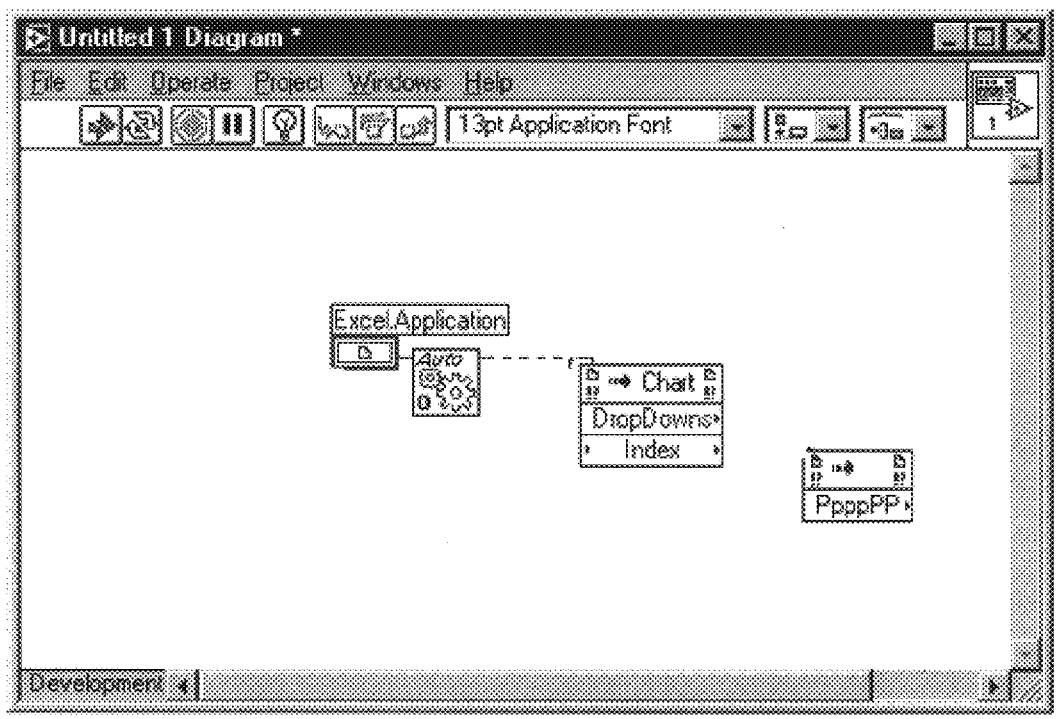

In the case that the automation node is an automation invoke node, for the first and second types of user input, the indication of an invalid condition preferably includes displaying a broken wire. In one embodiment, a broken wire is a dashed wire, as shown in FIG. 31. For the third type of user input, the indication of an invalid condition preferably includes displaying at least a portion of the automation invoke node in a color which indicates an invalid condition. In one embodiment, a color which indicates an invalid condition is black.

In the case that the automation node is an automation property node the indication of an invalid condition preferably includes displaying at least a portion of the automation property node in a color which indicates an invalid condition. In one embodiment, a color which indicates an invalid condition is black.

In the case where the automation node is an automation property node, the type propagation includes performing steps 608, 610 and 614 for each of the properties of the automation property node.

Figure 32:
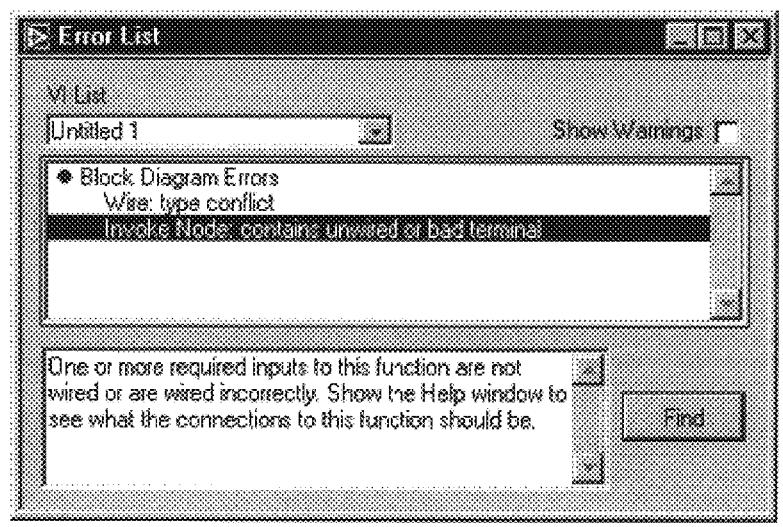

If the method/property of the automation node is not valid for the second automation class, the block diagram editor 264 further displays an error message in an error window, as shown in FIG. 32, in step 612. In one embodiment, if the method/property of the automation node is not valid for the second automation class, the graphical programming environment prevents execution of the virtual instrument, in step 614. That is the graphical programming environment prevents the automation node from invoking the associated method/property.

Figure 33:
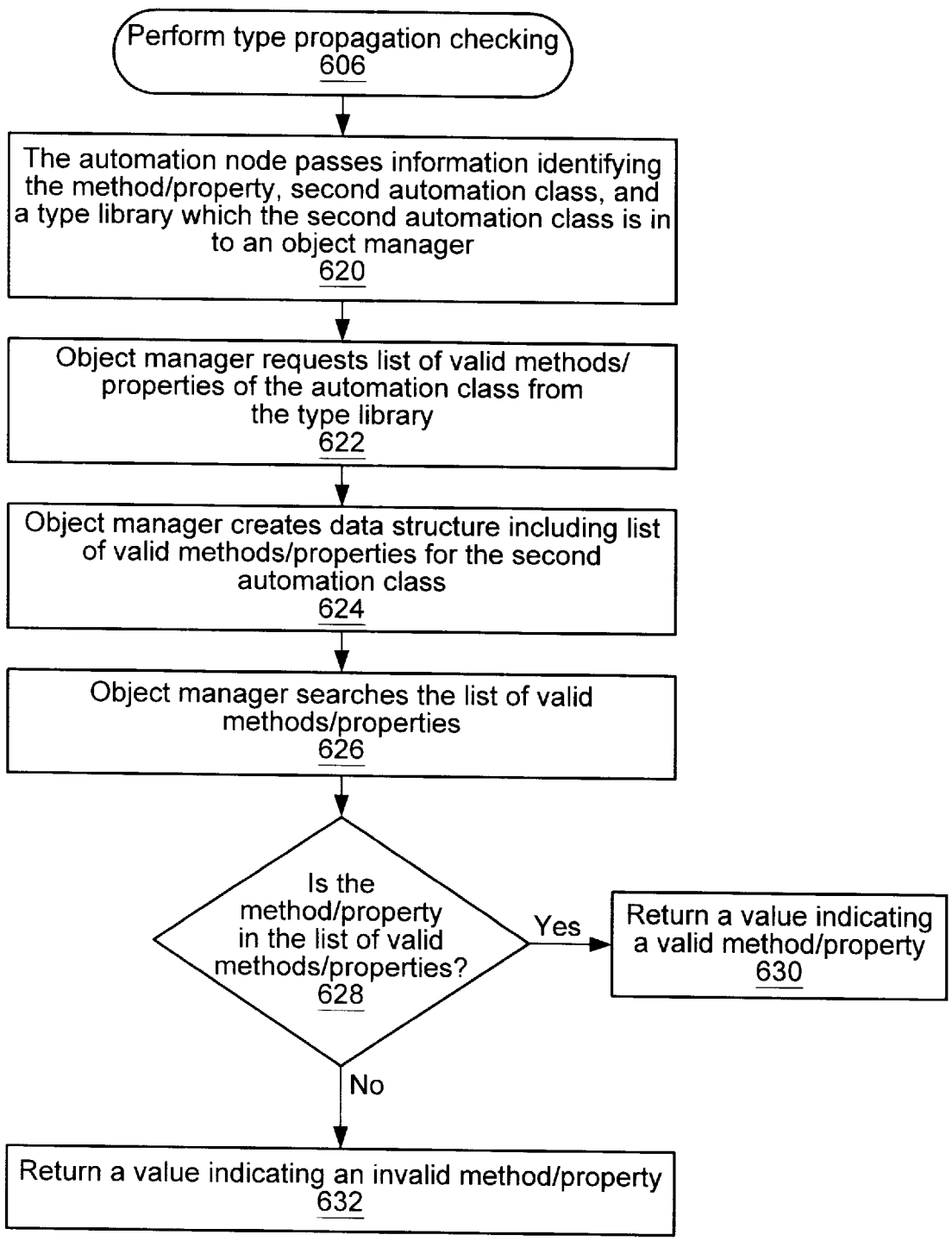
FIG. 33 is a flowchart illustrating in more detail the step of FIG. 29 of performing type propagation.

Referring now to FIG. 33, a flowchart illustrating in more detail the step 606 of FIG. 29 of performing type propagation is shown. In response to the user changing the automation node to be of the second automation class, the automation node passes information to the object manager 268 (of FIG. 3) in step 620. The information passed includes information identifying the method/property of the automation node, information identifying the second automation class, and information identifying a type library, of the type libraries 270 (of FIG. 3), which the second automation class is in. Preferably, the automation node invokes a function of the object manager 268 which returns a value indicating whether or not the method/property is a valid method/property for the second automation class, i.e., whether or not the second automation class defines the method/property. Preferably, the automation node receives the information in a type descriptor, described above, via the refnum input terminal of the automation node.

In response to the automation node passing the information to the object manager 268, the object 268 requests a list of valid methods/properties of the second automation class from the type library specified in the passed information in step 622. The type library includes information specifying the methods and properties defined by each class in the type library.

The type library returns the requested list and the object manager 268 receives the requested list from the type library and creates a data structure including the list of valid methods/properties of the second automation class in step 624.

In one embodiment, the object manager 268 maintains the data structure created and determines in response to step 620 whether or not the list of valid methods/properties exists. If the list already exists, the object manager 268 does not perform step 622.

The object manager 268 searches the list of valid methods/properties in the data structure in step 626 and determines if the method/property is valid, i.e., present in the list, in step 628. If the specified method/property is present in the list of valid methods/properties, the object manager 268 returns a value indicating a valid method/property in step 630. If the specified method/property is not present in the list of valid methods/properties, the object manager 268 returns a value indicating an invalid method/property in step 632.

Figure 34:
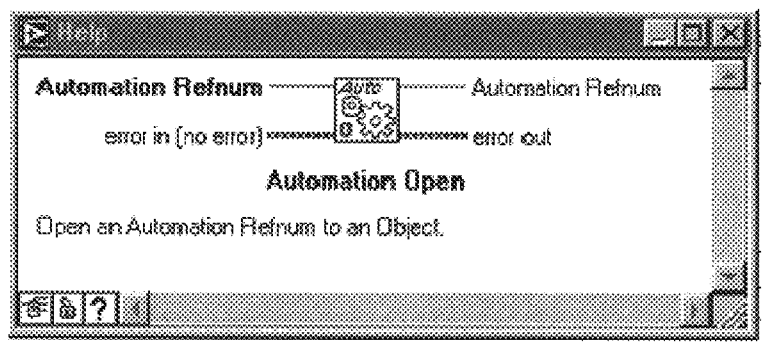
FIGS. 34, 35 and 36 are screen shots illustrating a help screen for an automation open node, an automation property node, and an automation invoke node, respectively.
Figure 35:
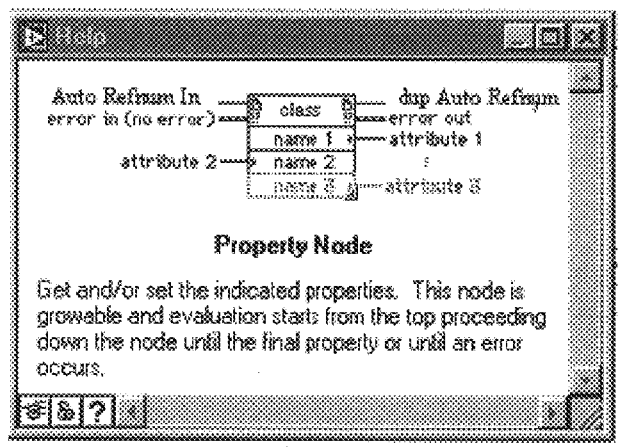
Figure 36:
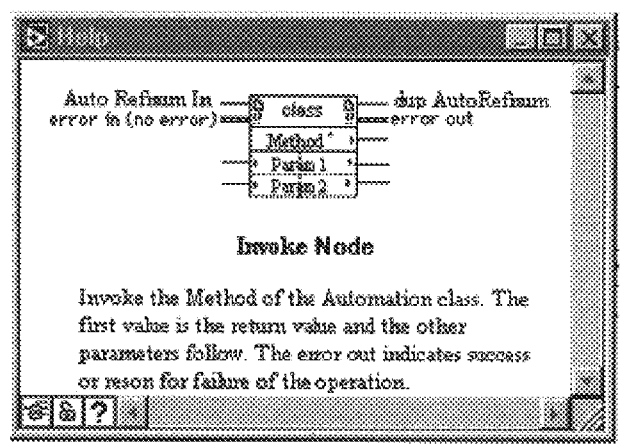

FIGS. 34, 35 and 36 are screen shots illustrating a help screen for an automation open node, an automation property node, and an automation invoke node, respectively. The help screens illustrate the various terminals of the automation nodes.

FIGS. 37–52: Second Embodiment

FIGS. 37–52 illustrate a second embodiment of the present invention. This second embodiment is a specific embodiment of FIGS. 8–36, where the object whose capabilities are being accessed is an application, such as a graphical program application, e.g., LabVIEW. In this embodiment, the object node is referred to as a "call by reference node". The call by reference node is essentially an invoke node as described above which can invoke or call only a run method on an application. Thus a call by reference node is a specific implementation or subset of the invoke node. It is noted that either an invoke node or a call by reference node may be used in this embodiment, as desired.

Figure 37:
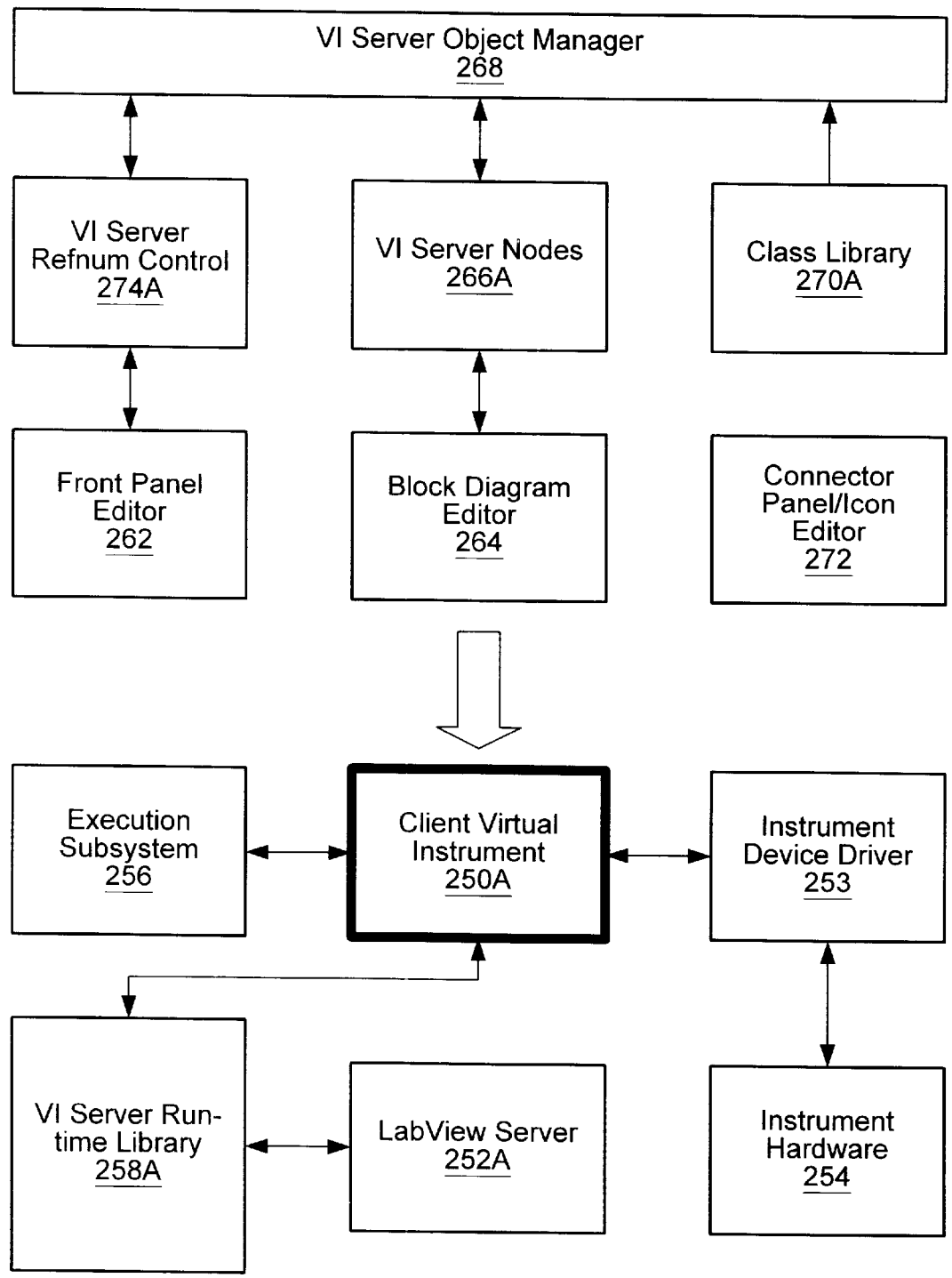
FIG. 37 is a block diagram illustrating the relationship of portions of the instrumentation control system of FIG. 1 according to a first embodiment.

FIG. 37—Graphical Programming Environment

FIG. 37 is a block diagram illustrating the relationship of portions of the instrumentation control system 100 and 160 (of FIGS. 1 and 1A). FIG. 37 is similar to FIG. 3 described above, with changes to certain names of the software blocks to illustrate the specific nature of this embodiment. Elements in FIG. 37 which are identical to elements in FIG. 3 have the same reference numerals for convenience. Elements in FIG. 37 which are specific implementations of elements in FIG. 3 have the same reference numerals with an "A" following the numeral. Preferably, the elements shown in FIG. 37 (with the exception of the hardware instrument 254) are software elements which are executed on the computer 102 (of FIGS. 1 and 1A).

This embodiment is used to create a client graphical program which can programmatically access server capabilities of an application, such as a graphical program application or program, e.g., LabVIEW or a VI. The present invention is also useable to create a client graphical program portion which is a part of a larger graphical program.

In the preferred embodiment, a programmer employs a front panel editor 262, a block diagram editor 264, and a connector pane/icon editor 272 of a graphical programming environment to produce a graphical program. In the instrumentation application of the preferred embodiment, the graphical program is referred to as a virtual instrument (VI) 50. The block diagram editor 264 generates executable instructions, i.e., machine language instructions, in response to the client virtual instrument or VI 50. The VI 50 developed by the programmer is executed by an execution subsystem 256 of the graphical programming environment to control an instrument 254. The instrument 254 is illustrative of instruments such as those of FIG. 1 and 1A.

Referring again to FIG. 37, the graphical programming environment further comprises VI Server refnum controls 274A. The front panel editor 262 is operable to generate a VI front panel which may include one or more of the VI Server refnum controls 274A. The VI Server refnum controls 274A communicate with the VI Server object manager 268 to obtain or provide information regarding class libraries 270 in the system.

The graphical programming environment further comprises VI Server function nodes 266A. The VI Server function nodes 266A are shown in FIGS. 39–42 and FIGS. 34–36. The VI Server function nodes 266A comprise an Open Application Reference node, an Open VI Reference node, a Close Application or VI Reference node, a Call by Reference Node, a Property node and an Invoke node. The Call by Reference Node, the Property node and the Invoke node can be referred to generically as access nodes, since they access functionality or capabilities of a server graphical program or a server graphical programming application.

The block diagram editor 264 is operable to create a VI block diagram, or block diagram. The block diagram editor 264 communicates with the VI Server function nodes 266A, which in turn communicate with the VI Server object manager 268. The object manager 268 accesses class libraries 270 to acquire information necessary to perform class and object management operations.

Advantageously, the graphical programming environment, and in particular the VI Server refnum controls 274A, the VI Server function nodes 266A, the VI Server object manager 68, and the VI Server run-time library 258A, enable a graphical program to instantiate objects from the same or other LabVIEW applications or graphical programs, and to remotely call VIs as well as invoke properties and methods of the instantiated objects.

The graphical programming environment further preferably comprises a connector pane/icon editor 272 for forming VI's into subVI's, i.e., a VI which may be used as a graphical programming element in another VI. The reader is referred to U.S. Pat. No. 5,301,336 for more information about the subVI's and the icon editor 272.

The execution subsystem 256 executes the executable instructions constructed from a block diagram of the VI 50. For more information about the execution subsystem 56 the reader is referred to U.S. Pat. No. 5,481,741.

Preferably, the VI 250A calls VIs and/or invokes methods and properties of application or VI objects (LabVIEW server 252A) indirectly through the services of the VI Server manager run-time library 258A. Examples of the LabVIEW server 252A include a LabVIEW application, or a graphical program or VI. The server application or VI 252A may be located on the same computer or on another computer. The VI 250A controls the instrument 254 through an instrument device driver 253 which includes executable functions which are called by the VI 250A to perform operations in order to control the instrument 254.

Figure 37A:
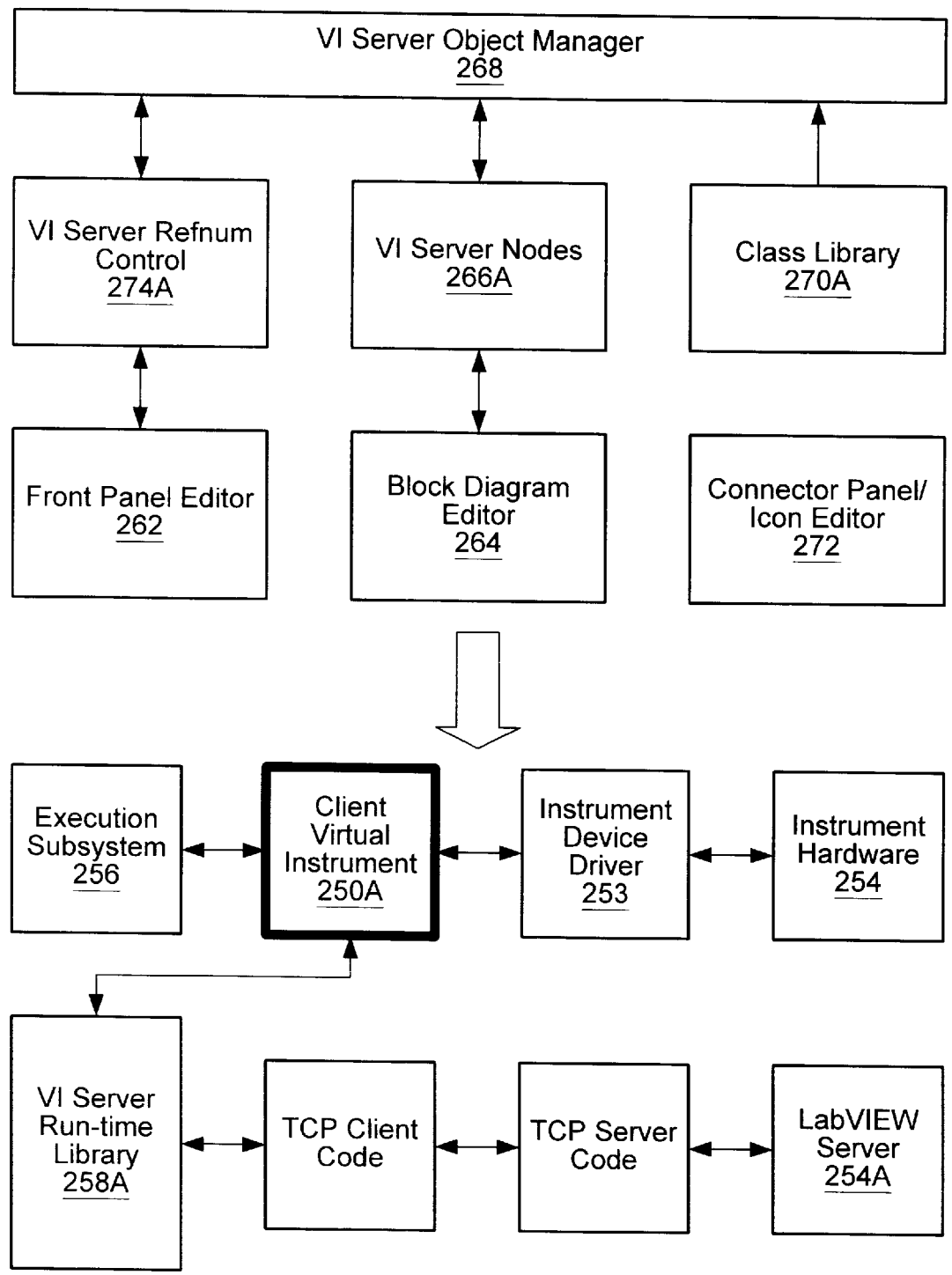
FIG. 37a is a block diagram illustrating the relationship of portions of the instrumentation control system of FIG. 1 where the server is located on a remote computer system.

When the LabVIEW server 252A is located on a different computer, the block diagram appears as shown in FIG. 37A.

In an embodiment where the two computers are connected through a TCP/IP connection, such as the Internet, this system further includes TCP client code and TCP server code coupled between the VI Server run-time library 258A and the LabVIEW Server 252A, which performs the required communication.

The VI Server nodes 266 and VI Server refnum controls 274A comprise classes and objects, according to the notion of classes and objects in the art of object-oriented programming. Each of the VI Server nodes 266 and the VI Server refnum controls 274A comprise properties and methods. The methods include a method for drawing an icon representation of the object on the video display 222 of the computer 102 either in the VI block diagram or front panel, a method for generating code associated with the different functions of each node or control, and a method for performing class or type propagation checking. The operation of the VI Server nodes 266A and the VI Server controls 274A will be explained in more detail below.

As mentioned above, the client graphical program 250A is not necessarily related to controlling an instrument, but rather the graphical program 250A may be for any of various applications. That is, the client may have an application other than instrumentation control.

Advantageously, the graphical system and method for producing the graphical program or VI 250A has a number of benefits. These benefits include the ability to programmatically access functionality from the same or other graphical programming applications or graphical programs. This results in a reduction in the development time required to create the VI 250A as well as reduction of the number of code defects in the VI 250A. Yet another benefit is the simplicity of programming which makes the development of a graphical program, such as an instrumentation control program, more practical for a larger number of people, i.e., those who might not have the skills, or resources to develop the skills, to develop programs according to more conventional text-based methods. The system and method also provides class propagation, class checking and type checking in a graphical programming environment, discussed further below, thus simplifying program development.

Overview of the Embodiment

The graphical programming system, e.g. LabVIEW, exports many of its capabilities to other applications of graphical programs through a new set of features, collectively referred to as VI server. This embodiment includes new diagram function nodes, referred to as VI Server function nodes (266A FIG. 37), illustrated in FIGS. 39–42, as well as the property and invoke nodes illustrated in FIGS. 35 and 36, which allow the user to access these capabilities from within the graphical programming system. The user can thus create diagrams in LabVIEW that get/set properties and invoke operations on both LabVIEW applications and graphical programs (VIs) within the respective user's local version of LabVIEW as well as on other copies of LabVIEW or graphical programs on a network, such as a TCP/IP network. The user can also access these VI server capabilities from other clients such as an ActiveX client, e.g., a Visual Basic application or Microsoft Excel.

Figure 38:
FIG. 38 illustrates the VI Server front panel refnum controls.

FIG. 38—VI Server Refnum Controls

The VI server functionality of this embodiment is preferably accessed through references to two main classes of objects, these being the Application object and the VI object. The VI object is further sub-divided into two classes of objects: the Generic VI and the Strictly typed VI. FIG. 38 illustrates the front panel refnum controls for the Application, Generic VI, and Strictly-typed VI data types.

As shown in FIG. 38, the image in each refnum icon indicates the type of the refnum. The Application class refnum icon displays the LabVIEW application icon. The Generic VI class refnum icon displays the VI file icon. The Strictly-typed VI class refnum icon depicts the connector pane that defines the class.

The front panel refnum comprises a reference to an object. Thus, the Application refnum provides a reference to a graphical programming application, e.g. a LabVIEW application, the generic VI refnum provides a reference to a generic virtual instrument or generic graphical program, and the strictly typed VI refnum provides a reference to a specified graphical program or VI.

In the preferred embodiment, the user selects a VI Server front panel refnum control and places this refnum control in a front panel of a virtual instrument or graphical program. The user then configures the refnum to be either an Application refnum, a Generic VI refnum, or a Strictly-typed VI refnum. Once the user has configured the refnum control to one of these three types, the refnum control takes on the respective appearance by the class selected by the user. For example, if the user drops the front panel refnum control on the front panel and configures the refnum to be of the Application class, the refnum takes on the Application icon appearance shown in FIG. 4.

When the user drops or places the VI Server refnum in the front panel and configures the refnum, corresponding terminals appear in the block diagram. These terminals provide the information on the application or graphical program referenced by the refnum. In an alternate embodiment, the user places the refnum directly in the block diagram.

In general, a Generic VI reference is used to perform editing operations (e.g., setting properties or invoking functions) on any VI. A Strictly-typed VI reference is used to call a dynamically loaded VI as a sub-VI, and to perform operations that do not edit or change the VI, such as setting its Front Panel window size or location. An application reference is used to get or set properties on the application, or invoke methods on the application.

FIGS. 39–42: VI Server Functions Nodes

FIGS. 39–42 and FIGS. 35–36 illustrate the VI server function nodes according to the preferred embodiment of the invention. As noted above, these function nodes or diagram functions can be used in a graphical program to access capabilities of other LabVIEW applications or VIs. More specifically, these diagram functions can be placed in a graphical program or virtual instrument and can be used to programmatically obtain references to specific instances of the above classes. For example, an instance of the application class could be the LabVIEW graphical programming application running on the respective user's system, or a LabVIEW application running on another computer system which is connected to the user's computer system through a network, such as the Intern et. Thus, an instance of the application class could be a LabVIEW application running anywhere in the world on the Internet, even on a different platform. In a similar manner, an instance of the Generic VI class could be any VI on the user's computer or any exported VIs in a remote version of LabVIEW. An instance of the Strictly-typed VI class could be a specified VI running in the user's LabVIEW application or any other specified VI residing the user's computer or on a remote computer system.

It is noted that, for security, the user can configure the LabVIEW application to allow and disallow certain Internet addresses from establishing connections, as well as allow and disallow certain VIs from being referenced by external programs.

Each of the VI Server function nodes are described below.

Figure 39:
FIGS. 39–42 illustrate the VI Server function nodes which can be placed in a graphical program and used for programmatically accessing functionality of other graphical programming applications or programs.

FIG. 39—Open Application Reference node

FIG. 39 illustrates the Open Application Reference node. The Open Application Reference node returns a reference to a VI Server application running on the specified computer. If an empty string is specified for machine name, then the node returns a reference to the local LabVIEW application in which this function is running. If a machine name is specified, then the node attempts to establish a TCP connection with a remote VI Server on that machine on the specified port.

The application reference output can be used as an input to the Property and Invoke nodes to get or set properties and invoke methods on the application. The application reference output is used as the input to the Open VI Reference function to obtain references to VIs in that application. The reference is closed with the Close Application or VI Reference function. If the user forgets to close this reference, the reference closes automatically when the top level VI associated with this function finishes executing. However, closing the reference operates to conserve the resources involved in maintaining the connection.

The following describes the inputs and outputs of the Open Application Reference node:

- machine name is the address of the computer that runs a copy of LabVIEW to which it is desired to establish a connection. This address can be in dotted decimal notation (such as 130.164.15.250) or domain name notation (such as foo.natinst.com). An empty string will cause this function to return a reference to the local LabVIEW.
- port number is the port on which the remote LabVIEW application is listening. If port number is not wired, the default VI Server listener port number (5151) is used.
- error in describes error conditions that occur prior to the execution of this function. The default input of this cluster is no error. If the error Boolean of this cluster is True, the Open Application Reference function will do nothing but pass through the error via the error out output.
- application reference is the reference to the specified application.
- error out contains error information. If error in indicates an error, error out contains the same error information. Otherwise it describes the error status that this function produces.

Figure 40:
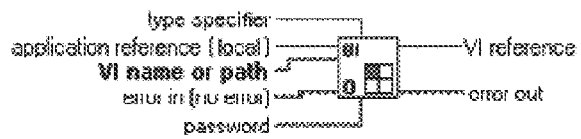

FIG. 40—Open VI Reference node

FIG. 40 illustrates the Open VI Reference node. The Open VI Reference node returns a reference to a VI specified by a name string or path to the VI's location on disk. In the current embodiment, references can only be obtained to standard VIs. This excludes Control, Typedef, and Global VIs. In the preferred embodiment, the Open VI Reference node can be used to obtain a reference to any VI.

References to VIs in another LabVIEW application are obtained by wiring an application reference (obtained from the Open Application Reference function) to this function. In this case, the path input refers to the file system on the remote LabVIEW computer. If a reference is wired to the local LabVIEW application the same behavior is obtained as if nothing had been wired to the application reference input.

If editing operations are to be performed on the referenced VI, and the VI has a password-protected diagram, the password is provided to the password string input. If the incorrect password is provided, the Open VI Reference function returns an error and an invalid VI reference. If no password is provided when opening a reference to a VI that is password protected, the reference can still be obtained, operations can only be performed that do not edit the VI.

If the specified VI is to be called through the Call By Reference function, a strictly-typed VI reference is wired to the type specifier input. The function ignores the value of this input. Only the input's type—the connector pane information—is used. By specifying this type, the Open VI Reference function verifies at run time that the referenced VI's connector pane matches that of the type specifier input.

It is noted that, if a Generic VI refnum type is wired to the type specifier input, this results in the same behavior as if the type specifier input had not been wired at all.

If the type specifier input is wired with a strictly-typed VI refnum, the VI must meet several requirements before the VI reference is returned successfully:

1) The VI cannot be broken for any reason.
2) The VI must be runnable as a subVI, that is, it cannot be active as a top-level VI (unless the VI is re-entrant).
3) The connector pane of the VI must match that of the type specifier.

If the user forgets to close this reference using a close reference node, the reference closes automatically when the top-level VI associated with this function finishes executing. However, closing the reference operates to conserve the resources involved in maintaining the connection.

If a strictly-typed reference to a reentrant VI is obtained, a dedicated data space is allocated for that reference. This data space is preferably always used and is used only in conjunction with the output VI reference. This can lead to some new behaviors in LabVIEW. For example, parallel calls (using the Call By Reference node) to a reentrant VI using the same VI reference does not execute in parallel, but executes serially, one after the other. As another example, a reentrant VI could get a reference to itself (allocating a new data space) and call itself recursively through the Call By Reference node. It is noted that allocating a data space dynamically is both time consuming and memory consuming and is not generally recommended for implementing recursive algorithms.

A VI reference is similar to what is known as a function pointer in other languages. However, in LabVIEW, these function pointers also can be used to call VIs across the network.

The following describes the inputs and outputs of the Open VI Reference node:

- application reference is a reference to a LabVIEW application. If this input is left unwired, the reference is to an application on the local version of LabVIEW. If the input is wired, and the reference is to a remote version of LabVIEW, then the remote LabVIEW is queried to return the VI reference.
- type specifier is used for its data type only. The value of the input is ignored. The data type of the type specifier input determines the data type of the vi reference output. The type specifier input is used if it is desired to use the output reference to call the VI with the Call By Reference node. If the type specifier input is left unwired, the output is a Generic VI reference.
- VI name or path is polymorphic and can accept a string containing the name of the desired VI, or a path containing the complete path (including the name) to the desired VI. If a name string is wired, then the VI must already be in memory. If a path is wired and the VI is already in memory, the VI in memory is obtained, whether its path is the same as the input or not. If the VI is not in memory, then the VI must be at the specified path for this function to succeed. If the VI is at that location, the VI is loaded into memory.

error in describes error conditions that occur prior to the execution of this function. The default input of this cluster is no error.

password is the plain-text file for the VI. If the VI is not password protected, the input is ignored. If the VI is password protected and an incorrect password is entered, the VI can be referenced, but the VI cannot be edited through that VI reference.

vi reference is the refnum associated with the requested VI. If the function fails, "not-a-refnum" is returned.

error out contains error information. If error in indicates an error, error out contains the same error information. Otherwise error out describes the error status that this VI produces.

If the user specifies a remote version of LabVIEW by the application reference input, the path is interpreted on the remote machine in the context of the remote file system. The path is expressed using the local computer's path separators, but is translated to the remote computer's path separators when the request arrives there. For example, to reference a VI on a Macintosh at My HD:LabVIEW VIs.foo.vi from a Windows application, the Window's path syntax: My HD:\LabVIEW VIs\foo.vi would be used. Conversely, to reference a VI on a Windows computer at C:\labviewfoo.vi from a Macintosh application, the Macintosh path syntax: C:labview.foo.vi would be used.

The open nodes in FIGS. 39 and 40 are similar to the Automation Open node described in FIG. 34.

Figure 41:
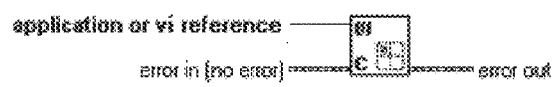

FIG. 41—Close Application or VI Reference

FIG. 41 illustrates the Close Application or VI Reference node. The Close Application or VI Reference node closes an open VI or the TCP connection to an open copy of Lab-VIEW.

The following describes the inputs and outputs of the Close Application or VI Reference node:

application or vi reference is the refnum associated with an open VI or an open copy of LabVIEW.

error in describes error conditions that occur prior to the execution of this function. The default input of this cluster is no error.

error out contains error information. If error in indicates an error, error out contains the same error information. Otherwise it describes the error status that this VI produces.

Figure 42:
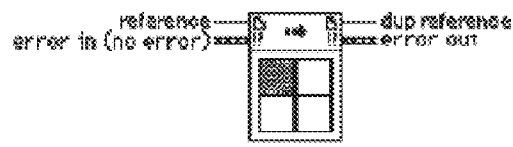

FIG. 42—Call By Reference Node

FIG. 42 illustrates the Call By Reference node. As discussed above, the call by reference node is a particular instance of an invoke node, where the method being invoked is a run method. The Call By Reference node is very similar to a sub-VI node in that either can be used to call a VI. However, a sub-VI node is statically linked to a particular VI that the user determines when he/she drops the node on the diagram. With the Call By Reference node, the VI that is called is determined dynamically at run time by the value of the VI reference wired to the reference input at the top of the node. In fact, it is possible that the VI which is called by the Call By Reference node might be on a different computer.

The top of the Call By Reference node includes four terminals: an input/output pair of flow through VI reference terminals, and an input/output pair of flow through error clusters. The VI reference input accepts wires only from strictly-typed VI references. Below these terminals is an area within which a connector pane resides (is displayed) that is identical to that of a VI with its terminals showing (rather than its icon). The connector pane of the strictly-typed VI reference input determines the pattern and data types of this connector pane which is displayed in the Call By Reference node icon. The user wires to these terminals just as he/she would to a normal sub-VI.

As long as none of the terminals of the connector pane have wires attached to them, the connector pane will adapt automatically to that of the input VI reference's connector pane. However, if any of them are wired, the node does not adapt automatically, and the user must explicitly change the connector pane (possibly breaking those wires) by popping up on the node and selecting the Adapt To Reference Input menu item.

At run time there is a small amount of overhead in calling the VI that is not necessary in a normal sub-VI call. This overhead comes from validating the VI reference and a few other bookkeeping details. However, for a call to a VI in the local LabVIEW, this overhead should be insignificant for all but the smallest subVIs. Calling a VI located in another LabVIEW application (across the network) involves considerably more overhead.

The following describes the inputs and outputs of the Call By Reference node:

reference is the refnum associated with a VI that is already open.

error in describes error conditions that occur prior to the execution of this function. The default input of this cluster is no error.

dup reference has the same value as reference.

error out contains error information. If error in indicates an error, error out contains the same error information. Otherwise, it describes the error status that this VI produces.

As noted above, the call by reference node is a specific implementation of the invoke node described with reference to FIG. 36. More specifically, the call by reference node is an invoke node which can only invoke a run method on an application or program.

Property Node

As discussed above, FIG. 35 illustrates the Property node. In this embodiment, the Property node sets (writes) or gets (reads) VI and application property information. In this embodiment, to select the VI or application class, the user pop ups on the node and selects the Select LabVIEW Class submenu. To set an application class, the user selects Application. To set a VI class, the user selects Generic VI, or wires the VI or application refnum to reference and the node choices change accordingly.

To select a specific property, the user pop ups on one of the name terminals and selects Properties. To set property information, the user pop ups and selects Change to Write. To get property information the user pop ups and selects Change to Read. Some properties are read only, so Change to Write cannot be seen in the popup menu. The Property Node works the same way as Attribute Nodes. If the user desires to add items to the node, the user pop ups and selects Add Element or clicks and drags the node to expand the number of items in the node. The properties are changed in the order from top to bottom. If an error occurs on one of the properties, the node stops at that property and returns an error. In this case, no further properties are handled. The error string reports which property caused the error. If the small direction arrow on a property is on the left, then the property value is being set. If the small direction arrow on the property is on the right, the user is getting the property value. Each property name has a short or long name which can be changed by popping up and selecting Name Format. Another name format is no name where only the type is displayed for each property. The VI and application properties that can be used with the Property node are more fully described below in sections titled Properties—Virtual Instrument Class and Properties—Application Class.

The inputs and outputs of the Property node are described below.
- reference is the refnum associated with an open VI or an open copy of LabVIEW across a TCP connection.
- error in describes error conditions that occur prior to the execution of this function. The default input of this cluster is no error.
- dup reference has the same value as reference.
- error out contains error information. If error in indicates an error, error out contains the same error information. Otherwise error out describes the error status that this VI produces.

Invoke Node

Figure 10:
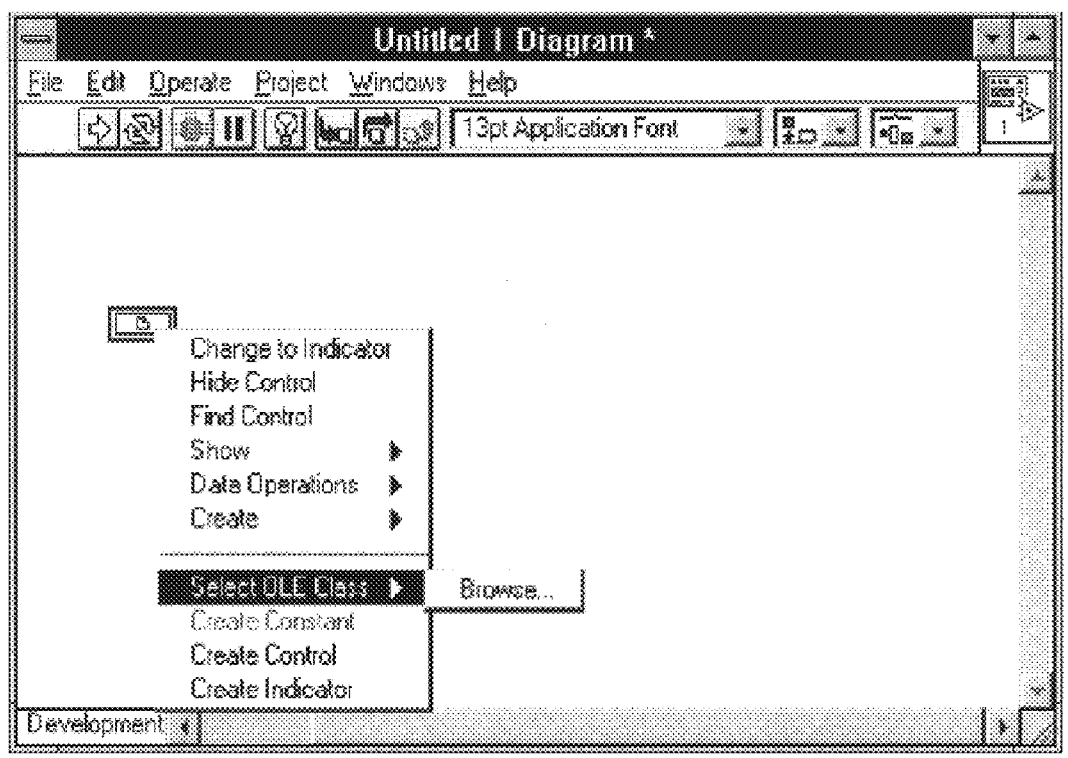
FIG. 10 is a screen shot illustrating an automation refnum in a VI block diagram and a pop-up menu of the automation refnum with a menu selection item for selecting an automation class.

As discussed above, FIG. 36 illustrates the Invoke node. The Invoke node invokes a method or action on a VI. Most methods have parameters associated with them. To select the method, the user pops up anywhere on the node and select Methods. Once the user selects the method, the associated parameters appear as shown in FIG. 10. The user can then set and get the parameter values. Parameters with a white background are required inputs and the parameters with a gray background are recommended inputs. The VI and application methods and their associated parameters that can be used with the Invoke node are discussed below.

The inputs and outputs of the Invoke node are as follows:
- auto refnum in is the refnum associated with a VI on which the user desires to perform an action. error in describes error conditions that occur prior to the execution of this function. The default input of this cluster is no error.
- dup Auto Refnum has the same value as Auto Refnum In.
- error out contains error information. If error in indicates an error, error out contains the same error information. Otherwise error out describes the error status that this VI produces.

Figure 43:
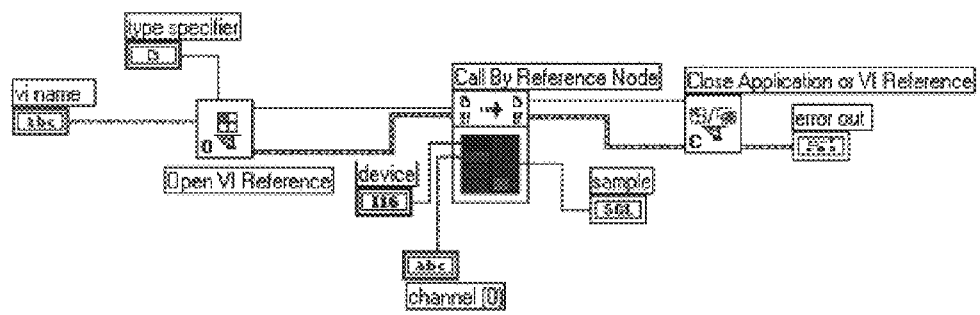
FIG. 43 illustrates a block diagram or graphical program which uses Strictly-typed VI references and utilizes the call by reference node to call a server VI in a client VI.

FIG. 43—Graphical Program using Strictly-Typed VI References

FIG. 43 illustrates a block diagram or graphical program which uses Strictly-typed VI references. It is noted that the order in which the various nodes are placed in the diagram and wired up is not important, and various orders may be used, as desired.

In order to create the graphical program, first the user drops or places a VI Server refnum in a front panel of the graphical program. When the user places the VI Server refnum in the front panel, corresponding terminals appear in the block diagram. There are two different situations in which a strictly-typed VI refnum control is used. The first and perhaps most typical is to pass a strictly-typed VI reference into a VI as a parameter. In this case, the user connects the strictly-typed refnum control to the connector pane of the VI, and the user wires the refnum's terminal on the diagram as the input to the Invoke, Property, or Call By Reference nodes. The value of the refnum is used by each of the these nodes to determine the VI on which it will operate.

The second situation occurs when a strictly-typed refnum control is used as the type specifier for the Open VI Reference function. In this case, the value of the control is ignored—only the type information is used by the Open VI Reference function. It is also possible to use the same strictly-typed refnum control for both of the above situations.

The user drops the VI refnum control on a front panel from the Controls>>Path and Refnum palette. The user chooses the refnum called Application or VI Reference. By default, the type of this refnum is the Application class. To change the refnum control's type, the user pops up on this control and selects the Select LabVIEW Class submenu, as shown in FIG. 14. In this submenu the choices are Application, Generic VI, Browse . . . and a Strictly Typed VIs palette submenu of previously browsed and selected Strictly-typed VI classes.

When the user selects Browse . . . , the Choose VI to open dialog box appears asking the user to select a VI from the file system. The connector pane of the VI that is selected determines the type of the Strictly-typed VI refnum. Selecting the VI establishes that particular refnum control as the class of VIs (that is, VIs with similar connector panes) that the node passes. It is noted that, in the preferred embodiment, only the connector pane of the selected VI is used to establish the refnum's type. LabVIEW does not make any association between the refnum control and the selected VI. In particular, establishing a refnum's type does not provide a reference to the selected VI.

After the user has placed the VI Server refnum in the front panel and has selected a Strictly-typed class, the corresponding terminals in the block diagram provide the respective class information.

The user then drops or places an open reference node in the graphical program, as shown in FIG. 43. For a VI which uses Strictly-typed VI references, the open reference node is the Open VI Reference node. As noted above, in general, a Generic VI reference is used to perform editing operations (e.g., setting properties or invoking functions) on any VI. A Strictly-typed VI reference is used to call a dynamically loaded VI as a sub-VI, and to perform operations that do not edit or change the VI, such as setting its Front Panel window size or location.

The method specifies whether Open VI Reference opens a Generic VI reference or a Strictly-typed VI reference at the point where the user opens the reference to the VI. To get a Strictly-typed VI reference, the user wires a type specifier control to the "type specifier" input of the Open VI Reference function, as shown in FIG. 11. The type specifier specifies the required connector pane of the VI to be called when the VI is loaded at run time. This type specifier also determines the type of the VI reference output of the Open VI Reference function. When the user wires this output to the Call By Reference node, the node adapts to have the same set of input and output terminals as the original type specifier. In other words, the Call By Reference node icon changes appearance to display the connector pane based on its received input.

The Open VI Reference function does not use the names of input and outputs to determine if a VI matches the class established in the node. However, class matching is fairly strict and all of the following must match:
1) connector pane pattern and orientation
2) unconnected and connected terminals, and their types and direction (that is, whether they are input or output)
3) whether an input is required or not After the user establishes the connector panes, LabVIEW retains them in the Strictly Typed VIs submenu, where the user can select them again later. These connector panes are available for a single LabVIEW session only. After quitting and relaunching LabVIEW, this palette submenu is empty until more VIs are selected for their connector pane types.

The user also connects a terminal to the "VI name or path" input of the Call by Reference node to provide the name or path of the VI. The user further connects other inputs of the Open VI Reference node, including the application reference and any desired password.

When the Open VI Reference runs and locates the requested VI (which the user specifies by either a name string or a full path), the Open VI Reference node checks to see that the connector pane of the VI matches that of the type-specifier input (specified by the "type specifier" control). If the connector pane does not match, the Open function fails and returns an error and an invalid reference. If the connector pane does match, then the Open function succeeds and a reference to the VI is returned.

The user then drops a Call by Reference node in the graphical program or block diagram. The user then wires the "vi reference" output of the Open VI Reference node to the reference input of the Call by Reference node. As noted above, the VI reference input accepts wires only from strictly-typed VI references.

As discussed above, the Call by Reference node displays a connector pane comprising input and output terminals corresponding to the referenced VI or graphical program. The Call By Reference node is very similar to a sub-VI node in that either can be used to call a VI. In essence, the Call By Reference node is a sub-VI node is statically linked to a particular VI that the user determines when he/she drops the node on the diagram. The connector pane of the strictly-typed VI reference input determines the pattern and data types of the connector pane which is displayed in the Call By Reference node icon.

The user wires to the terminals on the connector pane displayed in the Call By Reference node icon just as he/she would to a normal sub-VI. Thus, as shown in FIG. 43, two of the inputs to the connector pane are wired to receive inputs, these being "device", which is a 16 bit integer, and a "channel" string. The remaining inputs are optional and are unconnected. The output of the connector pane is wired to an output terminal referred to as "sample" corresponding to an indicator on the front panel.

Thus, the graphical program portion shown in FIG. 11 essentially performs the same function as if the VI being called were present. If the graphical program portion shown in FIG. 43 was part of a larger graphical program, the graphical program portion shown in FIG. 43 would essentially perform the same function as if the VI being called were present as a sub-VI in the larger graphical program.

The connector pane adapts automatically to that of the input VI reference's connector pane, presuming none of the terminals of the connector pane in the Call by Reference node have wires attached to them. However, if any of the terminals are wired, the node does not adapt automatically, and the user must explicitly change the connector pane (possibly breaking those wires) by popping up on the Call by Reference node and selecting the Adapt To Reference Input menu item.

The user then drops the Close Application or VI Reference node in the diagram or graphical program and connects the "vi reference" output of the Call by Reference node to the input of the "application or vi reference" input. The user may also wire up the error in and error out of both the Call by Reference node and the Close Application or VI Reference node at this time.

With this complete, the user has completed a client graphical program which operates to call a VI, wherein the VI may reside on the same or another computer.

With the Call By Reference node, the VI that is called is determined dynamically at run time by the value of the VI reference wired to the reference input at the top of the node.

At run time there is a small amount of overhead in calling the VI that is not necessary in a normal sub-VI call. This overhead comes from validating the VI reference and a few other bookkeeping details. However, for a call to a VI in the local LabVIEW, this overhead should be insignificant for all but the smallest subVIs. Calling a VI located in another LabVIEW application (across the network) involves considerably more overhead.

Figure 44:
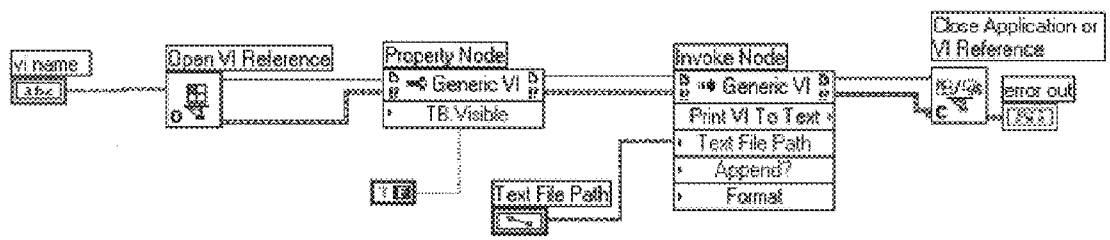
FIG. 44 illustrates a block diagram or graphical program which uses Generic VI references with the Property and Invoke nodes.

FIG. 44—Using Generic VI References with the Property and Invoke nodes

FIG. 44 illustrates a graphical program or block diagram which uses a generic VI reference and uses a property node to get/set properties on the generic VI and uses an invoke node to invoke methods on the generic VI.

Figure 46:
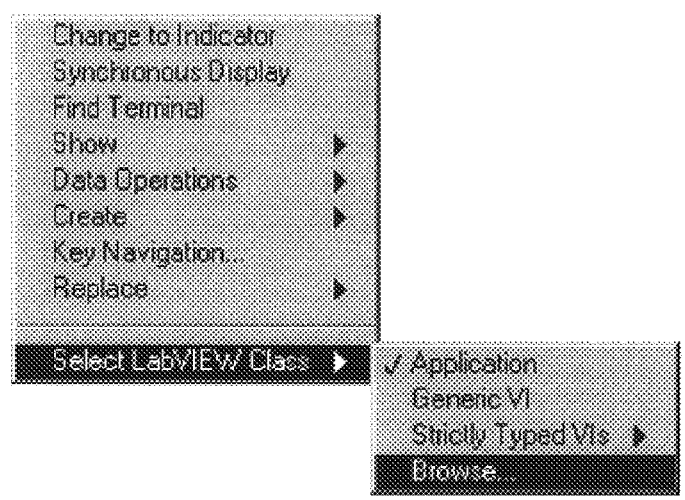
FIG. 46 is a is a screen shot illustrating the "Select LabVIEW Class" submenu.

In order to create the graphical program, first the user drops or places a VI Server refnum in a front panel of the graphical program. When the user places the VI Server refnum in the front panel, corresponding terminals appear in the block diagram. The user drops the VI refnum control on a front panel from the Controls>>Path and Refnum palette. The user chooses the refnum called Application or VI Reference. By default, the type of this refnum is the Application class. To change the refnum control's type, the user pops up on this control and selects the Select LabVIEW Class submenu, as shown in FIG. 46. In this submenu the choices are Application, Generic VI, Browse . . . and a Strictly Typed VIs palette submenu of previously browsed and selected Strictly-typed VI classes. In this example, the user selects the Generic VI option.

After the user has placed the VI Server refnum in the front panel and has selected a Generic VI class, the corresponding terminals in the block diagram provide the respective class information.

The user then drops or places an open reference node in the graphical program, as shown in FIG. 43. For a VI which uses Generic VI references, the open reference node is the Open VI Reference node. It is noted that the Open Application node can be used to provide an application reference output to an input of the Open VI Reference node. As noted above, in general, a Generic VI reference is used to perform editing operations (e.g., setting properties or invoking functions) on any VI. The user wires the vi name terminal to the vi name or path input of the Open VI Reference node.

The method specifies whether Open VI Reference opens a Generic VI reference or a Strictly-typed VI reference at the point where the user opens the reference to the VI. To get a Generic VI reference, the user leaves the type specifier input of the Open VI Reference function unconnected, as shown in FIG. 44. Alternatively, the user wires a Generic VI refnum to the type specifier input of the Open VI Reference function. This type specifier also determines the type of the VI reference output of the Open VI Reference function.

If the user does not wire a strictly-typed VI refnum to the type specifier input, then the type of the VI reference output defaults to the Generic VI class. In this case, the Open function does not attempt to match the connector pane, and so a reference to any VI can be obtained. This is done where the user desires to programmatically edit the VI. However, a Generic VI reference cannot be wired to the Call By Reference Node because, without the type specifier that describes the VI's connector pane, LabVIEW does not have enough information to generate a correct call to the VI.

As shown in FIG. 44, the user can then drop or place one or more Property nodes and/or Invoke nodes in the graphical program. As shown, each of the Property nodes and/or Invoke nodes in the graphical program include a reference input which receives the Generic VI reference output from the Open VI Reference node. Each of Property nodes and/or Invoke nodes also include a dup reference output which is used to pass the reference to other nodes in the diagram. As shown, the dup reference output of the Property node is provided to the reference input of the Invoke node.

As described above, the Property node sets (writes) or gets (reads) VI and application property information. To select the VI or application class, the user pop ups on the node and selects the Select LabVIEW Class submenu. To set an application class, the user selects Application. To set a VI class, the user selects Generic VI, or wires the VI or application refnum to reference and the node choices change accordingly.

To select a specific property, the user pop ups on one of the name terminals and selects Properties. To set property information, the user pop ups and selects Change to Write. To get property information the user pop ups and selects Change to Read. Some properties are read only, so Change to Write cannot be seen in the popup menu. The Property Node works the same way as Attribute Nodes. If the user desires to add items to the node, the user pop ups and selects Add Element or clicks and drags the node to expand the number of items in the node. The properties are changed in the order from top to bottom.

Each property name has a short or long name which can be changed by popping up and selecting Name Format. Another name format is no name where only the type is displayed for each property. The VI and application properties are more filly described below in sections titled "Properties—Virtual Instrument Class and Properties—Application Class".

In the example of FIG. 44, the Property node is configured to set a property called "TB.VIsible".

As described above, the Invoke node invokes a method or action on a VI. Most methods have parameters associated with them. To select the method, the user pops up anywhere on the node and select Methods. Once the user selects the method, the associated parameters appear. The user can then set and get the parameter values. Parameters with a white background are required inputs and the parameters with a gray background are recommended inputs.

In the example of FIG. 44, the Invoke node is configured to perform the Print VI to text method with the following parameters being retrieved: Text File Path, Append? and Format.

The user then drops the Close Application or VI Reference node in the diagram or graphical program and connects the "vi reference" output of the Invoke node to the input of the "application or vi reference" input. The user may also wire up the error in and error out inputs and outputs, as well as other terminals, of the Property node, the Invoke node and the Close Application or VI Reference node at this time.

With this complete, the user has completed a client graphical program which operates to get/set properties and invoke methods on a VI, wherein the VI may reside on the same or another computer.

Figure 45:
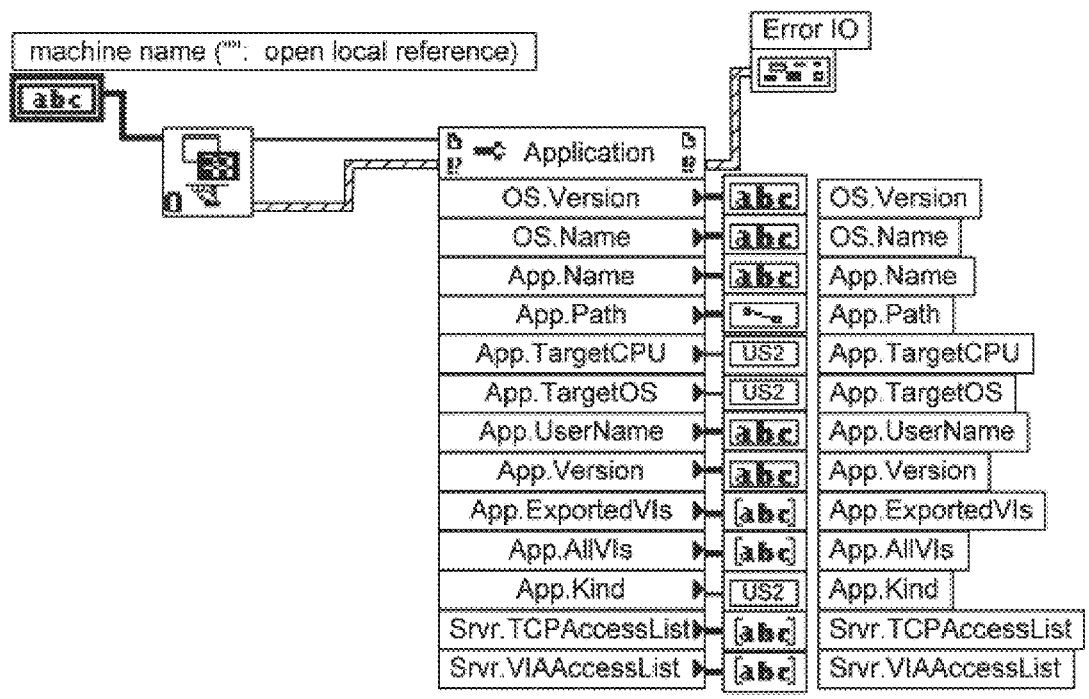
FIG. 45 illustrates a block diagram or graphical program which includes an Open Application node and the Property and/or Invoke nodes to access capabilities of a server application.

FIG. 45—Accessing Server Application Functionality with the Property and Invoke Nodes FIG. 45 illustrates a graphical program or block diagram which uses acceses capabilities of a server application, e.g., uses a property node to get/set properties on the server application and/or uses an invoke node to invoke methods on the server application.

In order to create the graphical program, first the user drops or places a VI Server refnum in a front panel of the graphical program. When the user places the VI Server refnum in the front panel, corresponding terminals appear in the block diagram. The user drops the VI refnum control on a front panel from the Controls))Path and Refnum palette. The user chooses the refnum called Application or VI Reference. By default, the type of this refnum is the Application class, and thus this class is automatically selected.

After the user has placed the VI Server refnum in the front panel and has selected the Application class, the corresponding terminals in the block diagram provide the respective class information.

The user then drops or places an open reference node in the graphical program, as shown in FIG. 45. To access capabilities of a server application, the open reference node is the Open Application Reference node. As noted above, in general, an Application reference is used to perform editing operations (e.g., setting properties or invoking functions) on any application. The user wires the machine name terminal to the machine name input of the Open Application Reference node.

The user then drops or places a Property node in the diagram, and wires the application reference output of the Open Application node to the input of the Property node. As shown, the user can then select one or more properties as described above. As shown, the error output of the Property node is connected to an Error IO terminal. Although not shown in FIG. 45 the dup reference output of the Property node is preferably connected to the application reference input of a Close Application node.

Execution

The method further includes constructing executable instructions in response to the graphical program including the VI Server nodes. The executable instructions are operable to access capabilities of an object, such as call a graphical program or application. More particularly, in the case of a call by reference node, the executable instructions are operable to call or invoke a graphical program or VI, and in the case of a property or invoke node, the executable instructions are operable to get/set properties or invoke methods, respectively, of the instantiated object, which can be either a graphical program or application. The method then executes the executable instructions on the computer.

During execution, the respective access node, e.g., either the call by reference node or the invoke or property node, in the client communicates with the server to obtain a reference to the server VI or application. The client then operates to create a proxy callee, and the server operates to create a proxy caller, to accomplish accessing capabilities in the server VI or server application. The operation is discussed in more detail below.

Configuring the VI Server

The user can configure which parts of the VI Server are available to other applications, as well as enable or disable particular protocols and specify which server resources are exported.

1. Server Configuration

To configure the server for external applications, the user selects Edit>>Preferences on the server machine and select Server: Configuration from the drop down menu. The dialog box appears as shown in FIG. 47.

Figure 47:
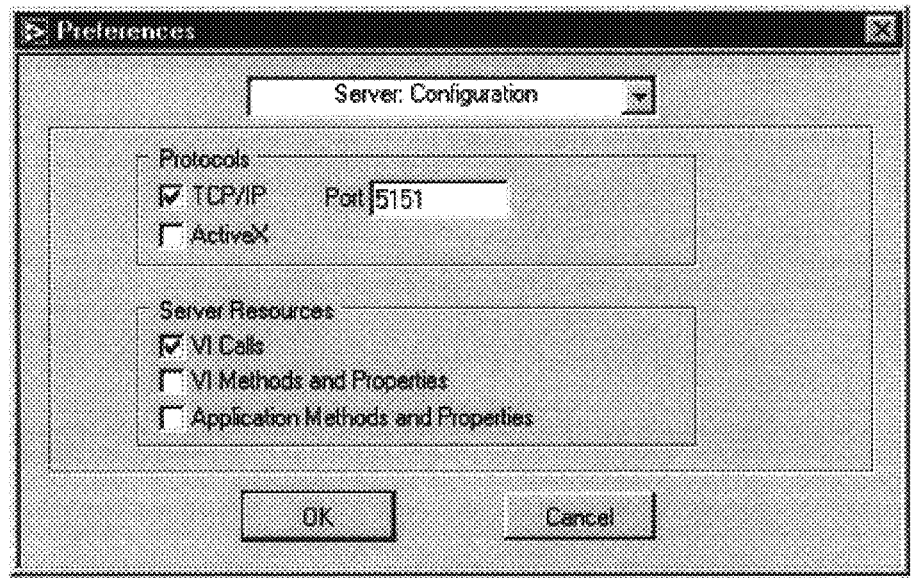
FIG. 47 is a is a screen shot illustrating the Server Configuration Dialog Box.

The options shown in FIG. 47 specify through which communication protocols other applications can access the VI Server: TCP/IP or ActiveX protocols. If the user enables TCP/IP, the user must enter the Port number that client applications use to connect to the server. When the user allows other applications to connect using TCP/IP, the user should also configure which Internet hosts have access to the server. See the TCP/IP Access Configuration section for more information. For more information about the VI server ActiveX interface, refer to U.S. provisional patent application Serial No. 60/056,528 titled "System and Method for Providing Automation Server Capabilities in Graphical Programs" filed Aug. 21, 1997, whose inventors are Ram Kudukoli, Robert Dye, and Murali Parthasarathy, which is hereby incorporated by reference.

With Server: Configuration selected, the user also specifies which server resources are available to applications that access the VI Server. The following server resources are available:

VI Calls allows applications to make calls to VIs on the server. When the user allows other applications access to VIs, the user should also configure which VIs they have access to. See the section Exported VIs Configuration for more information.

VI Methods and Properties allows applications to read and set the properties of VIs on the server. When the user allows other applications access to VIs, the user should also configure which VIs they have access to. See the section Exported VIs Configuration for more information.

Application Methods and Properties allows applications to read and set the properties of the server.

In FIG. 47 above, TCP/IP server access is enabled for port 5151 and the ActiveX server access is disabled. The server allows remote clients to call VIs, but does not allow access to VI or application methods and properties.

The default server settings have ActiveX enabled and TCP/IP disabled. By default, VI Calls is enabled, but VI Methods and Properties and Application Methods and Properties are disabled.

2. Exported VIs Configuration

Figure 48:
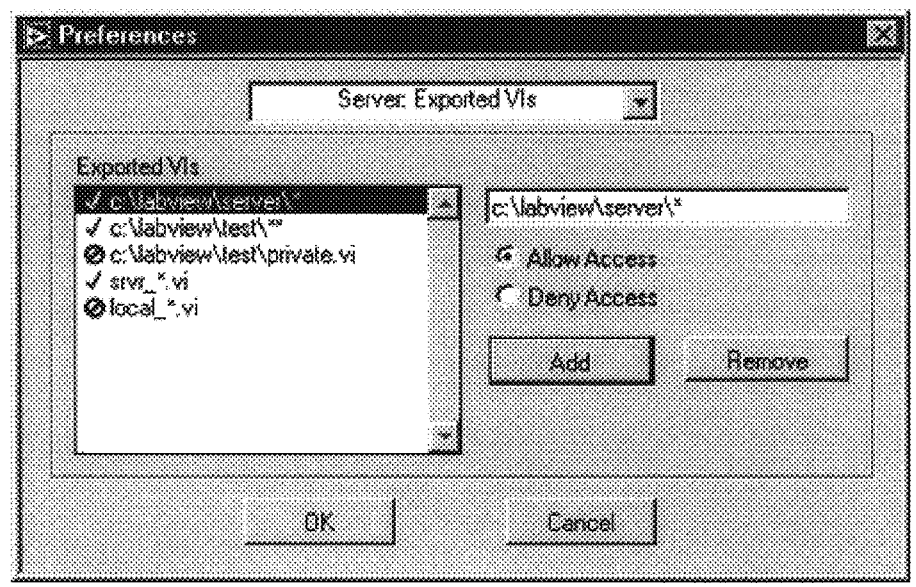
FIG. 48 is a is a screen shot illustrating the TCP/IP Access Dialog Box for selecting Exported VIs.

If the user allows remote applications to access VIs on the VI Server, the user should specify which VIs these applications can access. To configure the exported VIs, the user selects Edit>>Preferences on the server computer, then selects Server: Exported VIs from the drop down menu. The dialog box appears as shown in FIG. 48.

The Server: Exported VIs options allows the user to specify which VIs other applications can access through the VI Server. The Exported VIs list specifies which VIs are exported. To change an entry, the user selects it from the list, then types into the text box at the right of the Exported VIs list. To specify whether remote computers can or cannot access that VI, the user clicks on the Allow Access or Deny Access radio buttons. The user clicks the Add button to insert a new entry after the current selection. The user clicks the Remove button to delete the current selection. The user clicks and drags an entry to change its position within the Exported VIs list. If an entry allows access to VIs, a check mark appears next to the entry. If an entry denies access to VIs, a "cross out" symbol appears next to the entry. If no symbol appears next to the entry, the syntax of the entry is incorrect.

Each entry in the list describes a VI name or a VI path and may contain wildcard characters (see the paragraph below on wildcard characters). Entries that contain path separators are compared against VI paths, while entries that do not contain path separators are compared against VI names only. When a remote client tries to access a VI, the server examines the Exported VIs list to determine whether to grant access to the requested VI. If an entry in the list matches the requested VI, the server either allows or denies access to that VI, based on how that entry is set up. If a subsequent entry also matches the VI, its access permission is used in place of the previous permission. If there is not a VI in the list that matches the requested VI, access to the VI is denied.

As mentioned earlier, the user can use wildcard characters in the Exported VIs list so an entry in the list matches more than one VI. The following wildcard characters can be used:

| | |
|---|---|
| `?' | matches exactly one arbitrary character, except for the path separator. |
| `*' | matches zero or more arbitrary characters, except for the path separator. |
| `**' | together match zero or more arbitrary characters, including the path separator. |

If the user wants to match a VI with a name that contains a wildcard character, the user must escape that character using '\' on the Macintosh and UNIX platforms, and using '`' on Windows.

The following tables shows some examples of Exported VI list entries. The examples use UNIX path separators.

TABLE 1

| Server: TCP/IP Access Entries | |
|---|---|
| * | Matches all VIs |
| /usr/labview/* | Matches all VIs in the directory /usr/labview/. |
| /usr/labview/** | Matches all VIs in the directory /usr/labview/ and any of its sub-directories. |
| Test.vi | Matches any VI named "Test.vi". |
| *export* | Matches any VI with a name that contains the string "export". |
| OK\? | Matches any VI with the name OK?. |

In FIG. 48 all VIs in the c:\labview\server directory are exported. All VIs in the c:\labview\test directory and all its sub-directories are exported as well, with the exception of the VI c:\labview\test\private.vi. Additionally, any VI that begins with the string srvr_ and ends with the string .vi is exported. No VI that begins with the string local_ and ends with the string .vi is exported, even if it is located within the c:\labview\server directory.

The default Exported VIs settings allow access to all VIs.

3. TCP/IP Access Configuration

Figure 49:
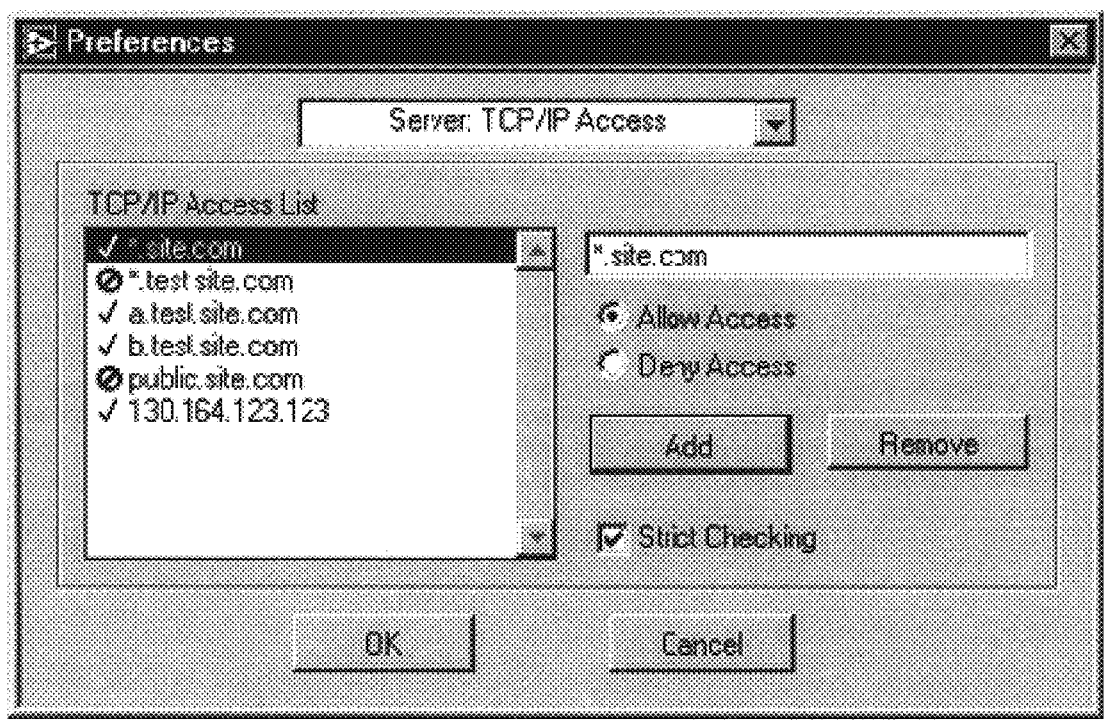
FIG. 49 is a is a screen shot illustrating the TCP/IP Access Dialog Box for selecting TCP/IP access.

When the user allows remote applications to access the VI Server using the TCP/IP protocol, the user should specify which Internet hosts have access to the server. To configure the clients that have access, the user selects Edit>>Preferences on the server machine and selects Server: TCP/IP Access from the drop down menu. The options appear in the Preferences dialog box as shown in FIG. 49.

Selecting Server: TCP/IP Access allows the user to specify which clients can access the VI Server. The TCP/IP Access List describes clients that either have access to or are denied access to the LabVIEW server. To change an entry, the user selects it from the list, then types into the text box at the right of the TCP/IP Access List. The user clicks on the Allow Access radio button to allow the client to access the server. The user clicks the Deny Access radio button to deny the client access to the server. The user clicks the Add button to insert a new entry after the current selection. the user clicks the Remove button to remove the current selection from the list. The user clicks and drags an entry to change its position within the TCP/IP Access List. If an address is allowed access, a check mark appears next to the entry. If an address is denied access, a "cross out" symbol appears next to the entry. If no symbol appears next to the entry, the syntax of the entry is incorrect.

When a client tries to open a connection to the server, the server examines the entries in the TCP/IP Access List to determine whether it grants access to the client. If an entry in the list matches the client's address, the server either allows or denies access, based on how the user set up the entry. If a subsequent entry also matches the client's address, its access permission is used in place of the previous permission. (For example, in FIG. 16 above, a.test.site.com in the TCP/IP Access List is allowed access even though the list indicates that all addresses ending in .test.site.com are not allowed access. See the paragraph on wildcards later in this document.) If no entry matches the client's address, access is denied.

An Internet (IP) address, such as "130.164.123.123", may have one domain name (such as "www.natinst.com") or more associated with it. The conversion from a domain name to its corresponding IP address is called name resolution. The conversion from an IP address to its domain name is called name lookup.

Name lookups and name resolutions are done through system calls that access domain name system (DNS) servers on the Internet. A name lookup or resolution can fail when the system does not have access to a DNS server, or when the address or name is not valid. A resolution problem occurs when an entry contains a domain name that cannot be resolved into an IP address. A lookup problem occurs when an entry contains a partial domain name, such as "*.natinst.com", and the lookup for the client's IP address fails.

The Strict Checking option determines how the server treats access list entries that cannot be compared to a client's IP address because of resolution or lookup problems. When Strict Checking is enabled, a denying access list entry in the TCP/IP Access List that encounters a resolution problem is treated as if it matched the client's IP address. When Strict Checking is disabled, an access list entry that encounters a resolution problem is ignored.

To specify an Internet host address, the user enters its domain name or IP address. The * wildcard can be used when specifying Internet host addresses. For example, the user can specify all hosts within the domain domain.com with the entry *.domain.com. The user can specify all hosts in the subnet whose first two octets are 130.164 with the entry 130.164.*. The entry * matches all addresses.

The following table shows some examples of TCP/IP Access List entries.

TABLE 2

Server: TCP/IP Access

| * | Matches all hosts. |
|---|---|
| test.site.com | Matches the host whose domain name is test.site.com. |
| *.site.com | Matches all hosts whose domain name ends with *.site.com. |
| 130.164.123.123 | Matches the host with the IP address 130.164.123.123. |
| 130.164.123.* | Matches all hosts whose IP address starts with 130.164.123. |

In FIG. 49 all hosts in the site.com domain have access to the server, with the exception of all hosts in the test.site.com domain. Additionally, the hosts a.test.site.com, b.test.site.com and 130.164.123.123 have also access to the server. The host public.site.com does not have access, even though it is in the site.com domain.

The default TCP/IP Access settings allow access only to clients on the server machine.

It is noted that, if the VI Server runs on a system that does not have access to a DNS server, domain name entries should not be used in the TCP/IP Access list—requests to resolve the domain name or an IP address will fail, slowing down the system. For performance reasons, place frequently matched entries toward the end of the TCP/IP Access List.

Local Client/Server Communication

When a client on a first computer accesses functionality of a VI located on the first computer, i.e., accesses a local VI, the respective access node, e.g., the call by reference node, the invoke node, or the property node, operates to manipulate or access the VI in a similar manner as if the VI were in the client graphical program.

FIGS. 50A–50D Client/Server Communication Over a Network

FIGS. 50A–50D illustrate operation of a client on a first computer accessing functionality of a VI located on a second (different) computer. The first computer where the client graphical program executes is referred to as the client, and the second computer where the server graphical program (VI) or application exists is referred to as the server. In this diagram, the squares on the left represent the client side code of LabVIEW, and the circles on the right hand side represent the LabVIEW server code.

Each message that is sent between the client code and the server code contains four fields of information at the very beginning, or message header: 1) an error code, used in reply messages from the server and unused in messages sent from the client. 2) a message identifier that simply identifies the content of the message. 3) a unique identifier that is usually used by the client to identify transactions. The server simply returns this unique id in the reply for that message. For some messages and replies, this field is used as reply information. 4) a message length that contains the number of bytes in any extra data that is contained in the message.

Figure 50A:
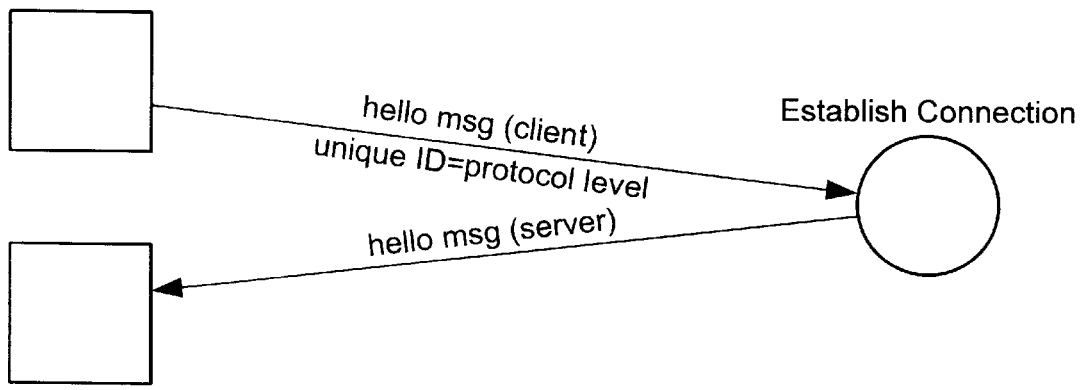
FIGS. 50A–D illustrate how VIs and applications are accessed on remote computer systems according to the present invention.

Referring now to FIG. 50A, in order to establish a connection, the client sends the first message. This first message is basically a "hello" transmitted to the server, and the server replies with a hello message back. The message id indicates that the transmitting device is a client and is saying hello. The unique id informs the server as to what protocol version the client is using. By exchanging the protocol version that each is using, the client code and server code ensure that the other will understand the messages that they send.

The server replies with a hello message saying either that the server is using the same protocol version as the client, or the server returns an error and also tells the client what protocol version the server is communicating with.

Figure 50B:
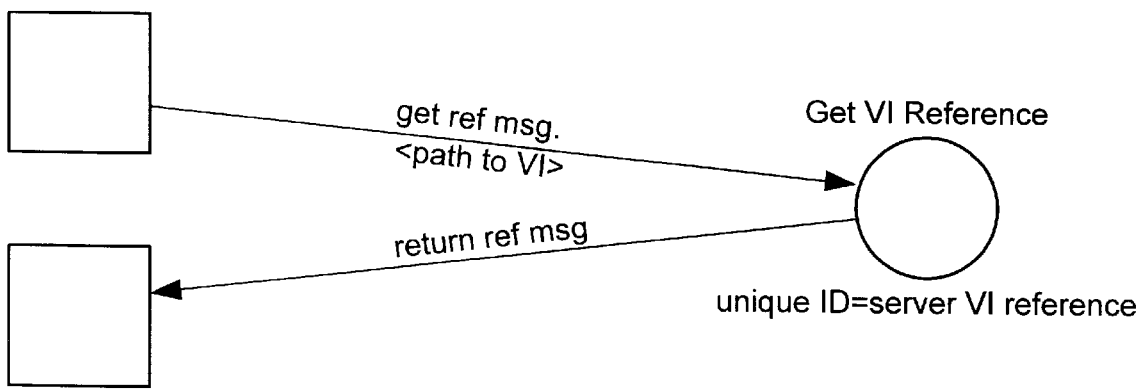

Referring now to FIG. 50B, the Get VI reference operation is shown. The Get VI reference always starts with the client. The client asks the server for a reference to a VI. The most important information that the client transmits to the server is a path to the VI or a VI name that identifies the VI. This information is appended to the end of the message just after the message header. The unique id of the message is generated by the client in such a way that it can match up the reply with the request. The server reply contains this unique id and, appended to the message header, another unique id that is the reference to the server's VI, hereafter referred to as the target VI.

When the client gets a VI reference, the client constructs a "stand-in" VI called a proxy callee. A proxy callee is essentially a stub, i.e., a virtual instrument that contains only the most fundamental of data structures representing a virtual instrument. Any operation that the client desires to perform on the target VI (server VI) goes to the proxy callee, and the operation is sent across the network to the server side and the operation takes place there on the target VI.

Figure 50C:
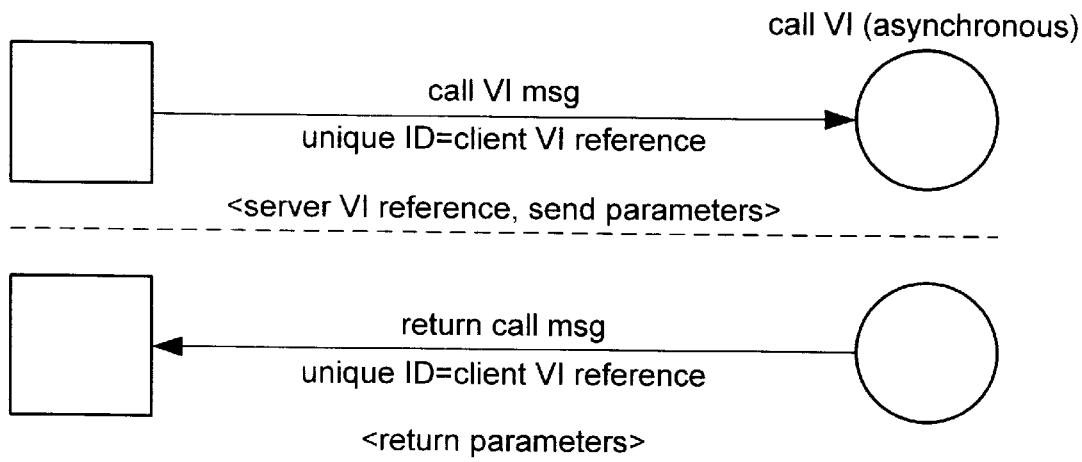

Referring now to FIG. 50C, the Call VI operation is shown. As shown, on the client side, the client actually calls the proxy callee. When the proxy callee in the client is called at run time, the code that actually executes is networking code that basically takes the arguments to the VI, converts them into a well-defined format suitable for transmission over a network connection, and transmits them to the server. The proxy callee sends the flattened data out across the network stream to the server.

On the server side, upon realizing that the client wishes to call the target VI, the server creates another "stand-in" VI, called a proxy caller VI. This proxy caller VI is used to reconstruct the call to the target VI on the server side. It's primary purpose is to simply call the target VI. The server code receives the inputs to the target VI call, converts them into the format that is used for normal execution, and copies them into the proxy caller's data space. The proxy caller is then executed, and it calls the target VI in the same manner as a normal sub VI call.

When the target VI completes and returns, the operation beneath the dotted line is performed. When the target VI finishes, it returns to the proxy caller, which in this example is the target VI proxy caller. The target VI proxy caller on the server side receives the return values, converts them into a well-defined format suitable for transmission over a network connection and sends them back to the client in a message identified as a return call. As shown in FIG. 50C, the return call message includes return parameters which comprise the output of the called or target VI. The return call message also includes the unique id of the client VI reference.

When these parameters are received by the client, the client code finds the VI reference and determines the caller associated with this return call message. The client receives these parameters, converts them into the format that is used for normal execution, and returns the values to the actual caller on the client side.

Figure 50D:
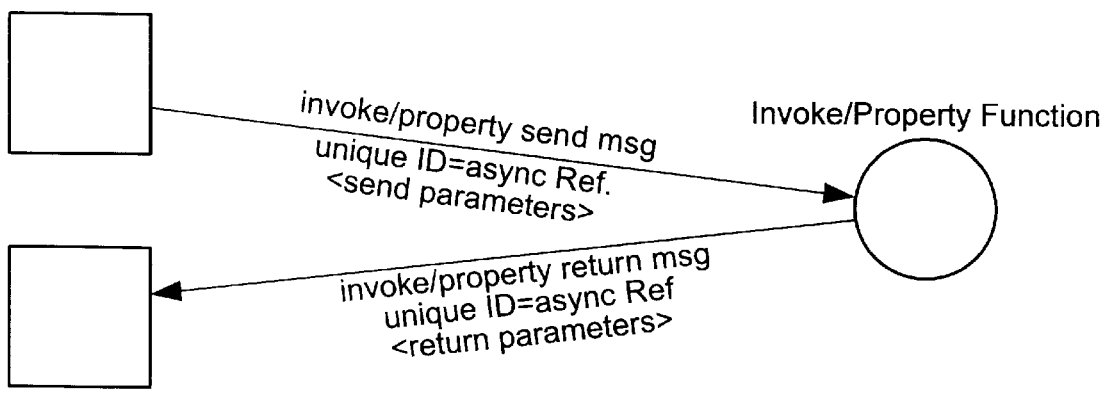

Referring now to FIG. 50D, for the invoke and property functions, operation is similar to that described above with reference to FIG. 50C. For the invoke and property functions, the client is not calling a VI, but rather the client is getting/setting properties on a VI or invoking methods on VIs.

Property Node

Properties—Virtual Instrument Class

The properties in the VI class which can be get/set by the Property node are described in U.S. patent application Ser. No. 08/916,005, referenced above. These properties are set on a VI in edit mode through VI Setup and the menu options.

FIGS. 51–54: Third Embodiment

FIGS. 51–54 illustrate a third embodiment where the object node comprises a user interface node which manipulates data on objects comprised in the node. In the preferred embodiment, the user interface object node is an ActiveX container.

ActiveX Front Panel Enhancements

Figure 51:
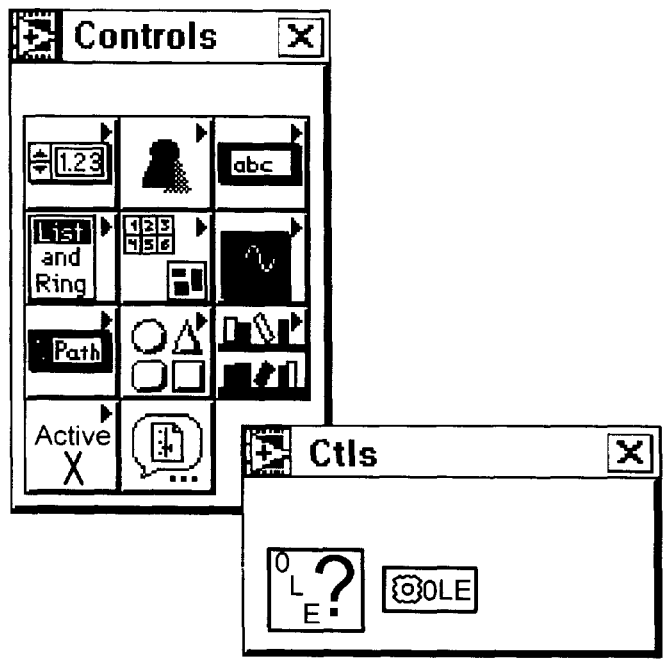
FIG. 51 illustrates ActiveX controls referred to as ActiveX container and ActiveX variant.

In this embodiment, the graphical programming system, e.g., LabVIEW, includes a new control subpalette for the front panel, the Ctls subpalette, which includes two ActiveX controls: ActiveX Container and Active X Variant, as shown in FIG. 51.

These new controls allow the user to take advantage of the ActiveX Container capability, and enhance the interactions between LabVIEW and other applications.

ActiveX Variant Control and Indicator

The ActiveX Variant control and indicator allows passage of Active X Variant data into LabVIEW, so ActiveX client functionality is enhanced. This front panel object is used when ActiveX Variant data is converted to data that Lab-VIEW can display.

ActiveX Container

Figure 52:
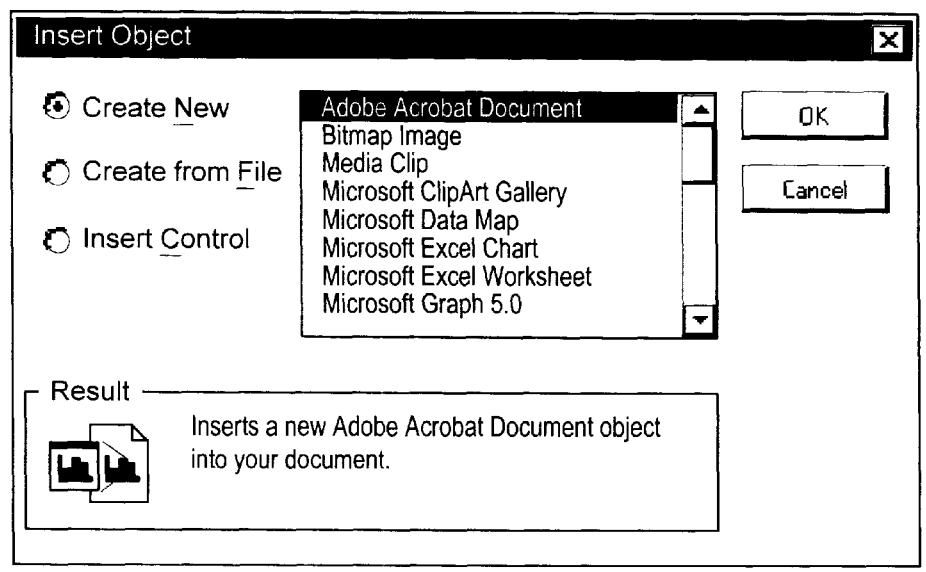
FIGS. 52–54 illustrate the Insert Object dialog box for inserting different types of objects into the front panel.

The ActiveX container manipulates data on ActiveX objects. These changes are preferably displayed in the container on the front panel. This container allows the user to use ActiveX controls and embed documents on the front panel. FIG. 52 illustrates the.

The ActiveX container appears as an automation refnum terminal on the block diagram. This terminal can be wired to Automation functions and, therefore, control the object embedded in the container. If that object has no Automation interface, then the term has an invalid refnum and cannot be used in the Automation functions.

To insert an object into the front panel container, the user pops up and selects Insert ActiveX Object. The Insert Object dialog box appears as shown in FIG. 25.

Figure 53:
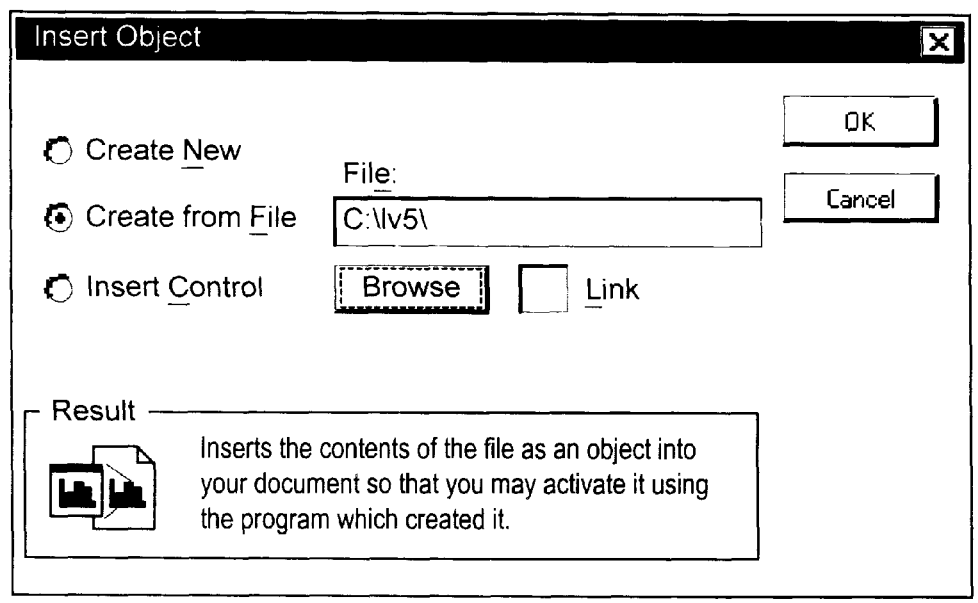

Two types of objects can be placed in the container: controls and documents. The user can create a new control or document or insert an existing document or control. To create a new control or document, the user selects "Create New" (as shown in FIG. 53) and selects the object type from the items listed. To insert an existing document or file, the user selects "Create from File" and the dialog changes to that shown in FIG. 53.

The user designates the document to insert, and the user can Browse . . . to find that document. If the Link option is selected, the document is updated when the front panel object is updated. If the user does not select Link, a static version of the document is inserted.

Figure 54:
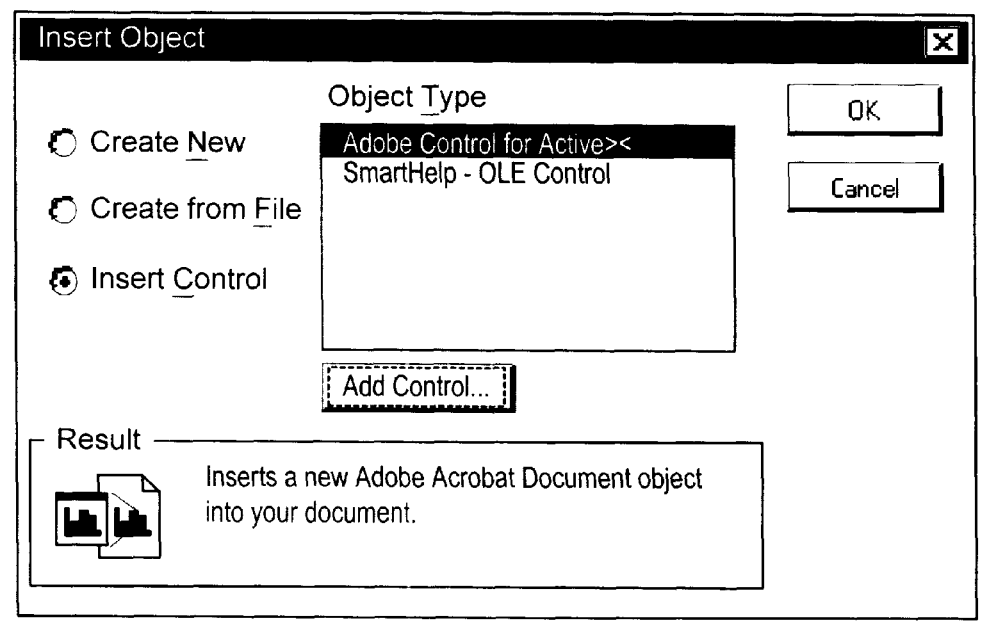

To insert an existing control, the user selects "Insert Control" and the dialog changes to that shown in FIG. 54.

The available object types are listed, but the user can add other controls to this list by pressing the Add Control . . . button. The user can edit the appearance of an ActiveX object by popping up and selecting Edit Object. The application that can edit that object opens. The changes are saved to the container in LabVIEW.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer-implemented method for creating a graphical program, wherein the method for creating the graphical program operates in a computer including a display screen and a user input device, the method for creating the graphical program comprising:

creating the graphical program in response to user input, wherein the graphical program is created in a first graphical program development environment, wherein said creating the graphical program includes:

displaying on the screen a first node in the graphical program in response to user input, wherein the first node is operable to access capabilities of a software object, wherein the software object is not present in the first graphical program development environment;

configuring the first node to receive information on the software object in response to user input;

wherein, during execution of the graphical program, the first node is operable to access the capabilities of the software object.

2. The method of claim 1, wherein the software object is created in a second program development environment, wherein the second program development environment is different than the first graphical program development environment.

3. The method of claim 2,
wherein the second program development environment is a text-based program development environment.

4. The method of claim 1, further comprising:
creating the software object in a second program development environment, wherein the second program development environment is different than the first graphical program development environment.

5. The method of claim 1,
wherein the software object is operable to execute independently of the graphical program.

6. The method of claim 1,
wherein the software object exists prior to said creating the graphical program.

7. The method of claim 1, further comprising:
executing the graphical program, wherein the graphical program is executed by a graphical program execution engine;
wherein said executing the graphical program comprises executing the first node to access the capabilities of the software object;
wherein said accessing the capabilities of the software object comprises executing the software object;
wherein the software object executes without use of the graphical program execution engine.

8. The method of claim 1, further comprising:
executing the graphical program in a first process;
wherein execution of the graphical program causes execution of the software object;
wherein the software object executes in a second process.

9. The method of claim 1,
wherein said creating the graphical program in response to user input does not include receiving user input specifying text-based programming language source code to implement the graphical program;
wherein the software object is a pre-existing software object that was constructed in response to text-based programming language source code.

10. The method of claim 1,
wherein the graphical program includes a plurality of nodes visually indicating functionality of the graphical program;
wherein the software object is not one of the plurality of nodes.

11. The method of claim 1,
wherein the graphical program includes a plurality of nodes visually indicating functionality of the graphical program;
wherein the software object does not implement functionality of any of the plurality of nodes.

12. The method of claim 1, further comprising:
compiling the graphical program to produce a first portion of executable code;
wherein the software object comprises a second portion of executable code which is independent from the first portion of executable code.

13. The method of claim 1,
wherein the first node is an object node specifically designed to access capabilities of software objects external to graphical programs.

14. The method of claim 1,
wherein the computer is a first computer coupled to a second computer through a network;
wherein the software object is stored on the second computer.

15. The method of claim 14, further comprising:
executing the graphical program, wherein the graphical program executes on the first computer;
wherein said executing the graphical program comprises executing the first node to access the capabilities of the software object, wherein said accessing the capabilities of the software object causes execution of the software object on the second computer.

16. The method of claim 15, further comprising:
displaying on the screen a user interface panel in response to user input for displaying data input to and/or output from the graphical program.

17. The method of claim 1, wherein the method for creating the graphical program further comprises:
arranging on the screen the graphical program including said first node.

18. The method of claim 17, wherein the graphical program comprises a plurality of nodes, wherein the method for creating the graphical program further comprises:
arranging on the screen said plurality of nodes, including said first node; and
connecting said plurality of nodes and said first node in response to user input to create the graphical program.

19. The method of claim 18, wherein the method creates a graphical data flow program;
wherein said connecting includes connecting said plurality of nodes and said first node to provide data flow between said plurality of nodes and said first node.

20. The method of claim 17, wherein the method for creating the graphical program further comprises:
displaying on the screen a user interface panel in response to user input for displaying data input to and/or output from the graphical program.

21. The method of claim 20, wherein the method for creating the graphical program further comprises:
arranging on the screen the user interface panel in response to user input.

22. The method of claim 1, further comprising:
constructing execution instructions in response to said graphical program, wherein said execution instructions are executable to access said capabilities of the software object; and
executing said execution instructions, wherein said first node accesses said capabilities of the software object during said executing.

23. The method of claim 1, wherein the software object is an independent application;
wherein the first node is operable to perform one or more of 1) trigger execution of the independent application; or 2) get/set one or more properties of the independent application.

24. The method of claim 1,
wherein the software object comprises one of:
an ActiveX object;
a Java object;
a C++ object;
a CORBA object.

25. The method of claim 1,
wherein the software object comprises a first method;
wherein the first node is operable to invoke the first method of the software object.

26. The method of claim 25, further comprising:
configuring the first node to invoke the first method of the software object in response to user input.

27. The method of claim 1,
wherein the software object comprises a first property;
wherein the first node is operable to perform one or more of:
get the first property;
set the first property.

28. The method of claim 27, further comprising:
configuring the first node to get/set the first property of the software object in response to user input.

29. The method of claim 1,
wherein said first node includes an object reference input for receiving a reference to the software object;
wherein said configuring comprises connecting said object reference input of said first node to receive the reference to said software object.

30. The method of claim 29,
wherein said object node receives said information on said software object on said object reference input during execution of the graphical program.

31. The method of claim 30, wherein said configuring comprises:
displaying on the screen an object reference node which includes an object reference output that provides the reference to said software object; and
connecting the object reference output of said object reference node to said object reference input of said first node.

32. The method of claim 1,
wherein said configuring comprises configuring said first node with a reference to said software object in response to user input.

33. The method of claim 1,
wherein the graphical program comprises a diagram portion and a user interface portion;
wherein the first node is comprised in the diagram portion.

34. The method of claim 1,
wherein the graphical program comprises a diagram portion and a user interface portion;
wherein the first node is comprised in the user interface portion.

35. The method of claim 1, wherein the software object is comprised in a server, wherein said configuring comprises:
displaying on the screen a list of libraries associated with one or more servers;
selecting a library from said list of libraries in response to user input
displaying on the screen a list of possible classes from the selected library; and
selecting a class from said list of possible classes in response to user input;
wherein said software object is instantiated from said class.

36. A computer-implemented method for creating a graphical program, wherein the method for creating the graphical program operates in a computer including a display screen and a user input device, the method for creating the graphical program comprising:
creating the graphical program in response to user input, wherein the graphical program is created in a first graphical program development environment, wherein said creating the graphical program includes:
displaying on the screen an object node in the graphical program in response to user input, wherein said object node is operable to access capabilities of a software object, wherein the software object is external to, and created independently of, the first graphical program development environment;
configuring the object node to receive information on the software object in response to user input;
wherein, during execution of the graphical program, the object node is operable to access said capabilities of the software object.

37. A computer-implemented method for creating a graphical program, wherein the method for creating the graphical program operates in a computer including a display screen and a user input device, the method for creating the graphical program comprising:
executing a first graphical program development environment application;
receiving user input to the first graphical program development environment application for creation of the graphical program;
wherein said receiving user input to the first graphical program development environment application comprises:
receiving user input requesting inclusion of a first node in the graphical program;
receiving user input to configure the first node to access capabilities of a pre-existing software object;
wherein, during execution of the graphical program, the first node is operable to access said capabilities of the pre-existing software object.

38. The method of claim 37, further comprising:
compiling the graphical program to produce executable code;
wherein the executable code of the graphical program is executable to invoke execution of the pre-existing software object.

39. The method of claim 37, further comprising:
executing the graphical program;
wherein execution of the graphical program causes execution of the software object;
wherein the software object executes independently of the graphical program.

40. The method of claim 37, further comprising:
executing the graphical program in a first process;
wherein execution of the graphical program causes execution of the software object;
wherein the software object executes in a second process.

41. The method of claim 37,
wherein the pre-existing software object was created in a second program development environment, wherein the second program development environment is different than the first graphical program development environment.

42. The method of claim 37,
wherein said receiving user input to the first graphical program development environment application for creation of the graphical program does not include receiving user input specifying text-based programming language source code;
wherein the pre-existing software object was constructed in response to text-based programming language source code.

43. The method of claim 37, further comprising:
executing the graphical program, wherein the graphical program is executed by a graphical program execution engine;
wherein said executing the graphical program comprises executing the first node to access the capabilities of the software object;
wherein said accessing the capabilities of the software object comprises executing the software object;
wherein the software object executes without use of the graphical program execution engine.

44. The method of claim 37,
wherein the graphical program includes a plurality of nodes visually indicating functionality of the graphical program;
wherein the software object is not one of the plurality of nodes.

45. The method of claim 37,
wherein the graphical program includes a plurality of nodes visually indicating functionality of the graphical program;
wherein the software object does not implement functionality of any of the plurality of nodes.

46. The method of claim 37, further comprising:
compiling the graphical program to produce a first portion of executable code;
wherein the software object comprises a second portion of executable code which is independent from the first portion of executable code.

47. The method of claim 37,
wherein the computer is a first computer coupled to a second computer through a network;
wherein the pre-existing software object is stored on the second computer.

48. The method of claim 47, further comprising:
executing the graphical program, wherein the graphical program executes on the first computer;
wherein said executing the graphical program comprises executing the first node to access the capabilities of the software object, wherein said accessing the capabilities of the software object causes execution of the software object on the second computer.

49. The method of claim 37, wherein the graphical program comprises a plurality of nodes, wherein the method further comprises:
arranging on the screen said plurality of nodes, including said first node; and
connecting said plurality of nodes and said first node in response to user input to create the graphical program.

50. The method of claim 49, wherein the method creates a graphical data flow program;
wherein said connecting includes connecting said plurality of nodes to provide data flow between said plurality of nodes.

51. The method of claim 37, further comprising:
constructing execution instructions in response to said graphical program, wherein said execution instructions are executable to access said capabilities of the software object; and
executing said execution instructions, wherein said first node accesses said capabilities of the software object during said executing.

52. The method of claim 37,
wherein the pre-existing software object comprises one of:
an ActiveX object;
a Java object;
a C++ object;
a CORBA object.

53. The method of claim 37,
wherein the software object comprises a first method;
wherein the first node is operable to invoke the first method of the software object.

54. The method of claim 53, further comprising:
configuring the first node to invoke the first method of the software object in response to user input.

55. The method of claim 37,
wherein the software object comprises a first property;
wherein the first node is operable to perform one or more of:
get the first property;
set the first property.

56. The method of claim 55, further comprising:
configuring the first node to get/set the first property of the software object in response to user input.

57. A memory medium which stores a graphical program development environment, wherein the graphical program development environment comprises program instructions executable to create a graphical program in response to user input, wherein said creating the graphical program includes:
displaying on a display screen a first node in the graphical program in response to user input, wherein the first node is operable to access capabilities of a software object, wherein the software object is not present in the first graphical program development environment;
configuring the first node to receive information on the software object in response to user input;
wherein, during execution of the graphical program, the first node is operable to access the capabilities of the software object.

58. The memory medium of claim 57,
wherein the software object is created in a second program development environment, wherein the second program development environment is different than the first graphical program development environment.

59. The memory medium of claim 58,
wherein the second program development environment is a text-based program development environment.

60. The memory medium of claim 57, further comprising:
creating the software object in a second program development environment, wherein the second program development environment is different than the first graphical program development environment.

61. The memory medium of claim 57,
wherein the software object is operable to execute independently of the graphical program.

62. The memory medium of claim 57,
wherein the software object exists prior to creating the graphical program.

63. The memory medium of claim 57, wherein the graphical program development environment further comprises program instructions executable to manage execution of the graphical program;
wherein said executing the graphical program comprises executing the first node to access the capabilities of the software object;
wherein said accessing the capabilities of the software object comprises executing the software object;
wherein said execution of the software object is not managed by the graphical program development environment.

64. The memory medium of claim 57,
wherein said creating the graphical program in response to user input does not include receiving user input specifying text-based programming language source code to implement the graphical program;
wherein the software object is a pre-existing software object that was constructed in response to text-based programming language source code.

65. The memory medium of claim 57,
wherein the graphical program includes a plurality of nodes visually indicating functionality of the graphical program;
wherein the software object is not one of the plurality of nodes.

66. The memory medium of claim 57,
wherein the graphical program includes a plurality of nodes visually indicating functionality of the graphical program;
wherein the software object does not implement functionality of any of the plurality of nodes.

67. The memory medium of claim 57, wherein the graphical program development environment further comprises program instructions executable to compile the graphical program to produce a first portion of executable code;
wherein the software object comprises a second portion of executable code which is independent from the first portion of executable code.

68. The memory medium of claim 57,
wherein the memory medium is on a first computer coupled to a second computer through a network;
wherein the software object is stored on the second computer.

69. The memory medium of claim 57, wherein the graphical program comprises a plurality of nodes, wherein the graphical program development environment further comprises program instructions executable to:
arrange on the display screen said plurality of nodes, including said first node; and
connect said plurality of nodes and said first node in response to user input to create the graphical program.

70. The memory medium of claim 57, wherein the graphical program development environment further comprises program instructions executable to display on the display screen a user interface panel in response to user input for displaying data input to and/or output from the graphical program.

71. The memory medium of claim 57, wherein the graphical program development environment further comprises program instructions executable to:
construct execution instructions in response to said graphical program, wherein said execution instructions are executable to access said capabilities of the software object; and
execute said execution instructions, wherein said first node accesses said capabilities of the software object during said executing.

72. The memory medium of claim 57,
wherein the software object comprises one of:
an ActiveX object;
a Java object;
a C++ object;
a CORBA object.

73. The memory medium of claim 57,
wherein the software object comprises a first method;
wherein the first node is operable to invoke the first method of the software object.

74. The memory medium of claim 57,
wherein the software object comprises a first property;
wherein the first node is operable to perform one or more of:
get the first property;
set the first property.

75. A memory medium which stores a graphical program development environment, wherein the graphical program development environment comprises program instructions executable to create a graphical program in response to user input, wherein said creating the graphical program includes:
receiving user input requesting inclusion of a plurality of nodes in the graphical program, wherein the plurality of nodes includes a first node;
receiving user input to configure the first node to access capabilities of a pre-existing software object;
wherein, during execution of the graphical program, the first node is operable to access said capabilities of the pre-existing software object.

76. The memory medium of claim 75, wherein the graphical program development environment further comprises program instructions executable to compile the graphical program to produce executable code;
wherein the executable code of the graphical program is executable to invoke execution of the pre-existing software object.

77. The memory medium of claim 75,
wherein the pre-existing software object was created in a second program development environment, wherein the second program development environment is different than the first graphical program development environment.

78. The memory medium of claim 75,
wherein the user input to the first graphical program development environment application for creation of the graphical program does not include receiving user input specifying text-based programming language source code;
wherein the pre-existing software object was constructed in response to text-based programming language source code.

79. The memory medium of claim 75,
wherein the graphical program includes a plurality of nodes visually indicating functionality of the graphical program;
wherein the software object is not one of the plurality of nodes.

80. The memory medium of claim 75,
wherein the graphical program includes a plurality of nodes visually indicating functionality of the graphical program;
wherein the software object does not implement functionality of any of the plurality of nodes.

81. The memory medium of claim 75, wherein the graphical program development environment further comprises program instructions executable to compile the graphical program to produce a first portion of executable code;
wherein the software object comprises a second portion of executable code which is independent from the first portion of executable code.

82. The memory medium of claim 75,
wherein the pre-existing software object comprises one of:

an ActiveX object;
a Java object;
a C++ object;
a CORBA object.

83. The memory medium of claim 75,
wherein the memory medium is on a first computer coupled to a second computer through a network;
wherein the software object is stored on the second computer.

84. The memory medium of claim 75, wherein the graphical program comprises a plurality of nodes, wherein the graphical program development environment further comprises program instructions executable to:
arrange on the display screen said plurality of nodes, including said first node; and connect said plurality of nodes and said first node in response to user input to create the graphical program.

* * * * *